(12) United States Patent
Wang

(10) Patent No.: US 9,313,241 B2
(45) Date of Patent: Apr. 12, 2016

(54) COMMUNICATION SYSTEM AND RELAY DEVICE, COMPUTER-READABLE RECORDING MEDIUM STORING RELAY PROGRAM, AS WELL AS COMMUNICATION METHOD AND RELAY METHOD

(71) Applicant: Rakuten, Inc., Tokyo (JP)

(72) Inventor: Yongkun Wang, Tokyo (JP)

(73) Assignee: Rakuten, Inc., Tokyo (JP)

( * ) Notice: Subject to any disclaimer, the term of this patent is extended or adjusted under 35 U.S.C. 154(b) by 681 days.

(21) Appl. No.: 13/675,352

(22) Filed: Nov. 13, 2012

(65) Prior Publication Data

US 2013/0198291 A1    Aug. 1, 2013

Related U.S. Application Data

(60) Provisional application No. 61/592,860, filed on Jan. 31, 2012.

(51) Int. Cl.
*H04L 29/06*    (2006.01)
*H04L 29/08*    (2006.01)

(52) U.S. Cl.
CPC ............ *H04L 65/4061* (2013.01); *H04L 67/14* (2013.01)

(58) Field of Classification Search
CPC ...... H04L 67/14; H04L 65/4061; H04L 45/34
USPC ....................................................... 709/205
See application file for complete search history.

(56) References Cited

U.S. PATENT DOCUMENTS

| | | | |
|---|---|---|---|
| 6,453,349 B1 * | 9/2002 | Kano et al. ..................... | 709/226 |
| 2005/0195814 A1 * | 9/2005 | Hagiwara et al. ............. | 370/389 |
| 2009/0177788 A1 * | 7/2009 | Ishikawa et al. .............. | 709/228 |
| 2009/0235138 A1 * | 9/2009 | Chang et al. .................. | 714/748 |
| 2011/0105017 A1 * | 5/2011 | Takada et al. .................. | 455/18 |
| 2011/0170425 A1 * | 7/2011 | Horiuchi et al. .............. | 370/242 |
| 2011/0282617 A1 * | 11/2011 | Yamashita .................... | 702/120 |

FOREIGN PATENT DOCUMENTS

| | | |
|---|---|---|
| CN | 100350774 C | 11/2007 |
| EP | 2164207 A1 | 3/2010 |
| JP | 2007-249668 A | 9/2007 |

* cited by examiner

*Primary Examiner* — Brian J Gillis
*Assistant Examiner* — Steve Lin
(74) *Attorney, Agent, or Firm* — Sughrue Mion, PLLC

(57) ABSTRACT

An intermediate relay device includes a corresponding information adder that adds, after receiving an outgoing message, an address assigned to the relay device to a list included in the outgoing message, and an outgoing message transmitter that specifies the address of a transmission destination and transmits the outgoing message to which the address has been added. The intermediate relay device further includes a return message transmitter that transmits, after receiving a return message, the return message based on a predetermined address corresponding to a device located at a prior stage to the intermediate relay device in a relay route for the outgoing message among addresses in the list included in the received return message.

28 Claims, 40 Drawing Sheets

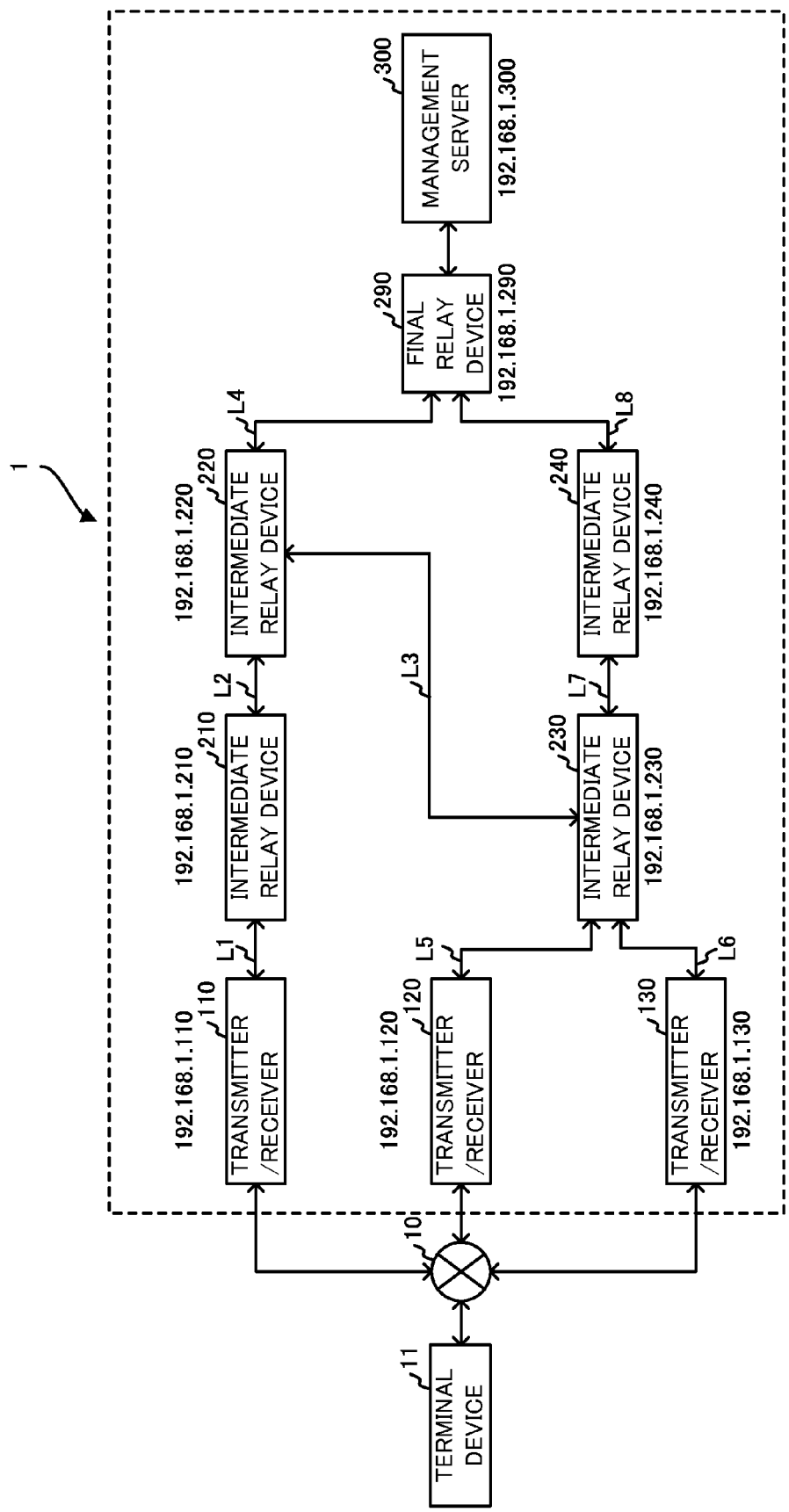

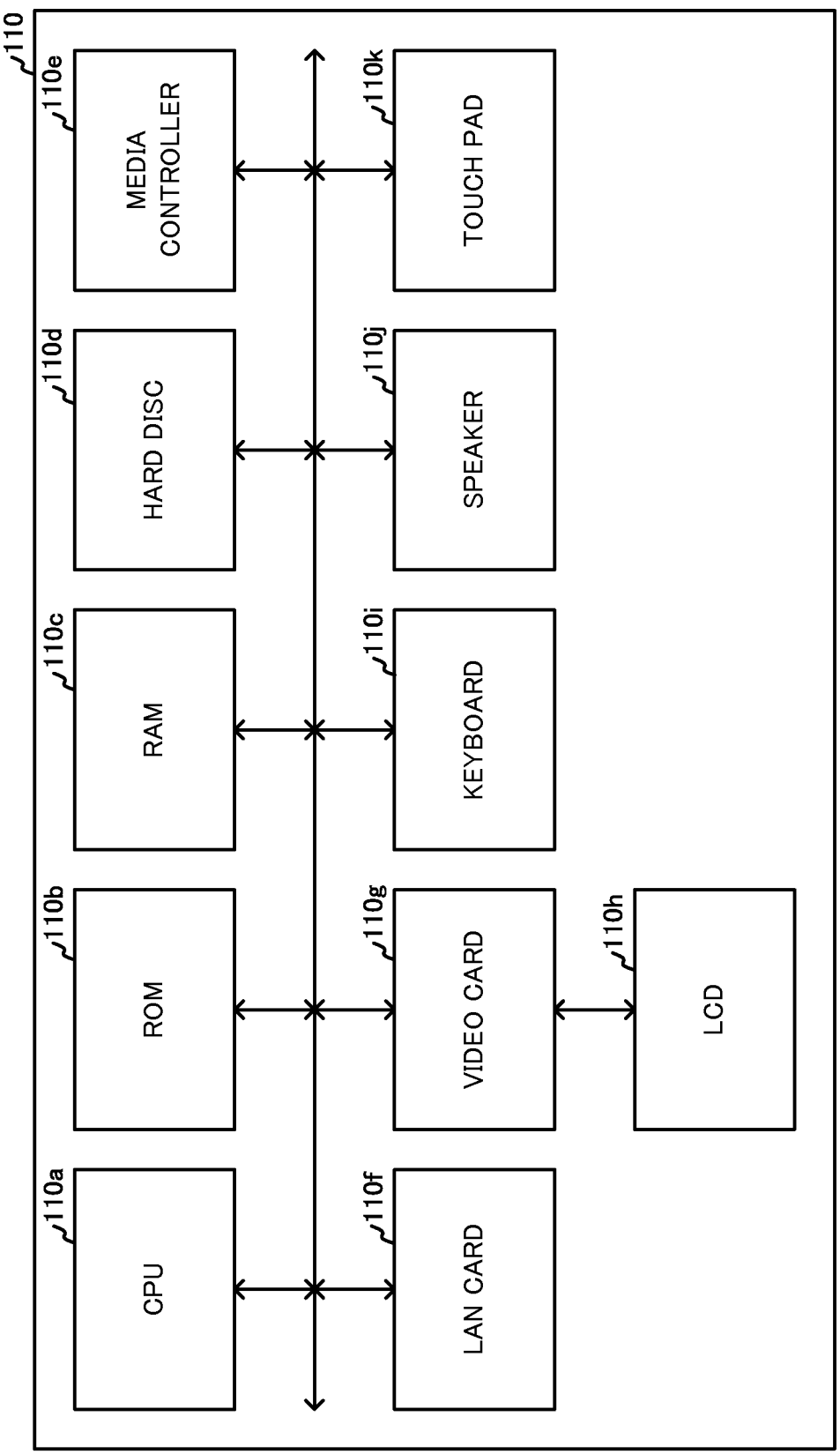

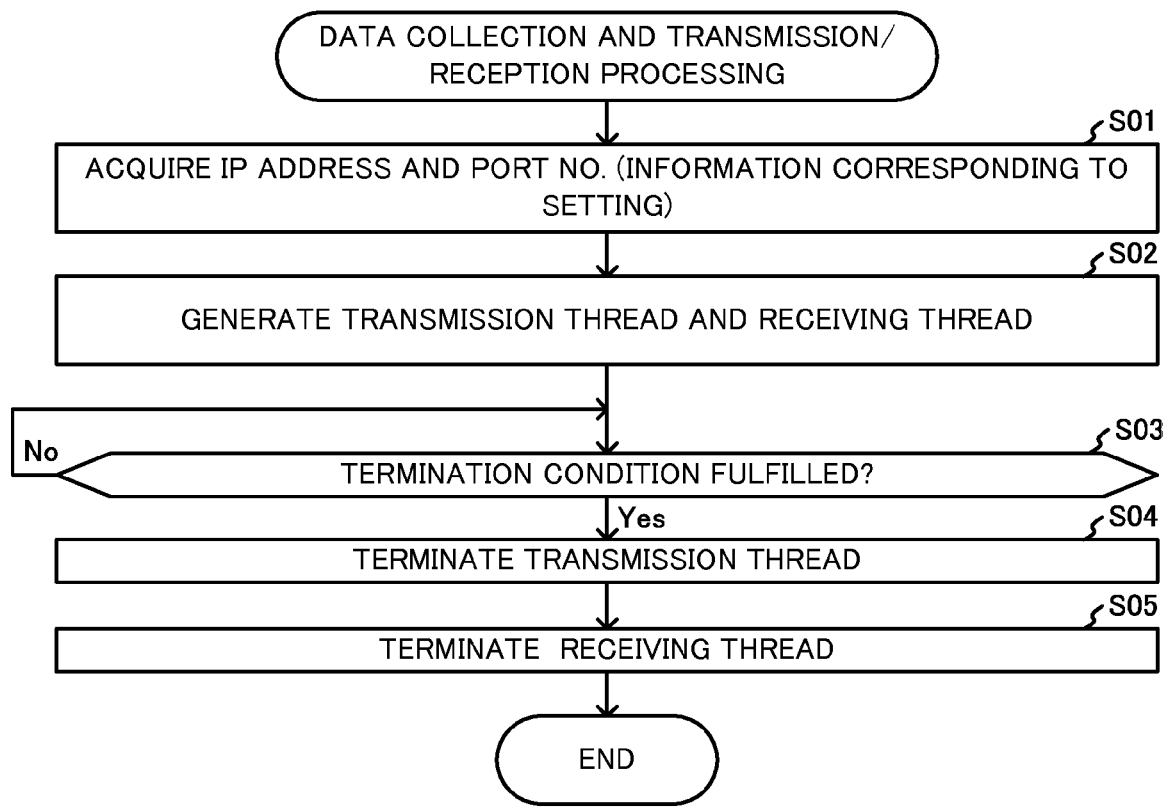

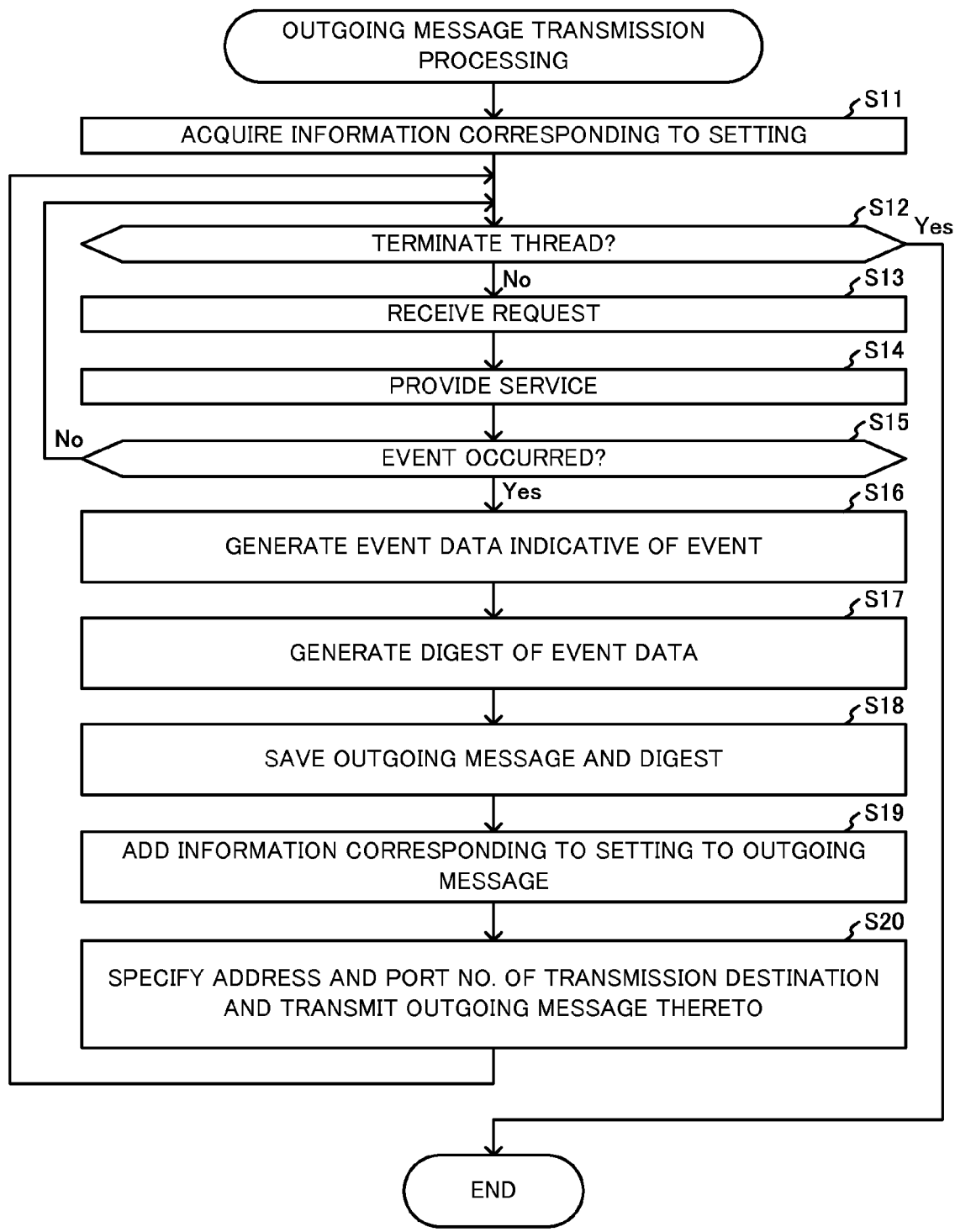

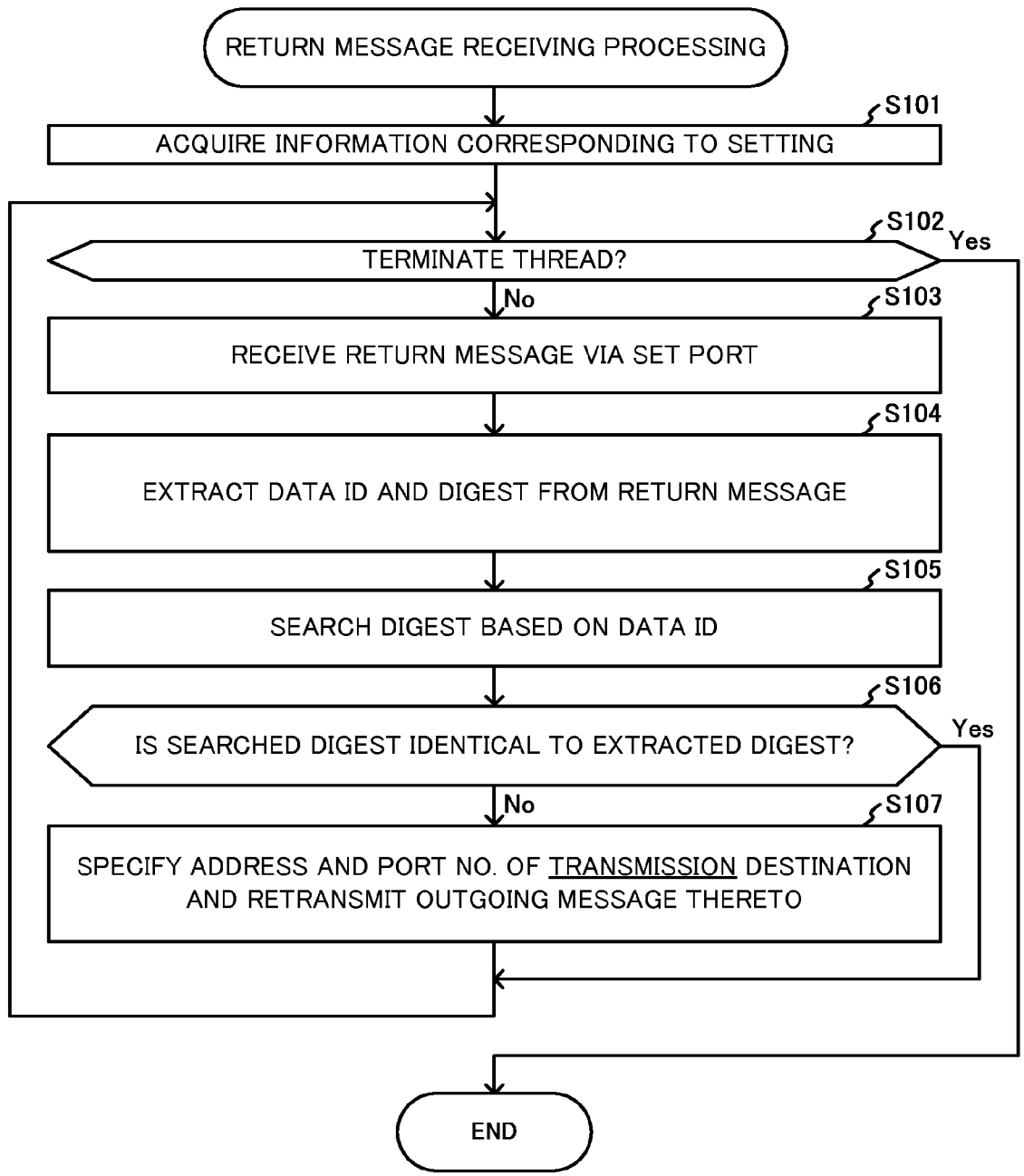

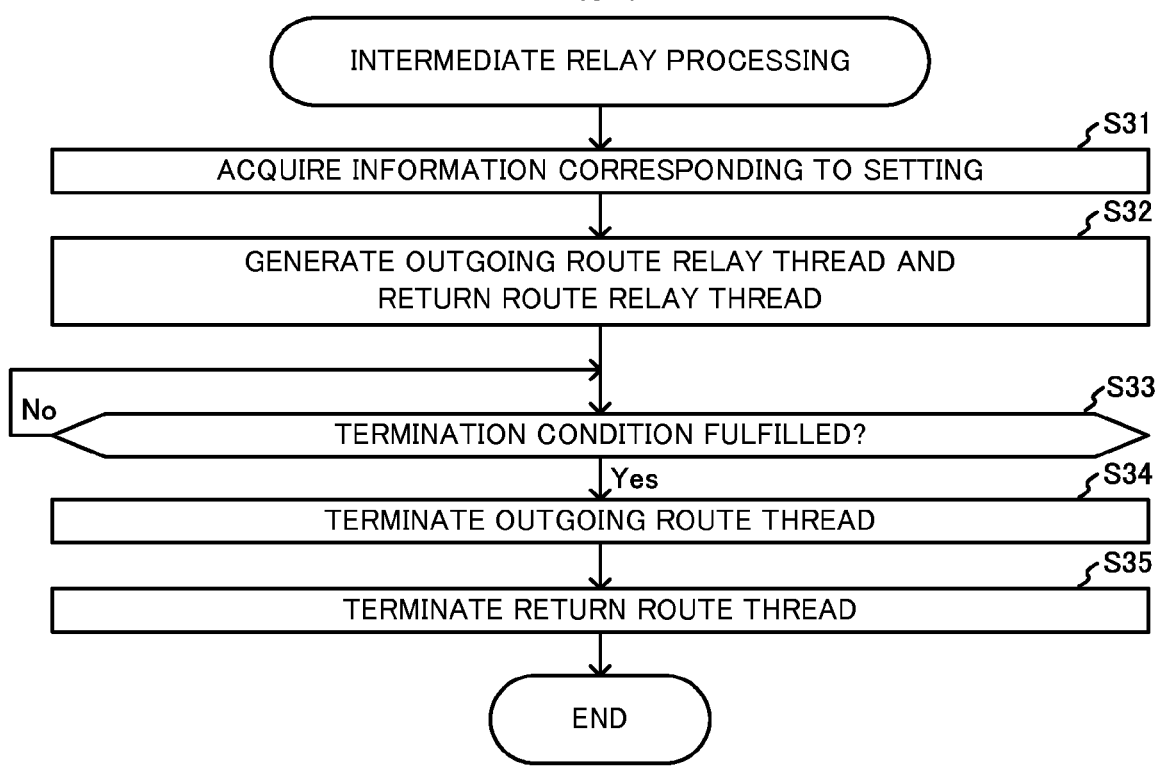

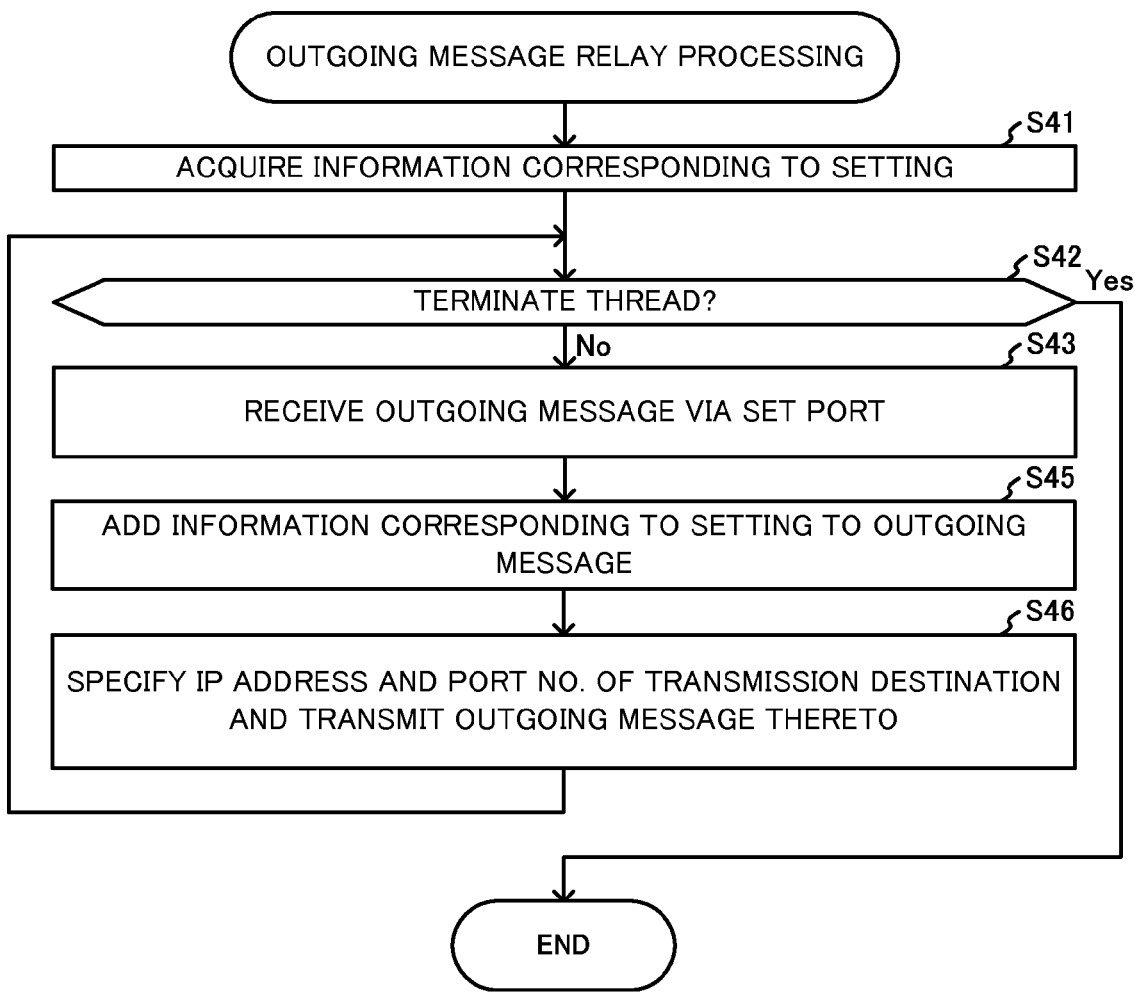

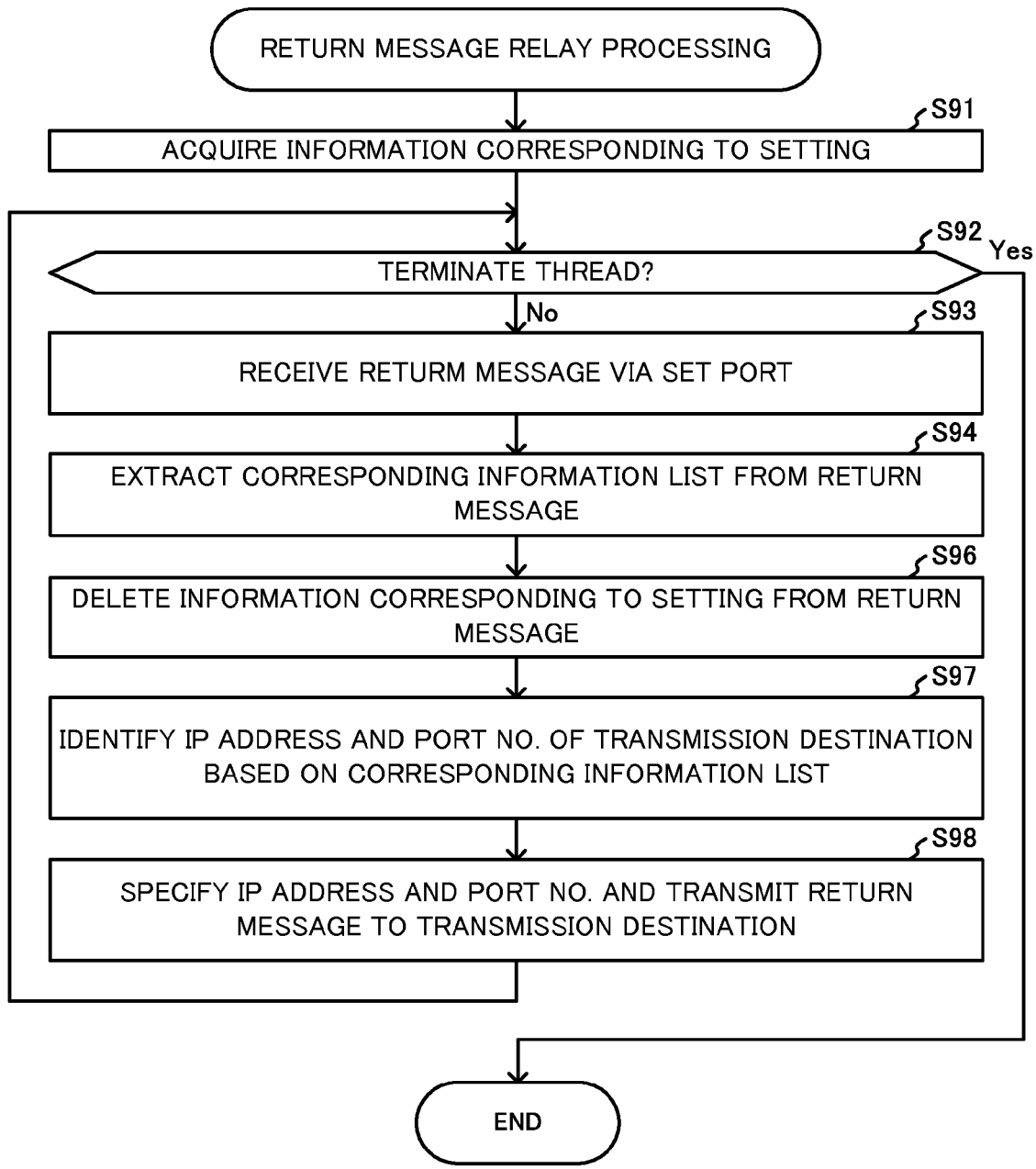

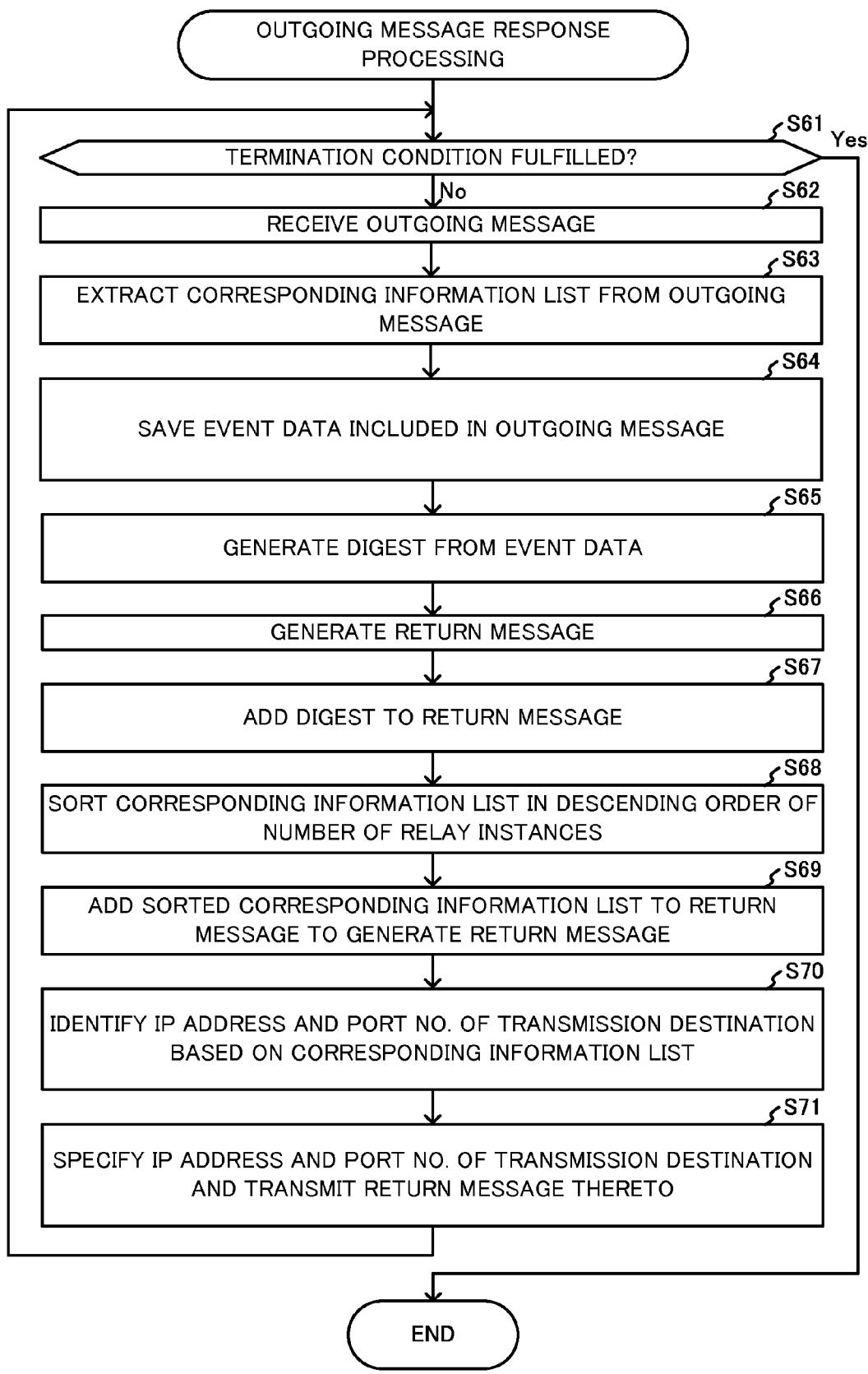

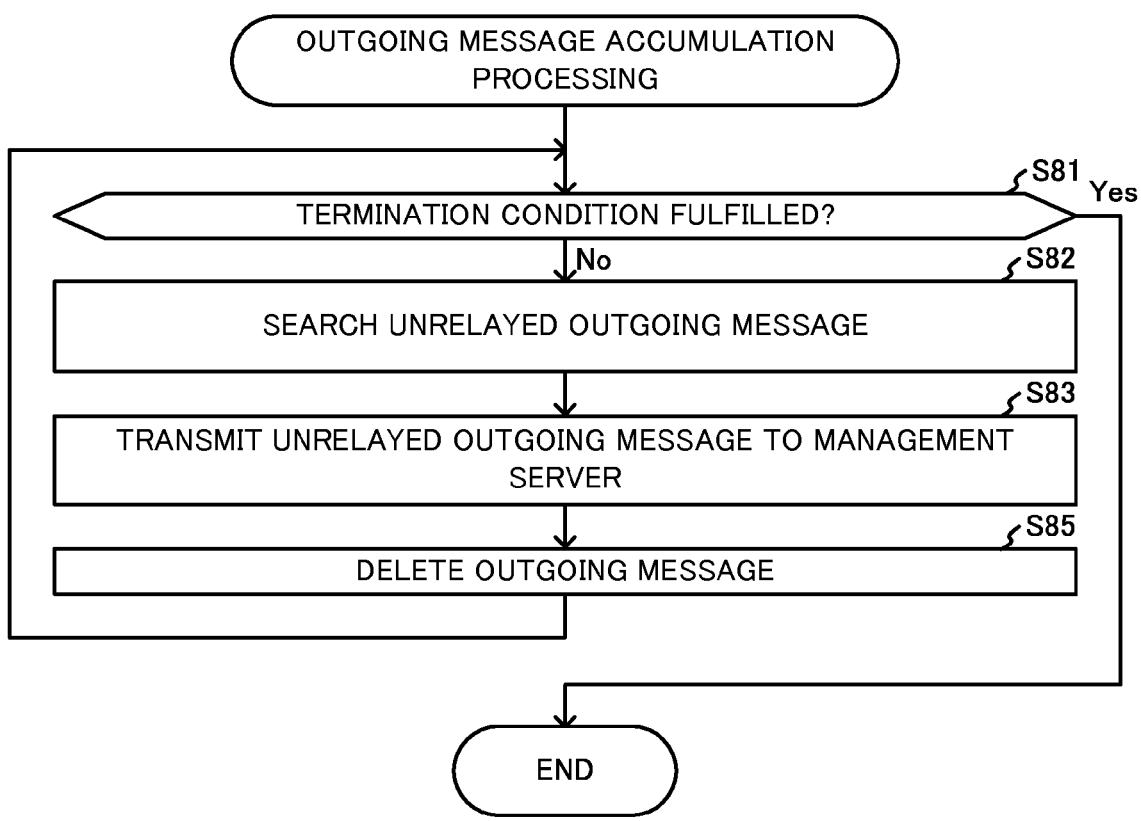

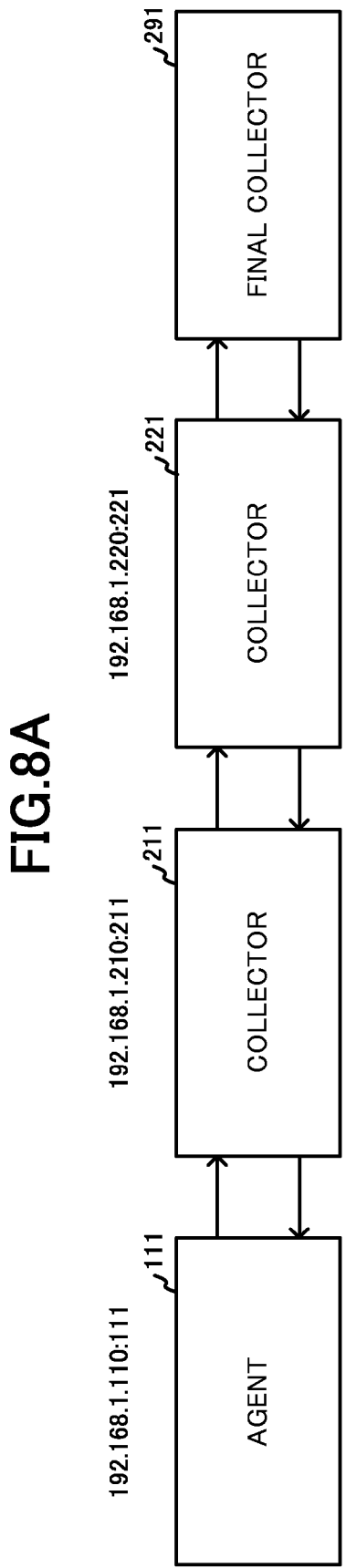

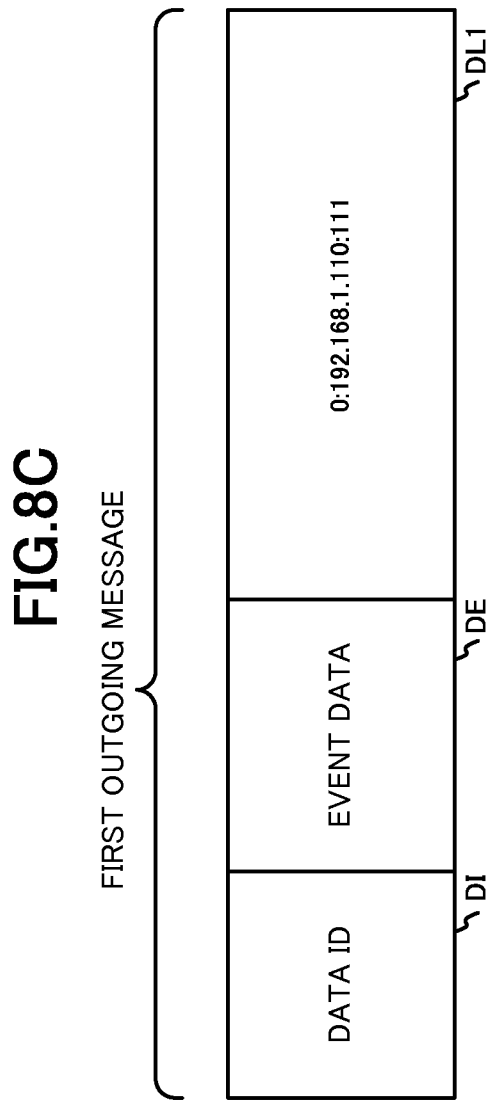

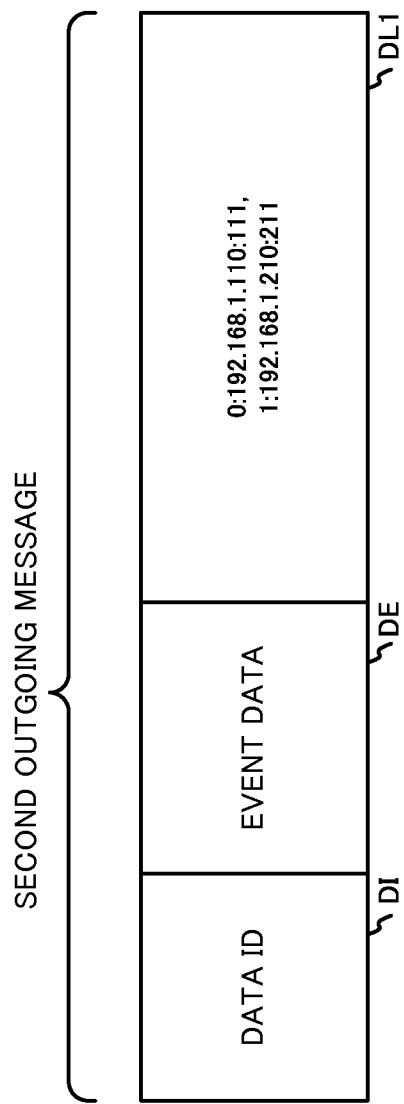

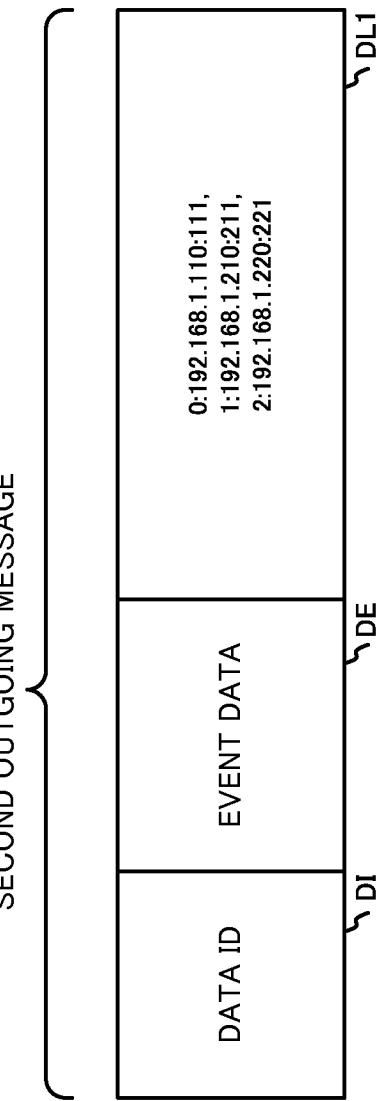

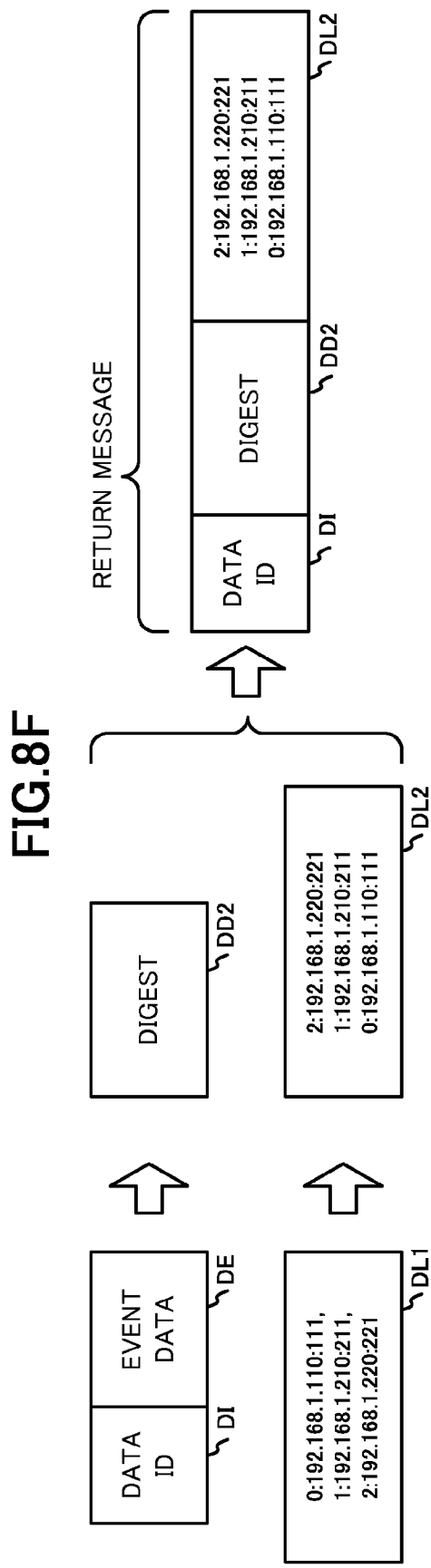

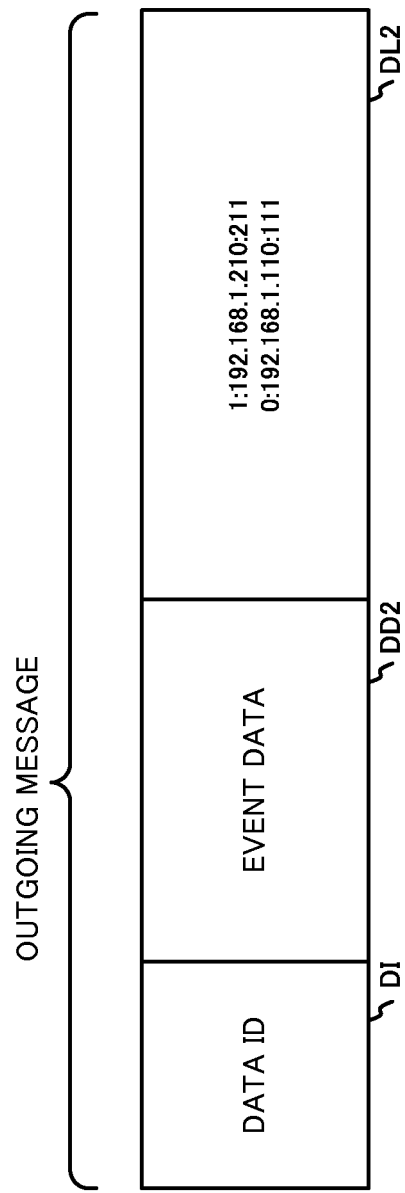

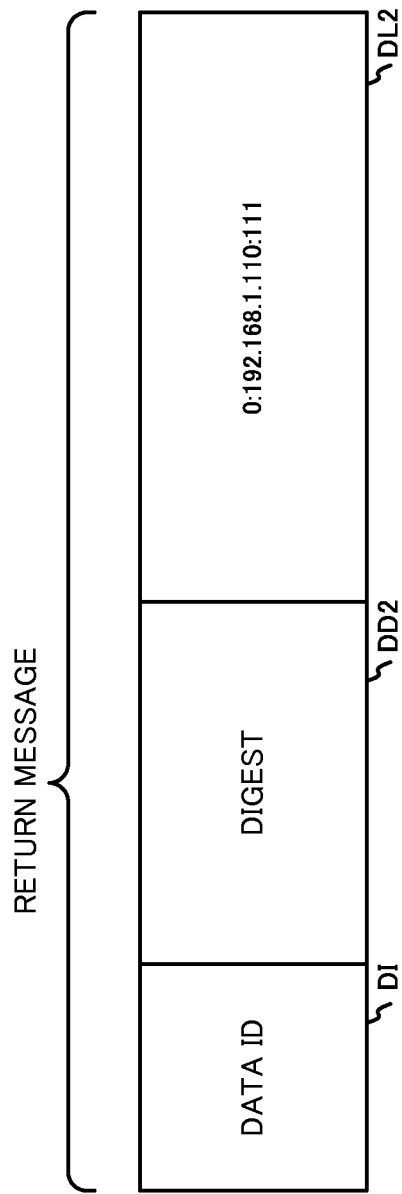

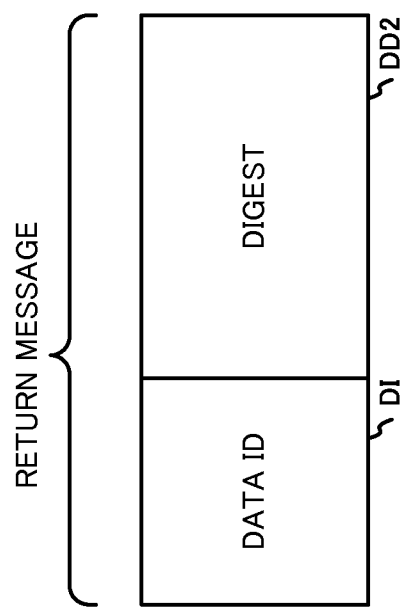

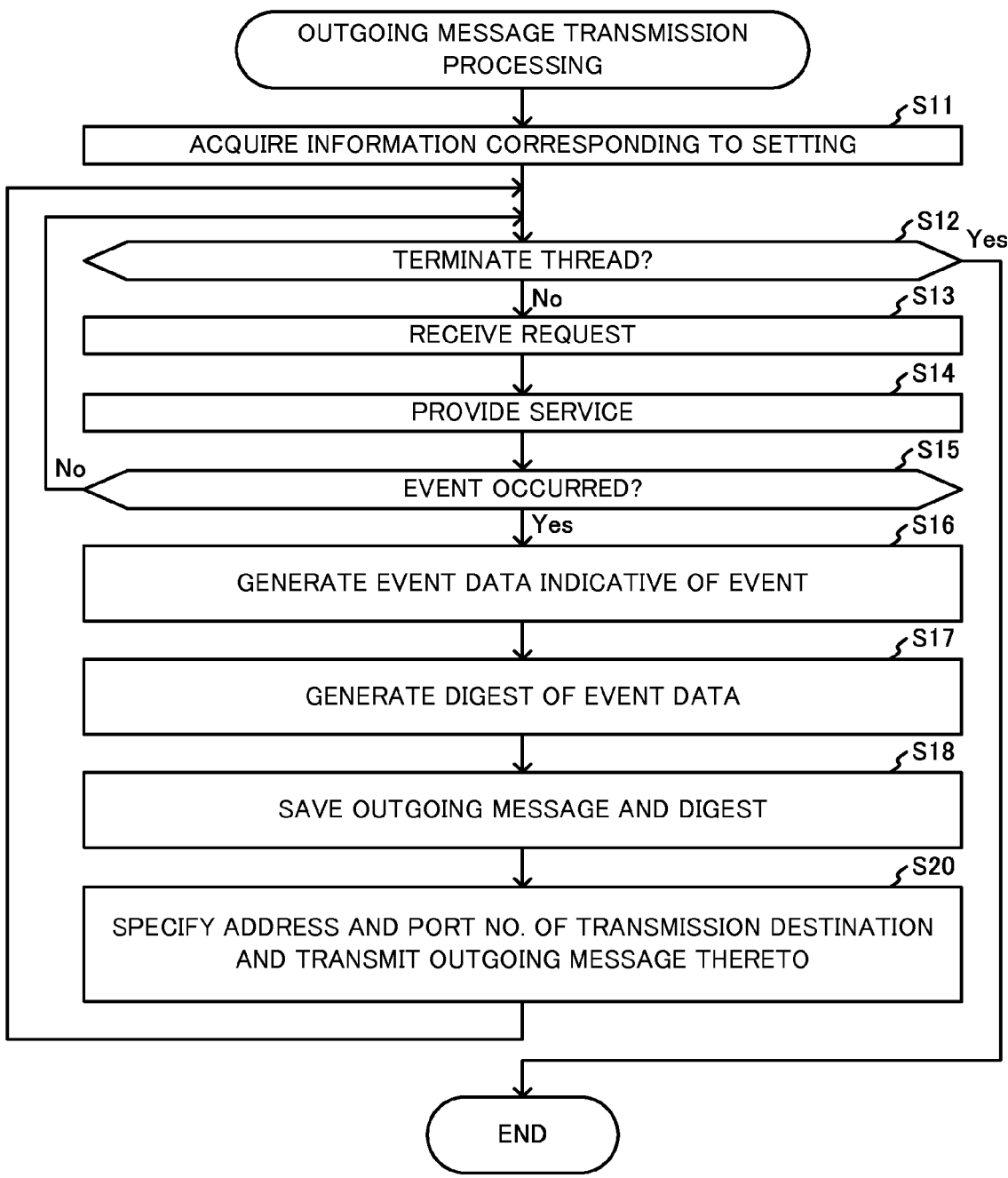

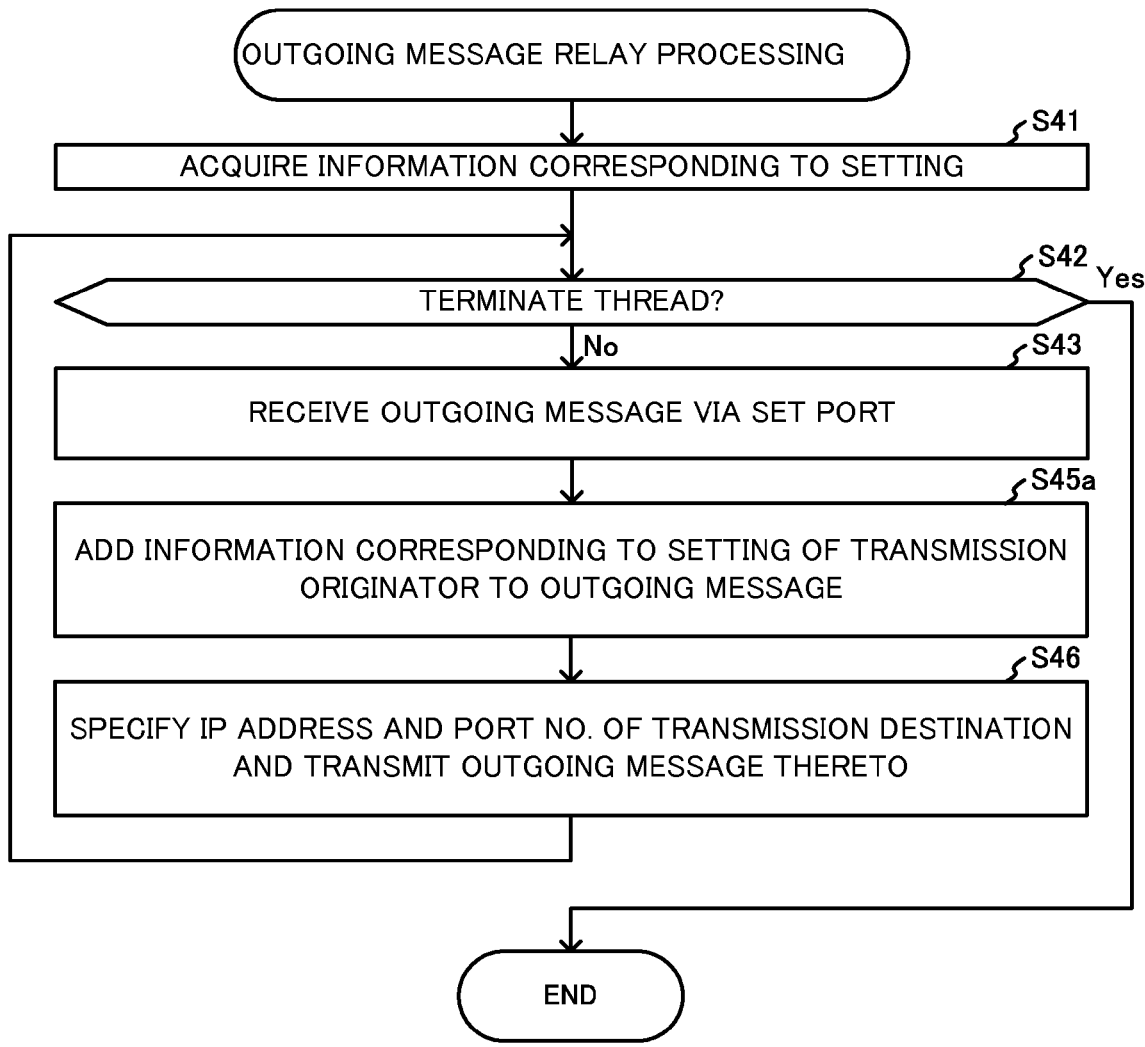

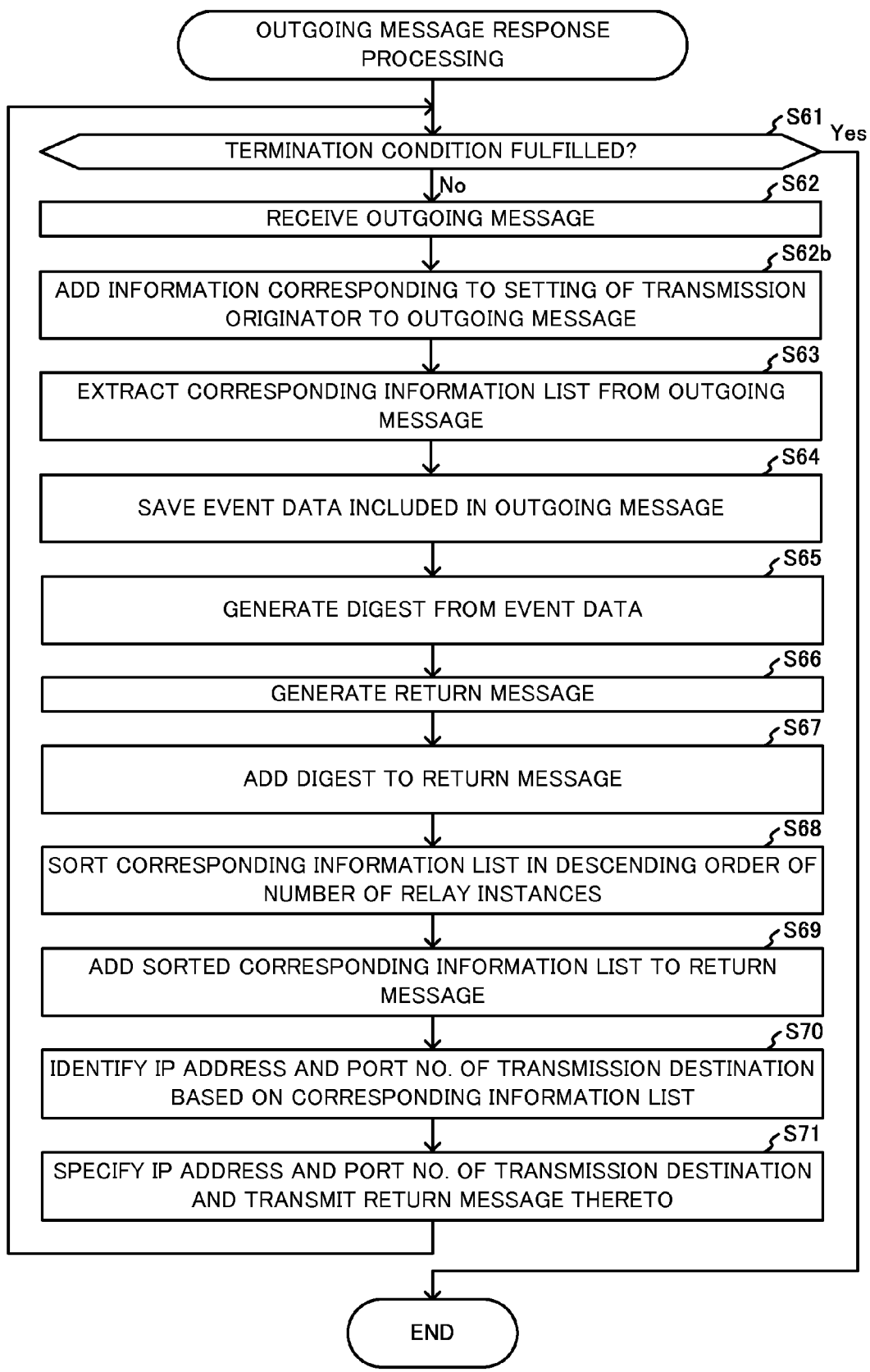

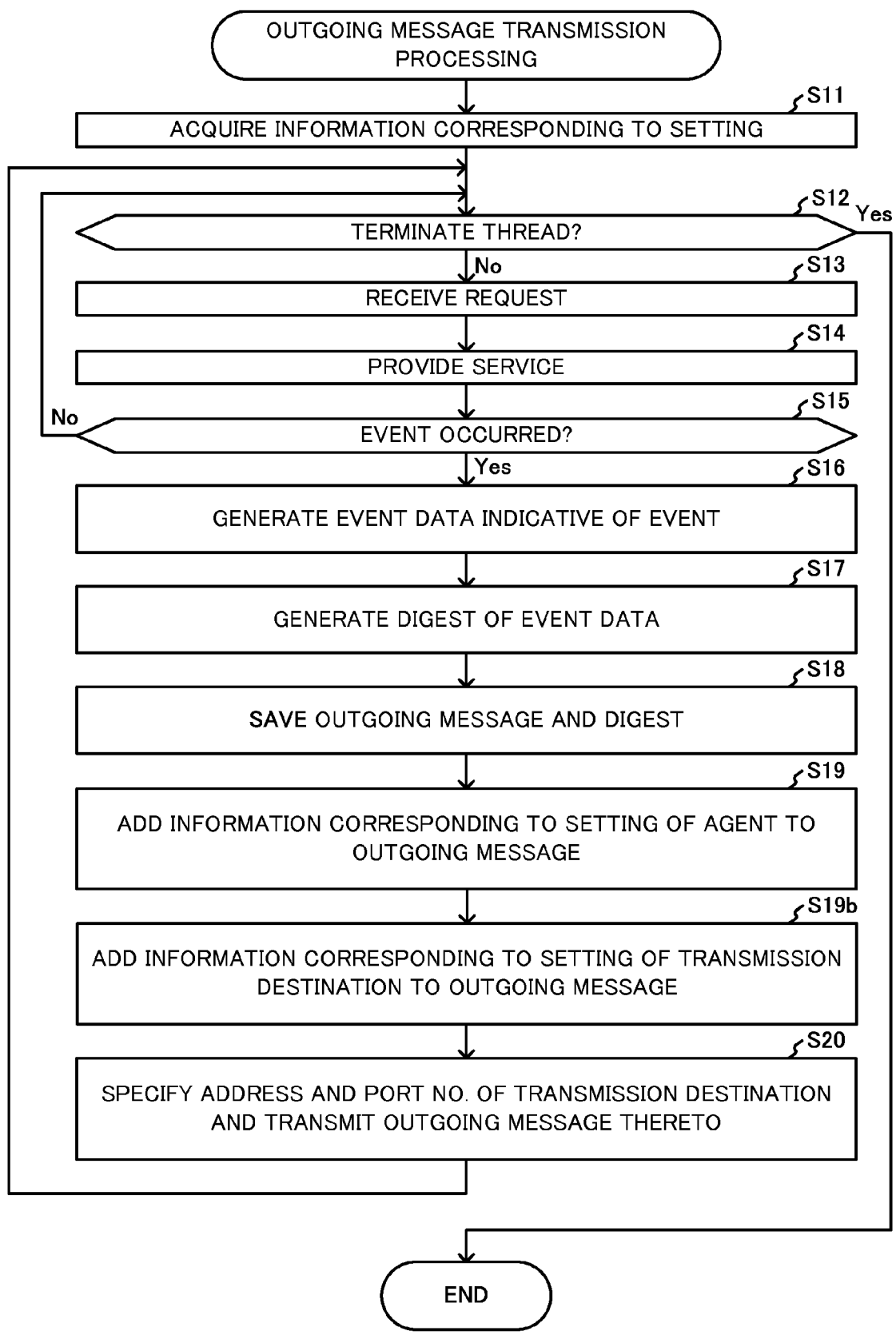

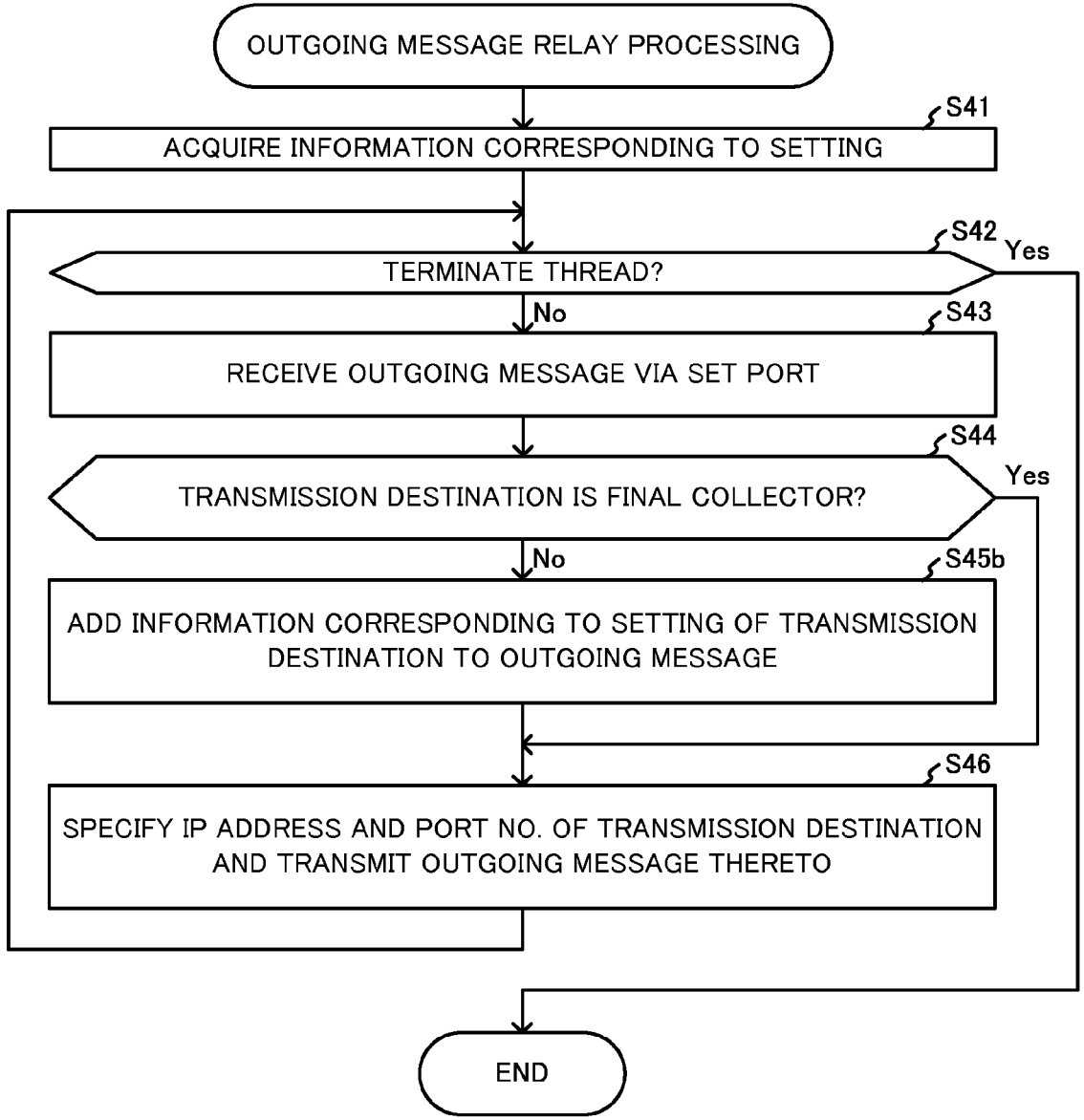

FIG.17A

ROUTING TABLE OF AGENT 121

| DESTINATION | SET TRANSMISSION DESTINATION | ALTERNATIVE TRANSMISSION DESTINATION | SELECTABLE TRANSMISSION DESTINATION |
|---|---|---|---|
| 192.168.1.290:291 | 192.168.1.230:231 | — | — |
| ... | ... | ... | ... |

FIG.17B

ROUTING TABLE OF COLLECTOR 231

| DESTINATION | SET TRANSMISSION DESTINATION | ALTERNATIVE TRANSMISSION DESTINATION | SELECTABLE TRANSMISSION DESTINATION |
|---|---|---|---|
| 192.168.1.290:291 | 192.168.1.240:241 | 192.168.1.240:242 | 192.168.1.220:221 |
| ... | ... | ... | ... |

FIG.17C

ROUTING TABLE OF COLLECTOR 241

| DESTINATION | SET TRANSMISSION DESTINATION | ALTERNATIVE TRANSMISSION DESTINATION | SELECTABLE TRANSMISSION DESTINATION |
|---|---|---|---|
| 192.168.1.290:291 | 192.168.1.290:291 | – | – |
| ... | ... | ... | ... |

FIG.17D

ROUTING TABLE OF COLLECTOR 242

| DESTINATION | SET TRANSMISSION DESTINATION | ALTERNATIVE TRANSMISSION DESTINATION | SELECTABLE TRANSMISSION DESTINATION |
|---|---|---|---|
| 192.168.1.290:291 | 192.168.1.290:291 | — | — |
| ... | ... | ... | ... |

| DESTINATION | SET TRANSMISSION DESTINATION | ALTERNATIVE TRANSMISSION DESTINATION | SELECTABLE TRANSMISSION DESTINATION |
|---|---|---|---|
| 192.168.1.290:291 | 192.168.1.290:291 | – | – |
| ... | ... | ... | ... |

COMMUNICATION SYSTEM AND RELAY DEVICE, COMPUTER-READABLE RECORDING MEDIUM STORING RELAY PROGRAM, AS WELL AS COMMUNICATION METHOD AND RELAY METHOD

CROSS-REFERENCE TO RELATED APPLICATION

This application claims the benefit of the Provisional Application 61/592,860, filed on Jan. 31, 2012, the entire disclosure of which is incorporated by reference herein.

FIELD

The present invention relates to a communication system and a relay device, a computer-readable recording medium that has recorded a relay program, and a communication method and a relay method.

BACKGROUND

A data transfer device has been known to which a master device that issues a plurality of transfer requests and a plurality of slave devices that output response signals in response to the transfer requests are connected (for example, Unexamined Japanese Patent Application Kokai Publication No. 2007-249668). This data transfer device counts up on a counter for each slave device when a response signal from the slave device is inputted, and counts down on the counter when a data transfer completion signal is inputted. In this data transfer device, data can be transferred between a slave device selected on the basis of the plurality of transfer request counters and the master device.

Nowadays, a network composed of a plurality of relay devices is often used. The use of a plurality of relay devices brings about the increase in the number of times of relaying data, and thus increasing the communication costs. However, in the art described in Unexamined Japanese Patent Application Kokai Publication No. 2007-249668, the problem of communication cost increase due to the increase of the number of times of relaying data like messages is not fully considered.

The present invention was made in view of such a problem and has an objective of providing a communication system and a relay device, a computer-readable recording medium that has recorded a relay program, and a communication method and relay method, all of which will be able to curb an increase of communication costs even if the number of times of relaying data like messages increases.

SUMMARY

To accomplish the above object, a first aspect of the present invention provides a communication system comprising at least the following: a transmitter/receiver that transmits an outgoing message including a list; a final-stage relay device which is a final destination for the outgoing message and which transmits a return message to the transmitter/receiver in response to the outgoing message; and a first-stage relay device that relays the outgoing message and the return message; (1) the transmitter/receiver comprising: a first message generator that generates a first outgoing message including a list to which an address assigned to the transmitter/receiver itself is added; and a first transmitter that transmits the first outgoing message generated by the first message generator to the final-stage relay device with designating the final-stage relay device as a final destination, (2) the first-stage relay device comprising: a first receiver that receives the first outgoing message; a second message generator that adds, after the first receiver receives the first outgoing message, an address assigned to the first-stage relay device itself to the list of the received first outgoing message to generate a second outgoing message; and a second transmitter that transmits the second outgoing message generated by the second message generator to the final-stage relay device with designating the final-stage relay device as a final destination, and (3) the final-stage relay device comprising: a second receiver that receives the second outgoing message; a third message generator that generates the return message to which the list included in the second outgoing message received by the second receiver is added; and a third transmitter that transmits the return message based on an address added to the list of the return message to the transmitter/receiver with designating the transmitter/receiver as a final destination.

In the communication system of the first aspect, the first receiver of the first-stage relay device may receive the return message, and the second transmitter of the first-stage relay device may transmit the return message based on a predetermined address which is included in the list of the return message received by the first receiver and which corresponds to the transmitter/receiver located at a prior stage to the first-stage relay device with reference to the transmitter/receiver in an outgoing route that is a relay route for the outgoing message.

The communication system of the first aspect may further comprise at least one intermediate-stage relay device located between the first-stage relay device and the final-stage relay device, wherein the intermediate-stage relay device comprises: a third receiver that receives the second outgoing message; an address adder that adds an address of the intermediate-stage relay device itself to the list of the second outgoing message received by the third receiver; and fourth transmitter that transmits the second outgoing message to which the address has been added by the address adder, the third receiver of the intermediate-stage relay device receives the return message, the fourth transmitter of the intermediate-stage relay device transmits the return message based on a predetermined address which is included in the list of the return message received by the third receiver and which corresponds to a device located at a prior stage to the intermediate-stage relay device with reference to the transmitter/receiver in the outgoing route, and the first receiver of the first-stage relay device receives the return message from the intermediate-stage relay device located at a posterior stage to the first-stage relay device with reference to the transmitter/receiver in the outgoing route.

In the communication system of the first aspect, the transmitter/receiver may further comprise a fourth receiver that receives the return message from the first-stage relay device.

In the communication system of the first aspect, at least one of the first-stage relay device and the intermediate-stage relay device may further comprise an address deleter that deletes an address of itself included in the list of the received return message.

In the communication system of the first aspect, the second message generator of the first-stage relay device may further add, to the list included in the received outgoing message, a number of times of relay of the outgoing message in association with an address of itself, the first-stage relay device may further comprise an identifier that identifies the predetermined address corresponding to the transmitter/receiver located at a prior stage to the first-stage relay device with reference to the transmitter/receiver in the outgoing route from the list of the received return message based on the number of times of relay added by the first-stage relay device, and the second transmitter of the first-stage relay device may transmit the return message based on the predetermined address identified by the identifier.

In the communication system of the first aspect, the address adder of the intermediate-stage relay device may further add a number of times of relay of the outgoing message to the list included in the received outgoing message in association with the address of itself, the intermediate-stage relay device may further comprise an identifier that identifies a predetermined address corresponding to the transmitter/receiver or another intermediate-stage relay device different from the intermediate-stage relay device located at a prior stage to the intermediate-stage relay device with reference to the transmitter/receiver in the outgoing route, from the list of the received return message, based on the number of times of relay added by the intermediate-stage relay device, and the fourth transmitter of the intermediate-stage relay device may transmit the return message based on the predetermined address identified by the identifier.

In the communication system of the first aspect, the first message generator of the transmitter/receiver may further add to the list included in the outgoing message, a port number which is used by a program which transmits the first outgoing message in the transmitter/receiver for a communication in addition to the address assigned to the transmitter itself to generate the first outgoing message, and after the first receiver receives the return message, the second transmitter of the first-stage relay device may specify the predetermined address corresponding to the transmitter/receiver located at a prior stage to the first-stage relay device with reference to the transmitter/receiver in the outgoing route among addresses included in the list of the received return message, and the port number which is used by the program run by the transmitter/receiver located at the prior stage and which is used for a communication among port numbers included in the list of the received return message, and transmit the return message.

In the communication system of the first aspect, the second message generator of the first-stage relay device may further add to the list included in the first outgoing message received by the first receiver, a port number which is used by a program which receives the first outgoing message in the first-stage relay device for a communication in addition to the address assigned to the first-stage relay device itself to generate the second outgoing message, and after the third receiver receives the return message, the fourth transmitter of the intermediate-stage relay device may specify the predetermined address corresponding to the first-stage relay device or the another intermediate-stage relay device different from the intermediate-stage relay device located at a prior stage to the intermediate-stage relay device with reference to the transmitter/receiver in the outgoing route among addresses included in the list of the received return message, and the port number used by the program run by the first-stage relay device or the another intermediate-stage relay device different from the intermediate-stage relay device located at the prior stage for a communication among port numbers included in the list of the received return message, and transmit the return message.

In the communication system of the first aspect, the address adder of the intermediate-stage relay device may further add to the list included in the second outgoing message received by the third receiver, a port number which is used by a program which receives the second outgoing message in the intermediate-stage relay device for a communication in addition to the address assigned to the intermediate-stage relay device itself, and the third transmitter of the final-stage relay device may specify the predetermined address corresponding to the first-stage relay device or the intermediate-stage relay device located at a prior stage to the final-stage relay device with reference to the transmitter/receiver in the outgoing route among addresses included in the list of the generated return message, and the port number used by the program run by the first-stage relay device or the intermediate-stage relay device located at the prior stage for a communication among port numbers included in the list of the received return message, and transmit the return message.

The communication system of the first aspect may further comprising equal to or greater than the three intermediate-stage relay devices, wherein the intermediate-stage relay device further may comprise a storage that stores a table retaining an address assigned to the final-stage relay device and an address assigned to one of the equal to or greater than three intermediate-stage relay devices that will be a candidate of a transmission destination where the second outgoing message is transmitted in order to eventually transmit the second outgoing message to the final-stage relay device, the table being configured to retain at least the two addresses, the identifier of the intermediate-stage relay device may identify equal to or greater than two addresses associated with the address assigned to the final-stage relay device from the table stored in the storage, and after a transmission of the second outgoing message fails with one of equal to or greater than the two addresses identified by the identifier being specified as an address assigned to the transmission destination, the fourth transmitter of the intermediate-stage relay device may specify another address among equal to or greater than the two searched addresses as an address assigned to the transmission destination, and transmit the second outgoing message.

In the communication system of the first aspect, the transmitter/receiver may further comprise a first digest generator that generates a digest of data included in the first outgoing message transmitted by the first transmitter, the final-stage relay device may further comprise a second digest generator that generates a digest of data included in the second outgoing message received by the second receiver, the third message generator of the final-stage relay device may generate the return message to which the digest generated by the second digest generator is added, the third transmitter of the final-stage relay device may transmit the return message generated by the third message generator, and the transmitter/receiver may further comprises a transmission result determiner that determines whether or not a transmission of data included in the first outgoing message to the final-stage relay device has succeeded based on whether or not the digest included in the return message received by the fourth receiver and the digest generated by the first digest generator of the transmitter/receiver is identical to each other.

The communication system of the first aspect may further comprising at least the plurality of transmitters/receivers, wherein the plurality of transmitter/receivers each may further comprise an encrypter that encrypts, using a different key from each other, the first outgoing message generated by the first message generator, and the first transmitter of each of the plurality of transmitter/receivers may transmit the first outgoing message having undergone encryption by each encrypter.

In the communication system of the first aspect, the final-stage relay device may accumulate event data included in the second outgoing message in a management server that manages the transmitter/receiver.

The communication system of the first aspect may further may further comprising a control device that controls at least one of the transmitter/receiver, the first-stage relay device, the at least one intermediate-stage relay device, and the final-stage relay device, wherein the control device comprises: a fifth receiver that receives a status report for reporting an operation status from at least one of the transmitter/receiver, the first-stage relay device, the at least one intermediate-stage relay device, and the final-stage relay device; a failure occurrence determiner that determines whether or not a failure occurs in at least one of the transmitter/receiver, the first-stage relay device, the at least one intermediate-stage relay device, and the final-stage relay device, based on the status report received by the fifth receiver; and a controller that controls at least one of the transmitter/receiver, the first-stage relay device, the at least one intermediate-stage relay device, and the final-stage relay device as to recover a communication with a device which is determined by the failure occurrence determiner that a failure has occurred.

To achieve the above object, a second aspect of the present invention provides a communication system comprising at least the following: a transmitter/receiver that transmits an outgoing message including a list; a final-stage relay device which is a final destination for the outgoing message and which transmits a return message to the transmitter/receiver in response to the outgoing message; and a first-stage relay device that relays the outgoing message and the return message; (1) the transmitter/receiver comprising: a first message generator that generates a first outgoing message; and a first transmitter that transmits the first outgoing message generated by the first message generator to the final-stage relay device with designating the final-stage relay device as a final destination; (2) the first-stage relay device comprising: a first receiver that receives the first outgoing message; a second message generator that adds, after the first receiver receives the first outgoing message, an address assigned to the transmitter/receiver located at a prior stage to the intermediate-stage relay device with reference to the transmitter/receiver in an outgoing route that is a relay route for the outgoing message to the list of the received first outgoing message to generate a second outgoing message; and a second transmitter that transmits the second outgoing message generated by the second message generator to the final-stage relay device with designating the final-stage relay device as a final destination, and (3) the final-stage relay device comprising: a second receiver that receives the second outgoing message; a third message generator that generates the return message to which the list included in the second outgoing message received by the second receiver is added; and a third transmitter that transmits the return message based on an address added to the list of the return message to the transmitter/receiver with designating the transmitter/receiver as a final destination.

To accomplish the above object, a third aspect of the present invention provides a communication system comprising at least the following: a transmitter/receiver that transmits an outgoing message; a final-stage relay device which is a final destination for the outgoing message and which transmits a return message to the transmitter/receiver in response to the outgoing message; and a first-stage relay device that relays the outgoing message and the return message; (1) the transmitter/receiver comprising: a first digest generator that generates a digest of data included in the outgoing message; and a first transmitter that transmits the outgoing message to the final-stage relay device with designating the final-stage relay device as a final destination, (2) the first-stage relay device comprising: a first receiver that receives the outgoing message; and a second transmitter that transmits the outgoing message received by the first receiver to the final-stage relay device with designating the final-stage relay device as a final destination, (3) the final-stage relay device comprising: a second receiver that receives the outgoing message; a second digest generator that generates a digest of data included in the outgoing message received by the second receiver; a third message generator that generates the return message to which the digest generated by the second digest generator is added; and a third transmitter that transmits the return message to the transmitter/receiver with designating the transmitter/receiver as a final destination, and (4) the transmitter/receiver further comprising: a third receiver that receives the return message from the first-stage relay device located at a posterior stage to the transmitter/receiver with reference to the transmitter/receiver in an outgoing route, and a transmission result determiner that determines whether or not a transmission of data included in the outgoing message to the final-stage relay device has succeeded based on whether or not the digest included in the return message received by the third receiver is identical to the digest generated by the first digest generator.

To accomplish the above object, a fourth aspect of the present invention provides a relay device that relays an outgoing message including a list, and a return message responding to the outgoing message, the relay device comprising: an outgoing route receiver that receives a first outgoing message including a list to which an address of a transmitter/receiver that has transmitted the outgoing message is added; an outgoing message generator that adds an address assigned to the relay device itself to the list included in the first outgoing message received by the outgoing route receiver to generate a second outgoing message; an outgoing route transmitter that transmits the second outgoing message generated by the outgoing message generator; a return route receiver that receives the return message to which the list of the outgoing message is added; and a return route transmitter that transmits the return message based on a predetermined address which is included in the list of the return message received by the return route receiver and which corresponds to the transmitter/receiver located at a prior stage to the relay device with reference to the transmitter/receiver in an outgoing route that is a relay route for the outgoing message.

To accomplish the above object, a fifth aspect of the present invention provides a relay device that relays an outgoing message including a list, and a return message responding to the outgoing message, the relay device comprising: an outgoing route receiver that receives a first outgoing message from a transmitter/receiver; an outgoing message generator that adds an address assigned to the transmitter/receiver to the list included in the first outgoing message received by the outgoing route receiver to generate a second outgoing message; an outgoing route transmitter that transmits the second outgoing message generated by the outgoing message generator; a return route receiver that receives the return message to which the list of the outgoing message is added; and a return route transmitter that transmits the return message based on a predetermined address which is included in the list of the return message received by the return route receiver and which corresponds to the transmitter/receiver located at a prior stage to the relay device with reference to the transmitter/receiver in an outgoing route that is a relay route for the outgoing message.

To accomplish the above object, a sixth aspect of the present invention provides a computer-readable non-transitory recording medium having stored therein a relay program that allows a computer which relays an outgoing message including a list, and a return message responding to the outgoing message to function as: an outgoing route receiver that receives a first outgoing message including a list to which an address of a transmitter/receiver that has transmitted the outgoing message is added; an outgoing message generator that adds an address assigned to the relay device itself to the list included in the first outgoing message received by the outgoing route receiver to generate a second outgoing message; an outgoing route transmitter that transmits the second outgoing message generated by the outgoing message generator; a return route receiver that receives the return message to which the list of the outgoing message is added; and a return route transmitter that transmits the return message based on a predetermined address which is included in the list of the return message received by the return route receiver and which corresponds to the transmitter/receiver located at a prior stage to the relay device with reference to the transmitter/receiver in an outgoing route that is a relay route for the outgoing message.

To accomplish the above object, a seventh aspect of the present invention provides a computer-readable non-transitory recording medium having stored therein a relay program that allows a computer which relays an outgoing message including a list, and a return message responding to the outgoing message to function as: an outgoing route receiver that receives a first outgoing message from a transmitter/receiver; an outgoing message generator that adds an address assigned to the transmitter/receiver to the list included in the first outgoing message received by the outgoing route receiver to generate a second outgoing message; an outgoing route transmitter that transmits the second outgoing message generated by the outgoing message generator; a return route receiver that receives the return message to which the list of the outgoing message is added; and a return route transmitter that transmits the return message based on a predetermined address which is included in the list of the return message received by the return route receiver and which corresponds to the transmitter/receiver located at a prior stage to the relay device with reference to the transmitter/receiver in an outgoing route that is a relay route for the outgoing message.

To accomplish the above object, an eighth aspect of the present invention provides a communication method executed by a communication system comprising at least the following: a transmitter/receiver that transmits an outgoing message including a list; a final-stage relay device which is a final destination for the outgoing message and which transmits a return message to the transmitter/receiver in response to the outgoing message; and a first-stage relay device that relays the outgoing message and the return message, the communication method comprising: (1) a first message generating step for causing the transmitter/receiver to generate a first outgoing message including a list to which an address assigned to the transmitter/receiver itself is added; a first transmitting step for causing the transmitter/receiver to transmit the first outgoing message generated through the first message generating step to the final-stage relay device with designating the final-stage relay device as a final destination; (2) a first receiving step for causing the first-stage relay device to receive the first outgoing message; a second message generating step for causing the first-stage relay device to add, after the first outgoing message is received in the first receiving step, an address assigned to the first-stage relay device itself to the list of the received first outgoing message to generate a second outgoing message; a second transmitting step for causing the first-stage relay device to transmit the second outgoing message generated through the second message generating step to the final-stage relay device with designating the final-stage relay device as a final destination; (3) a second receiving step for causing the final-stage relay device to receive the second outgoing message; a third message generating step for causing the final-stage relay device to generate the return message to which the list included in the second outgoing message received through the second receiving is added; and a third transmitting step for causing the final-stage relay device to transmit the return message based on an address added to the list of the return message to the transmitter/receiver with designating the transmitter/receiver as a final destination.

To accomplish the above object, a ninth aspect of the present invention provides a communication method executed by a communication system comprising at least the following: a transmitter/receiver that transmits an outgoing message including a list; a final-stage relay device which is a final destination for the outgoing message and which transmits a return message to the transmitter/receiver in response to the outgoing message; and a first-stage relay device that relays the outgoing message and the return message, the communication method comprising: (1) a first message generating step for causing the transmitter/receiver to generate a first outgoing message; a first transmitting step for causing the transmitter/receiver to transmit the first outgoing message generated through the first message generating step with the final-stage relay device being as a final destination; (2) a first receiving step for causing the first-stage relay device to receive the first outgoing message; a second message generating step for causing the first-stage relay device to add, after the first outgoing message is received through the first receiving step, an address assigned to the transmitter/receiver located at a prior stage to the intermediate-stage relay device with reference to the transmitter/receiver in an outgoing route that is a relay route for the outgoing message to the list of the received first outgoing message to generate a second outgoing message; a second transmitting step for causing the first-stage relay device to transmit the second outgoing message generated through the second message generating step with the final-stage relay device being as a final destination; (3) a second receiving step for causing the final-stage relay device to receive the second outgoing message; a third message generating step for causing the final-stage relay device to generate the return message to which the list included in the second outgoing message received through the second receiving step is added; and a third transmitting step for causing the final-stage relay device to transmit the return message based on an address added to the list of the return message with the transmitter/receiver being as a final destination.

To accomplish the above object, a tenth aspect of the present invention provides a communication method executed by a communication system comprising at least the following: a transmitter/receiver that transmits an outgoing message; a final-stage relay device which is a final destination for the outgoing message and which transmits a return message to the transmitter/receiver in response to the outgoing message; and a first-stage relay device that relays the outgoing message and the return message, the communication method comprising: (1) a first digest generating step for causing the transmitter/receiver to generate a digest of data included in the outgoing message; a first transmitting step for causing the transmitter/receiver to transmit the outgoing message to the final-stage relay device with designating the final-stage relay device as a final destination, (2) a first receiving step for causing the first-stage relay device to receive the outgoing message; a second transmitting step for causing the first-stage relay device to transmit the outgoing message received through the first receiving step to the final-stage relay device with designating the final-stage relay device as a final destination; (3) a second receiving step for causing the final-stage relay device to receive the outgoing message; a second digest generating step for causing the final-stage relay device to generate a digest of data included in the outgoing message received through the second receiving step; a third message generating step for causing the final-stage relay device to generate the return message to which the digest generated through the second digest generating step is added; a third transmitting step for causing the final-stage relay device to transmit the return message to the transmitter/receiver with designating the transmitter/receiver as a final destination; (4) a third receiving step for causing the transmitter/receiver to receive the return message from the first-stage relay device located at a posterior stage to the transmitter/receiver with reference to the transmitter/receiver in an outgoing route, and a transmission result determining step for causing the transmitter/receiver to determine whether or not a transmission of data included in the outgoing message to the final-stage relay device has succeeded based on whether or not the digest included in the return message received by the third receiver is identical to the digest generated by the first digest generator.

To accomplish the above object, an eleventh aspect of the present invention provides a relay method executed by a relay device that relays an outgoing message including a list, and a return message responding to the outgoing message, the relay method comprising: an outgoing route receiving step for receiving a first outgoing message including a list to which an address of a transmitter/receiver that has transmitted the outgoing message is added; an outgoing message generating step for adding an address assigned to the relay device itself to the list included in the first outgoing message received through the outgoing route receiving step to generate a second outgoing message; an outgoing route transmitting step for transmitting the second outgoing message generated through the outgoing message generating step; a return route receiving step for receiving the return message to which the list of the outgoing message is added; and a return route transmitting step for transmitting the return message based on a predetermined address which is included in the list of the return message received through the return route receiving step and which corresponds to the transmitter/receiver located at a prior stage to the relay device with reference to the transmitter/receiver in an outgoing route that is a relay route for the outgoing message.

To accomplish the above object, a twelfth aspect of the present invention provides a relay method executed by a relay device that relays an outgoing message including a list, and a return message responding to the outgoing message, the relay method comprising: an outgoing route receiving step for receiving a first outgoing message from a transmitter/receiver; an outgoing message generating step for adding an address assigned to the transmitter/receiver to the list included in the first outgoing message received through the outgoing route receiving step to generate a second outgoing message; an outgoing route transmitting step for transmitting the second outgoing message generated through the outgoing message generating step; a return route receiving step for receiving the return message to which the list of the outgoing message is added; and a return route transmitting step for transmitting the return message based on a predetermined address which is included in the list of the return message received through the return route receiving step and which corresponds to the transmitter/receiver located at a prior stage to the relay device with reference to the transmitter/receiver in an outgoing route that is a relay route for the outgoing message.

According to a communication system and a relay device, a computer-readable recording medium storing a relay program, as well as a communication method and a relay method of the present invention, it becomes possible to curb an increase in communication costs even if the number of times of relaying data increases.

BRIEF DESCRIPTION OF THE DRAWINGS

A more complete understanding of this application can be obtained when the following detailed description is considered in conjunction with the following drawings, which are as follows:

FIG. 1 is a system configuration diagram illustrating one configuration example of a communication system according to one embodiment of the present invention;

FIG. 2 is a hardware configuration diagram illustrating one configuration example of a transmitter/receiver;

FIG. 4A is a flow chart illustrating one example of data collection and transmission/reception processing performed by a transmitter/receiver;

FIG. 4B is a flow chart illustrating one example of outgoing message transmission processing performed by a transmitter/receiver according to the present embodiment;

FIG. 4C is a flow chart illustrating one example of return message receiving processing performed by a transmitter/receiver;

FIG. 6A is a flow chart illustrating one example of intermediate relay processing performed by an intermediate relay device;

FIG. 6B is a flow chart illustrating one example of outgoing message relay processing performed by an intermediate relay device according to the present embodiment;

FIG. 6C is a flow chart illustrating one example of return message relay processing performed by an intermediate relay device;

FIG. 7B is a flow chart illustrating one example of outgoing message response processing performed by a final relay device;

FIG. 7C is a flow chart illustrating one example of outgoing message accumulation processing performed by a final relay device;

FIG. 8A is a diagram illustrating one example of an outgoing route and a return route;

FIG. 8C is a diagram illustrating one example of a first outgoing message to which corresponding information thereof was added by an agent;

FIG. 8D is a diagram illustrating one example of a second outgoing message to which corresponding information thereof was added by a collector;

FIG. 8E is a diagram illustrating another example of the second outgoing message to which corresponding information thereof was added by a collector;

FIG. 8F is a diagram illustrating one example of a return message generated by a final collector;

FIG. 8G is a diagram illustrating one example of a return message whose corresponding information was deleted by a collector;

FIG. 8H is a diagram illustrating another example of a return message whose corresponding information was deleted by a collector;

FIG. 8I is a diagram illustrating one example of a return message to be received by an agent;

FIG. 12 is a flow chart illustrating one example of outgoing message transmission processing performed by a transmitter/receiver in modified example 13 of the present embodiment;

FIG. 13 is a flow chart illustrating one example of outgoing message relay processing performed by an intermediate relay device in modified example 13 of the present embodiment;

FIG. 14 is a flow chart illustrating one example of outgoing message response processing performed by a final relay device in modified example 13 of the present embodiment;

FIG. 15 is a flow chart illustrating one example of outgoing message transmission processing performed by a transmitter/receiver in modified example 14 of the present embodiment;

FIG. 16 is a flow chart illustrating one example of outgoing message relay processing performed by an intermediate relay device in modified example 14 of the present embodiment;

FIG. 17A is a diagram illustrating one example of a routing table stored by an agent 121;

FIG. 17B is a diagram illustrating one example of a routing table stored by a collector 231;

FIG. 17C is a diagram illustrating one example of a routing table stored by a collector 241;

FIG. 17D is a diagram illustrating one example of a routing table stored by a collector 242;

FIG. 17E is a diagram illustrating one example of a routing table stored by a collector 221;

DETAILED DESCRIPTION

Figure 3A:
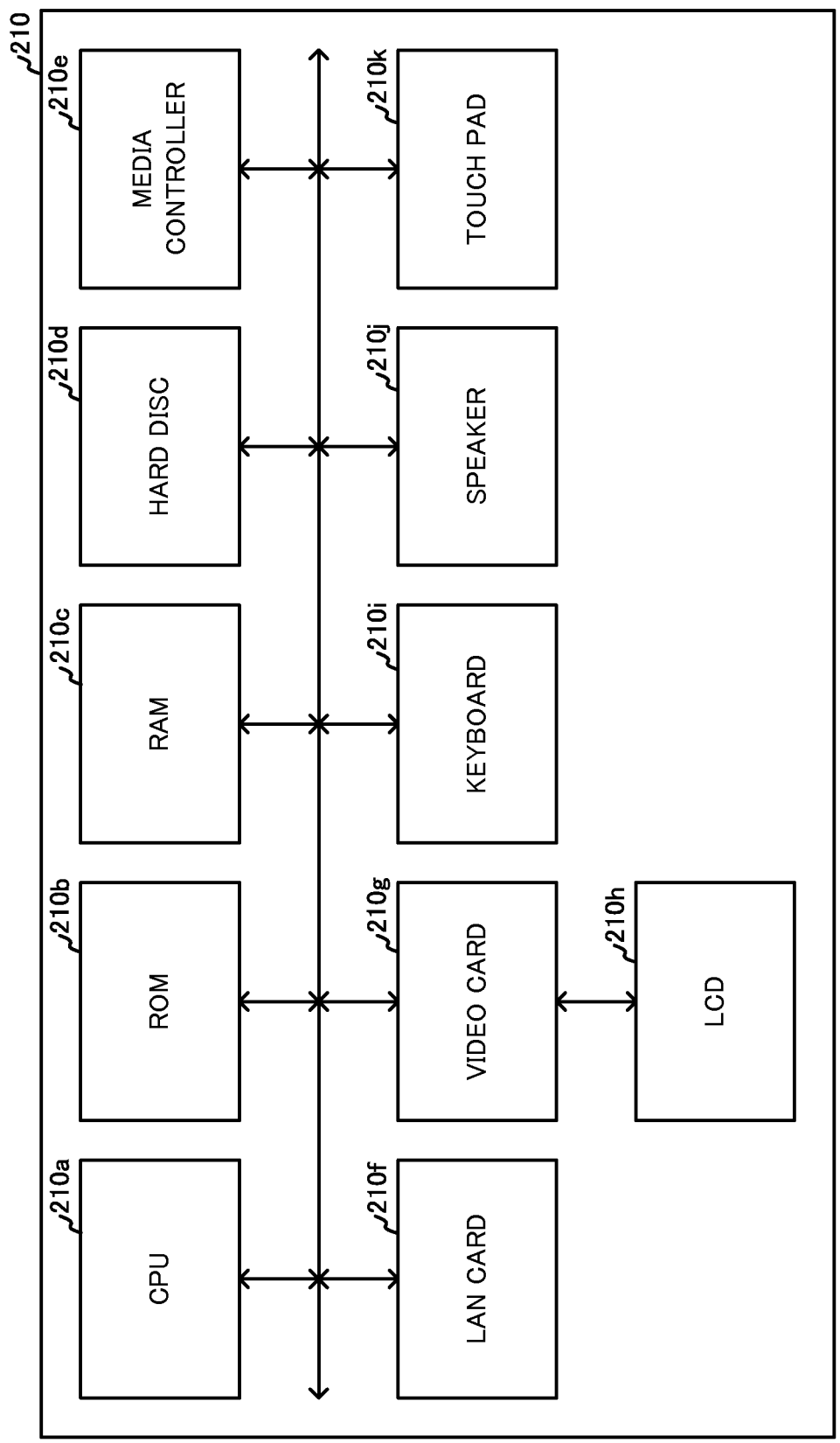
FIG. 3A is a hardware configuration diagram illustrating one configuration example of an intermediate relay device.

Hereinafter, embodiments of the present invention will be described with reference to drawings.

A communication system 1 according to an embodiment of the present invention is composed of transmitters/receivers 110, 120 and 130, intermediate relay devices 210, 220, 230 and 240, a final relay device 290 and a management server 300, as illustrated in FIG. 1.

The transmitter/receivers 110 to 130 are connected to a terminal device 11 via a communication network 10 such as the Internet. The transmitter/receivers 110 to 130 are servers that provide, for example, translation of documents, sale of goods, or services in response to a request transmitted from the terminal device 11, or provide a service such as an auction to a user of the terminal device 11.

The transmitter/receiver 110 is connected to the intermediate relay device 210 via a communication line L1. The intermediate relay device 210 is connected to the intermediate relay device 220 via a communication line L2. The intermediate relay device 220 is connected to the intermediate relay device 230 via a communication line L3 and to the final relay device 290 via a communication line L4. The transmitter/receiver 120 is connected to the intermediate relay device 230 via a communication line L5. The transmitter/receiver 130 is connected to the intermediate relay device 230 via a communication line L6. The intermediate relay device 230 is connected to the intermediate relay device 240 via a communication line L7. The intermediate relay device 240 is connected to the final relay device 290 via a communication line L8. The final relay device 290 is connected to the management server 300.

The transmitter/receivers 110 to 130 each transmit an outgoing message, including event data indicative of a change in the operation or state of the transmitter/receiver 110 to 130, to the management server 300 via any one or more of the intermediate relay devices 210 to 240, as well as via the final relay device 290.

In the present embodiment, event data indicates an event that occurs in providing a service. The transmitter/receivers 110 to 130 transmit, every time an event occurs, an outgoing message including event data indicative of the event that occurs. However, the timing to transmit an outgoing message is not limited to this. For example, the transmitter/receivers 110 to 130 may transmit an outgoing message in a predetermined cycle.

The intermediate relay devices 210 to 240 relay an outgoing message transmitted from the transmitter/receivers 110 to 130 to the final relay device 290. Next, the intermediate relay devices 210 to 240 relay a return message from the final relay device 290 to one of the transmitter/receivers 110 to 130 that has transmitted the outgoing message. The return message is data in response to the outgoing message and indicates that the final relay device 290 has received the outgoing message.

Upon receiving an outgoing message from the intermediate relay device 220 or 240, the final relay device 290 transmits a return message to one of the transmitter/receivers 110 to 130 that had transmitted the outgoing message as a final destination. Therefore, the final relay device 290 transmits the return message either of the intermediate relay devices 220 and 240 that had transmitted the outgoing message.

The management server 300 manages the operation and state of the transmitter/receivers 110 to 130, on the basis of an outgoing message received from the final relay device 290.

An explanation will now be given of an example case in which the outgoing message transmitted from the transmitter/receiver 110 is relayed through respective devices that are the intermediate relay device 210, and the intermediate relay device 220 in this order, and is then received by the final relay device 290. Since the final relay device 290 is the final destination for the outgoing message, it is also referred to as a final-stage relay device. In contrast, since the intermediate relay device 210 is a first device that relays the outgoing message transmitted from the transmitter/receiver 110, it is also referred to as a first-stage relay device. Moreover, the intermediate relay device 220 is located between the intermediate relay device 210 that is referred to as the first-stage relay device and the final relay device 290 that is referred to as the final-stage relay device in the outgoing route which is the relay route of the outgoing message. The intermediate relay device 220 is also referred to as an intermediate-stage relay device.

Likewise, an explanation will be also given of an example case in which the outgoing message transmitted from the transmitter/receiver 120 is relayed through respective devices that are the intermediate relay device 230, and the intermediate relay device 240 in this order, and is received by the final relay device 290. In this case, the final relay device 290 is referred to as the final-stage relay device, the intermediate relay device 230 is referred to as the first-stage relay device, and the intermediate relay device 240 is referred to as the intermediate-stage relay device.

On the other hand, an explanation will be further given of an example case in which the outgoing message transmitted from the transmitter/receiver 110 is relayed through respective devices that are the intermediate relay device 210, the intermediate relay device 220, the intermediate relay device 230, and the intermediate relay device 240 in this order, and is received by the final relay device 290. In this case, the final relay device 290 is referred to as the final-stage relay device, the intermediate relay device 210 is referred to as the first-stage relay device, and the intermediate relay devices 220, 230, and 240 are referred to as the intermediate-stage relay devices.

That is, it is determined which device is referred to as the first-stage relay device and which device is referred to as the intermediate-stage relay device among the intermediate relay devices 210, 220, 230, and 240 according with the route through which the outgoing message is transmitted.

Next, with reference to FIG. 2, the hardware configuration of the transmitter/receiver 110 will be described. The transmitter/receiver 110 is composed of a central processing unit (CPU) 110a, a read only memory (ROM) 110b, a random access memory (RAM) 110c, a hard disc 110d, a media controller 110e, a local area network (LAN) card 110f, a video card 110g, a liquid crystal display (LCD) 110h, a keyboard 110i, a speaker 110j and a touch pad 110k, as illustrated in FIG. 2.

The CPU 110a runs a program stored in the ROM 110b or on the hard disc 110d to control the whole of the transmitter/receiver 110. The RAM 110c temporarily stores data to be processed when the CPU 110a runs the program.

The hard disc 110d is an information storage part that stores a table containing various data. The transmitter/receiver 110 may include a flash memory, instead of the hard disc 110d.

The media controller 110e reads out various data and programs from a recording medium such as a flash memory, a compact disc (CD), a digital versatile disc (DVD), or a blue-ray disc (Registered Trademark).

The LAN card 110f transmits data to and receives data from the terminal device 11 and intermediate relay device 210 connected via the communication network 10. The keyboard 110i and touch pad 110k input a signal or information according to operation by a user.

The video card 110g draws (that is, renders) an image on the basis of a digital signal outputted from the CPU 110a, and outputs an image signal indicative of the drawn image. The LCD 110h displays an image according to the image signal outputted from the video card 110g. The transmitter/receiver 110 may include a plasma display panel (PDP) or an electroluminescence (EL) display, instead of the LCD 110h. The speaker 110j outputs voice or sound on the basis of a signal outputted from the CPU 110a.

The intermediate relay device 210 is, like the transmitter/receiver 110, composed of a CPU 210a, a ROM 210b, a RAM 210c, a hard disc 210d, a media controller 210e, a LAN card 210f, a video card 210g, an LCD 210h, a keyboard 210i, a speaker 210j and a touch pad 210k, as illustrated in FIG. 3A.

Figure 3B:
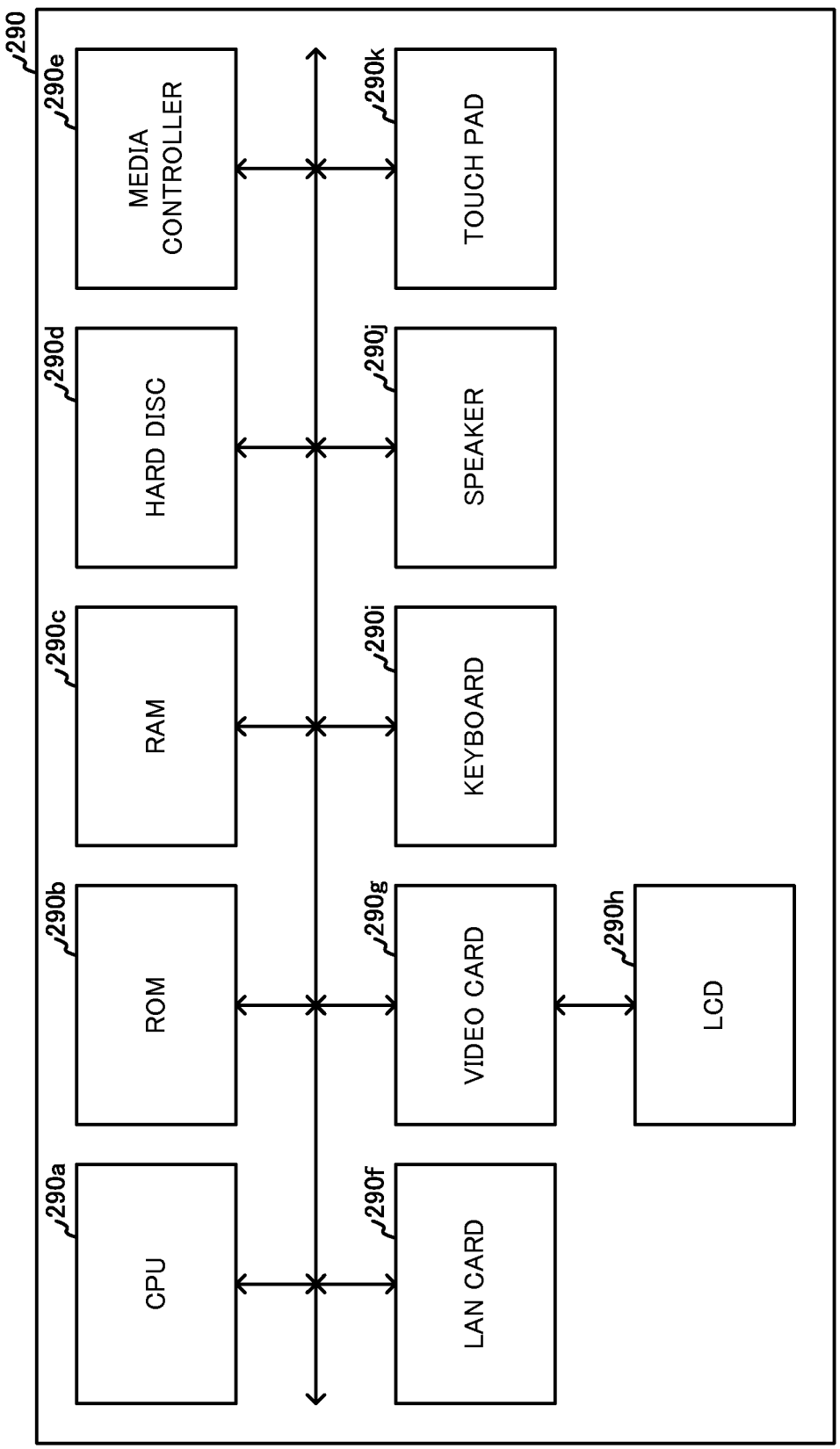
FIG. 3B is a hardware configuration diagram illustrating one configuration example of a final relay device.

The final relay device 290, like the intermediate relay device 210, is composed of a CPU 290a, a ROM 290b, a RAM 290c, a hard disc 290d, a media controller 290e, a LAN card 290f, a video card 290g, an LCD 290h, a keyboard 290i, a speaker 290j and a touch pad 290k, as illustrated in FIG. 3B. The management server 300 is similarly composed of a CPU and the like.

Figure 5:
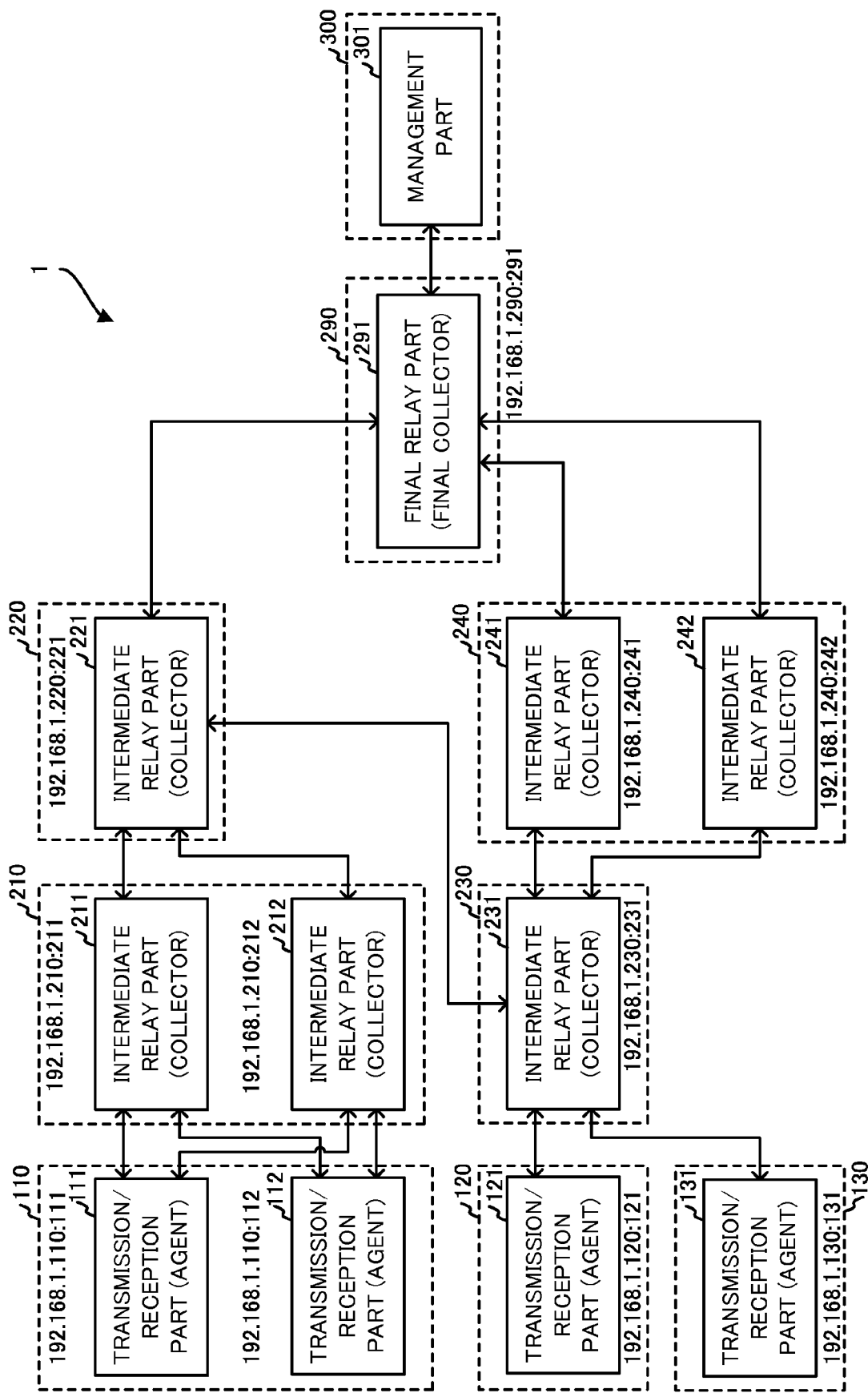
FIG. 5 is a diagram illustrating one example of a relay route.

The CPU 110a in the transmitter/receiver 110 illustrated in FIG. 2 runs a plurality of programs for performing data collection and transmission/reception processing in parallel as illustrated in FIG. 4A (hereinafter referred to as a data collection and transmission/reception program). This enables the CPU 110a to work with the hardware illustrated in FIG. 2, thereby functioning as transmission/reception sections (hereinafter also each transmission/reception sections are referred to as an agent) 111 and 112 as illustrated in FIG. 5.

To the LAN card 110f of the transmitter/receiver 110 is assigned IP address "192.168.1.110" as information for identifying the LAN card 110f on a network. The agent 111 transmits and receives data via No. "111" port, and the agent 112 transmits and receives data via No. "112" port. Therefore, even if one transmitter/receiver 110 simultaneously runs a plurality of data collection and transmission/reception programs, mix-up of data to be transmitted or received by the respective data collection and transmission/reception programs can be prevented.

Meanwhile, each of the transmitter/receivers 120 and 130 runs only one data collection and transmission/reception program. Therefore, CPUs of the transmitter/receivers 120 and 130 function as agents 121 and 131, respectively. To a LAN card of the transmitter/receiver 120 is assigned IP address "192.168.1.120", the agent 121 transmits and receives data via No. "121" port. To a LAN card of the transmitter/receiver 130 is assigned IP address "192.168.1.130" and the agent 131 transmits and receives data via No. "131" port.

The CPU 210a in the intermediate relay device 210 illustrated in FIG. 3A runs a plurality of relay programs to perform intermediate relay processing as illustrated in FIG. 6A in parallel for relaying outgoing messages and return messages. This enables the CPU 210a to work with the hardware illustrated in FIG. 3A, thereby functioning as intermediate relay sections (hereinafter each intermediate relay sections are referred to as a collector) 211 and 212 as illustrated in FIG. 5.

To the LAN card 210f is assigned IP address "192.168.1.210" as information for identifying the LAN card 210f on a network, the collector 211 transmits and receives data via No. "211" port, and the collector 212 transmits and receives data via No. "212" port. Therefore, even if the intermediate relay device 210 simultaneously runs a plurality of relay programs, mix-up of data to be transmitted or received by the respective relay programs can be prevented.

Similarly, since the intermediate relay device 240 runs two relay programs, a CPU of the intermediate relay device 240 functions as collectors 241 and 242. To a LAN card of the intermediate relay device 240 is assigned IP address "192.168.1.240", and the collectors 241 and 242 transmit and receive data via No. "241" and "242" ports, respectively.

Meanwhile, since the intermediate relay devices 220 and 230 runs only one relay program, CPUs of the intermediate relay devices 220 and 230 function as the collectors 221 and 231, respectively. To LAN cards of the intermediate relay devices 220 and 230 are assigned IP addresses "192.168.1.220" and "192.168.1.230", and the collectors 221 and 231 transmit and receive data via No. "221" and "231" ports, respectively.

Figure 7A:
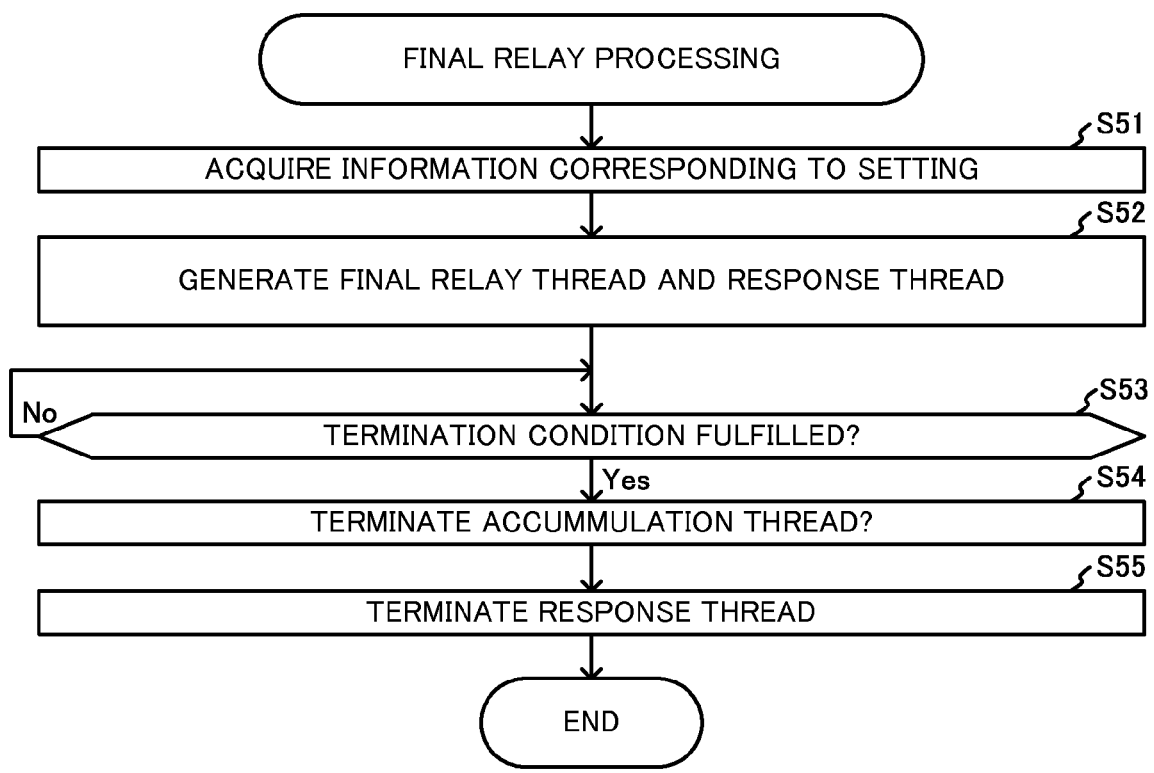
FIG. 7A is a flow chart illustrating one example of final relay processing performed by a final relay device.

The CPU 290a in the final relay device 290 illustrated in FIG. 3B runs a final relay program that performs final relay processing as illustrated in FIG. 7A for relaying event data included in an outgoing message to the management server 300. This enables the CPU 290a to work with the hardware illustrated in FIG. 3B, thereby functioning as a final relay part (hereinafter referred to as a final collector) 291 as illustrated in FIG. 5. To the LAN card 290f illustrated in FIG. 3B is assigned IP address "192.168.1.290", and the final collector 291 transmits and receives data via No. "291" port.

A CPU in the management server 300 performs software processing to function as a management part 301 as illustrated in FIG. 5. The management part 301 accumulates outgoing messages relayed from the final collector 291, and controls and manages operation and states of the agents 111 to 131 on the basis of the accumulated outgoing messages.

As illustrated in FIG. 1, the transmitter/receiver 110 is connected to the intermediate relay device 210. Therefore, as illustrated in FIG. 5, the agents 111 and 112 in the transmitter/receiver 110 can communicate with the collectors 211 and 212 in the intermediate relay device 210, respectively. And, since the intermediate relay device 210 is connected to the intermediate relay device 220, each of the collectors 211 and 212 in the intermediate relay device 210 can communicate with the collector 221 in the intermediate relay device 220. Similarly, the collector 221 in the intermediate relay device 220 can communicate with the collector 231 in the intermediate relay device 230 and the final collector 291 in the final relay device 290.

Further, each of the agent 121 in the transmitter/receiver 120 and the agent 131 in the transmitter/receiver 130 can communicate with the collector 231 in the intermediate relay device 230; and the collector 231 can communicate with the collector 221, as well as with the collectors 241 and 242 in the intermediate relay device 240. Still further, the collectors 241 and 242 can communicate with the final collector 291. The final collector 291 can communicate with the management part 301 in the management server 300.

Therefore, as a route used for relaying an outgoing message from the agent 111 to the final collector 291 (hereinafter referred to as an outgoing route), there are a plurality of routes such as a route passing through the collector 211 and then the collector 221 and a route passing through the collector 212 and then the collector 221. Due to the same reason, as a route used for relaying a return message from the final collector 291 to the agent 111 (hereinafter referred to as a return route), there are also a plurality of routes.

Description will be provided below assuming that an outgoing route used for relaying an outgoing message from the agent 111 to the final collector 291 has been previously set by an administrator of the communication system 1, and passes through the collector 211 and then the collector 221 as illustrated in FIG. 8A.

Upon starting data collection and transmission/reception processing illustrated in FIG. 4A, the CPU 110a functioning as the agent (that is, the transmission/reception part) 111 acquires information corresponding to setting "192.168.1.110:111" from, for example, an argument of a function (Step S01). This information corresponding to the setting is information in which information indicative of the IP address "192.168.1.110" assigned (that is set) to the LAN card 110f by an administrator of the communication system 1 is associated with information indicative of port No. "111" set to be used by the agent 111 for transmitting and receiving an outgoing message and a return message.

Next, the CPU 110a specifies information corresponding to setting "192.168.1.110:111" to an argument to generate a transmission thread for running an outgoing message transmission program and a receiving thread for running a return message receiving program (Step S02). After that, the CPU 110a determines whether or not a predetermined termination condition, such as inputting of a shutdown command, is fulfilled (Step S03). If it is determined that the termination condition is not fulfilled (Step S03; No), the CPU 110a will repeat Step S03 after a predetermined time has passed.

If it is determined that the termination condition is fulfilled (Step S03; Yes), the CPU 110a terminates the transmission thread, for example, by transmitting a KILL signal (Step S04), then similarly terminates the receiving thread (Step 505) and after that terminates data collection and transmission/reception processing.

Figure 9:
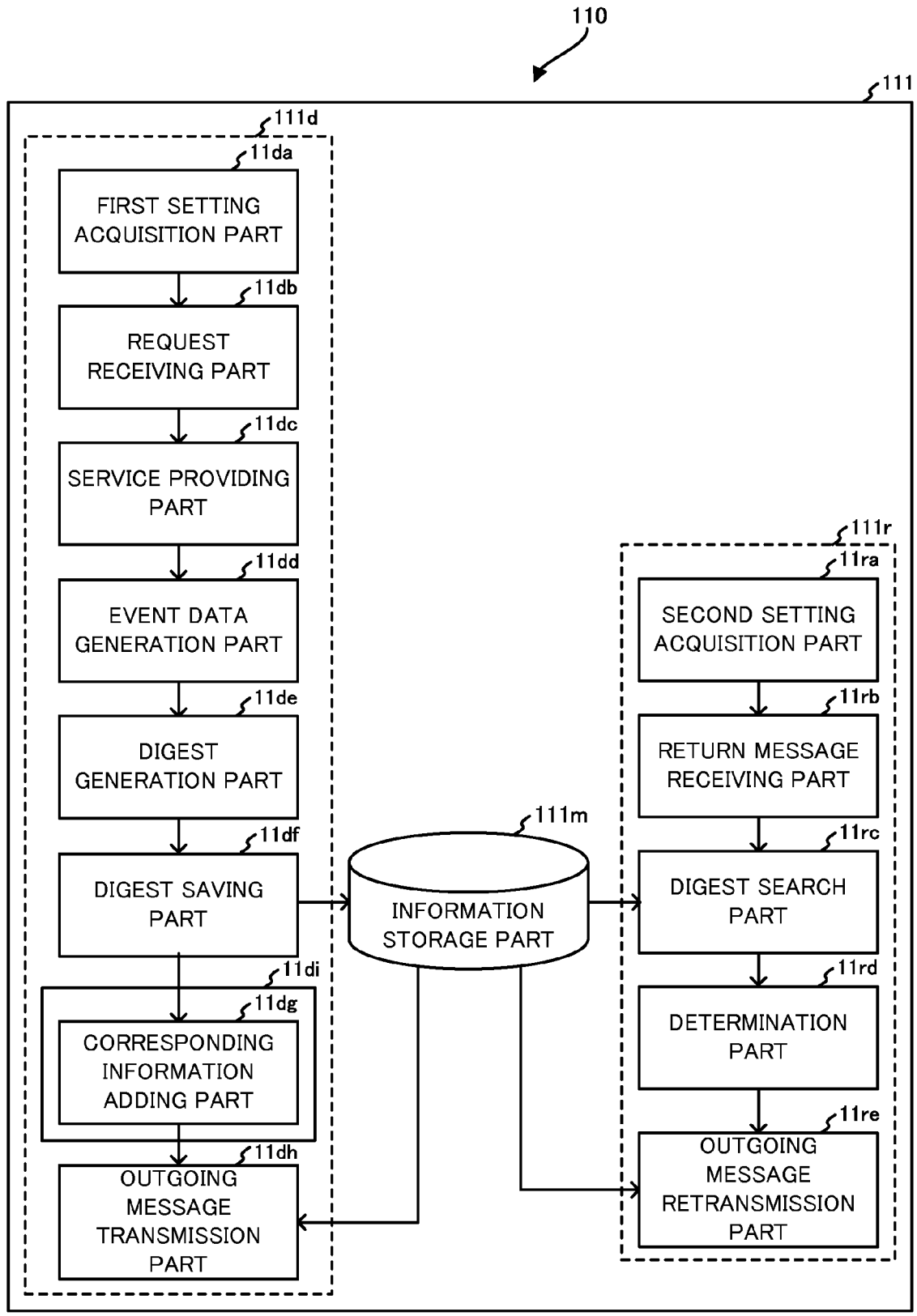
FIG. 9 is a functional block diagram illustrating one configuration example of an agent.

In the transmission thread, the CPU 110a functioning as the agent 111 works with the hardware illustrated in FIG. 2 to perform outgoing message transmission processing as illustrated in FIG. 4B. This enables the CPU 110a to function as an outgoing message transmission part (hereinafter referred to as a distributer) 111d as illustrated in FIG. 9. The distributer 111d has a first setting acquisition part 11da, a request receiving part 11db, a service providing part 11dc, an event data generation part 11dd, a digest generation part 11de, a digest saving part 11df, an outgoing message generation part 11di including a corresponding information adding part 11dg, and an outgoing message transmission part 11dh. The CPU 110a functioning as the agent 111 works with the hard disc 110d to function as an information storage part 111m. Performance of the receiving thread will be described later.

In the transmission thread, after outgoing message transmission processing is started, the first setting acquisition part 11da in the agent 111 acquires information corresponding to setting "192.168.1.110:111" from an argument (Step S11). Next, the first setting acquisition part 11da determines whether or not to terminate the thread, for example, on the basis of whether or not a KILL signal is received (Step S12).

If it is determined that the thread is not terminated (Step S12; No), the request receiving part 11db receives a request for supply of a service from the terminal device 11 (Step S13). After that, the service providing part 11dc provides the service to a user of the terminal device 11, in response to the request (Step S14).

Next, the event data generation part 11dd determines whether or not any event occurs during the period between the last transmission of event data and the present time (Step S15). An event to be determined at Step S15 includes, for example, an occurrence of an error in provision of a service, but is not limited to this. Any event may be determined at Step S15 as long as the event relates to a change of operation or state of the transmitter/receiver 110.

At Step S15, if it is determined that an event did not occur (Step S15; NO), the above processing will be repeated from Step S12. If it is determined that an event occurred (Step S15; Yes), the event data generation part 11dd generates, as illustrated in FIG. 8B, event data DE indicative of the event, and makes the event data DE together with information for identifying the event data DE (hereinafter referred to as data ID) into an outgoing message (Step S16).

Figure 8B:
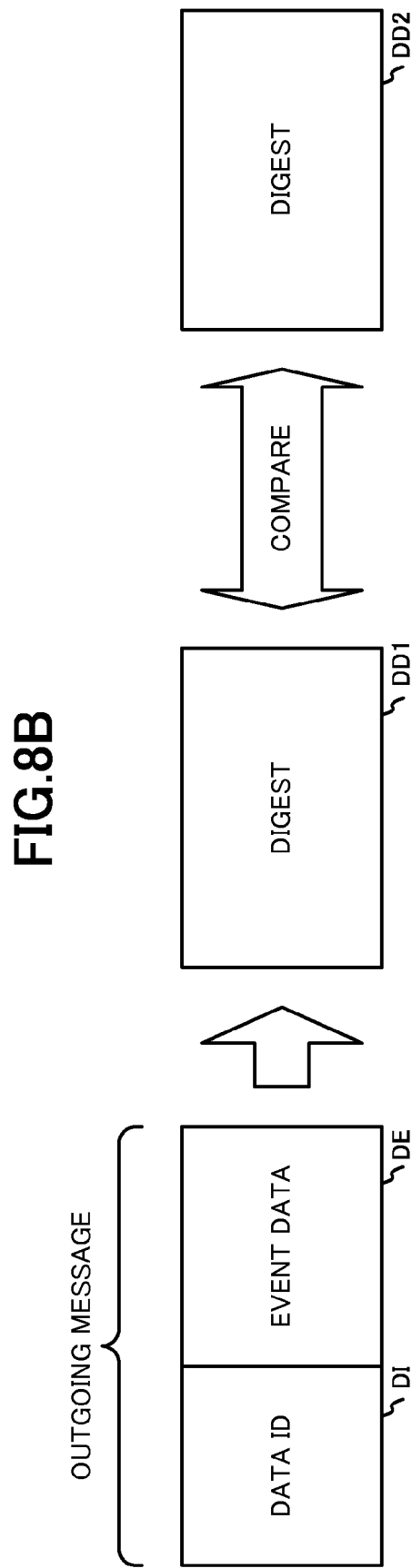
FIG. 8B is a diagram illustrating one example of an outgoing message generated by an agent.

After that, the digest generation part 11de generates a digest DD1 of the event data DE as illustrated in FIG. 8B, according to an algorithm previously set by the administrator of the communication system 1 (Step S17). In the present embodiment, the digest generation part 11de generates an error detection code of event data DE as a digest DD1. Specifically, the digest generation part 11de calculates the sum of the least significant single bit of respective one-byte data composing an outgoing message to calculate the checksum of the outgoing message as an error detection code. However, an error detection code is not limited to this, and the digest generation part 11*de* may calculate a parity code, cyclic code or hash value of an outgoing message, as an error detection code.

Next, the digest saving part 11*df* associates the outgoing message (that is, the data ID and event data DE) with the digest DD1 of the outgoing message and saves them into the information storage part 111*m* illustrated in FIG. 9 (Step S18).

After that, the corresponding information adding part 11 dg adds, information "0:192.168.1.110:111" in which information indicative of the number of times of relaying the outgoing message "0" is associated with information corresponding to the setting acquired at Step S11, to a corresponding information list DL1 that is to store one or more pieces of information corresponding to a program that has transmitted or relayed an outgoing message, as illustrated in FIG. 8C. After that, the corresponding information adding part 11*dg* adds the corresponding information list DL1 to the end of the outgoing message (Step S19). Note that the outgoing message transmitted from the transmitter/receiver 110 is hereinafter referred to as a first outgoing message.

Next, the outgoing message transmission part 11*dh* specifies the final collector 291 in the final relay device 290 as a final destination and transmits the first outgoing message thereto. At this time, the outgoing message transmission part 11*dh* reads out, from the information storage part 111*m*, information in which IP address "192.168.1.210" of the intermediate relay device 210 in which the collector 211 operates is associated with port No. "211" used for communication by the collector 211. That is because the collector 211 is a transmission destination previously set by the administrator of the communication system 1 in order to eventually transmit the outgoing message to the final collector 291. Next, the outgoing message transmission part 11*dh* specifies IP address "192.168.1.210" and port No. "211" and transmits the first outgoing message thereto (Step S20). At this time, the outgoing message transmission part 11*dh* repeats transmission of the first outgoing message a predetermined number of times until it receives ACK (acknowledgement) from the transmission destination. After that, the above processing is repeated from Step S12.

At Step S12, if the first setting acquisition part 11*da* determines that the thread will be terminated (Step S12; Yes), the outgoing message transmission processing will be terminated.

Upon starting intermediate relay processing illustrated in FIG. 6A, the CPU 210*a* functioning as the collector (that is, the intermediate relay part) 211 acquires information corresponding to setting "192.168.1.210:211" from, for example, an argument of a function (Step S31). This information corresponding to setting "192.168.1.210:211" is information in which information indicative of IP address "192.168.1.210" set to the LAN card 210*f* by the administrator of the communication system 1 is associated with information indicative of port No. "211" used by the collector 211 for transmitting and receiving an outgoing message and a return message.

Next, the CPU 210*a* specifies information corresponding to setting "192.168.1.210:211" as an argument to generate an outgoing route relay thread that performs a program for relaying an outgoing message (hereinafter referred to as an outgoing message relay program), and a return route relay thread that performs a program for relaying a return message (hereinafter referred to as a return message relay program) (Step S32). After that, the CPU 210*a* determines whether or not a predetermined termination condition is fulfilled (Step S33). If it is determined that the termination condition is not fulfilled (Step S33; NO), the CPU 210*a* will repeat Step S33 after a predetermined time has passed.

Meanwhile, if it is determined that the termination condition is fulfilled (Step S33; Yes), the CPU 210*a* terminates the outgoing route relay thread (Step S34) and then the return route relay thread (Step S35), and after that terminates intermediate relay processing.

Figure 10:
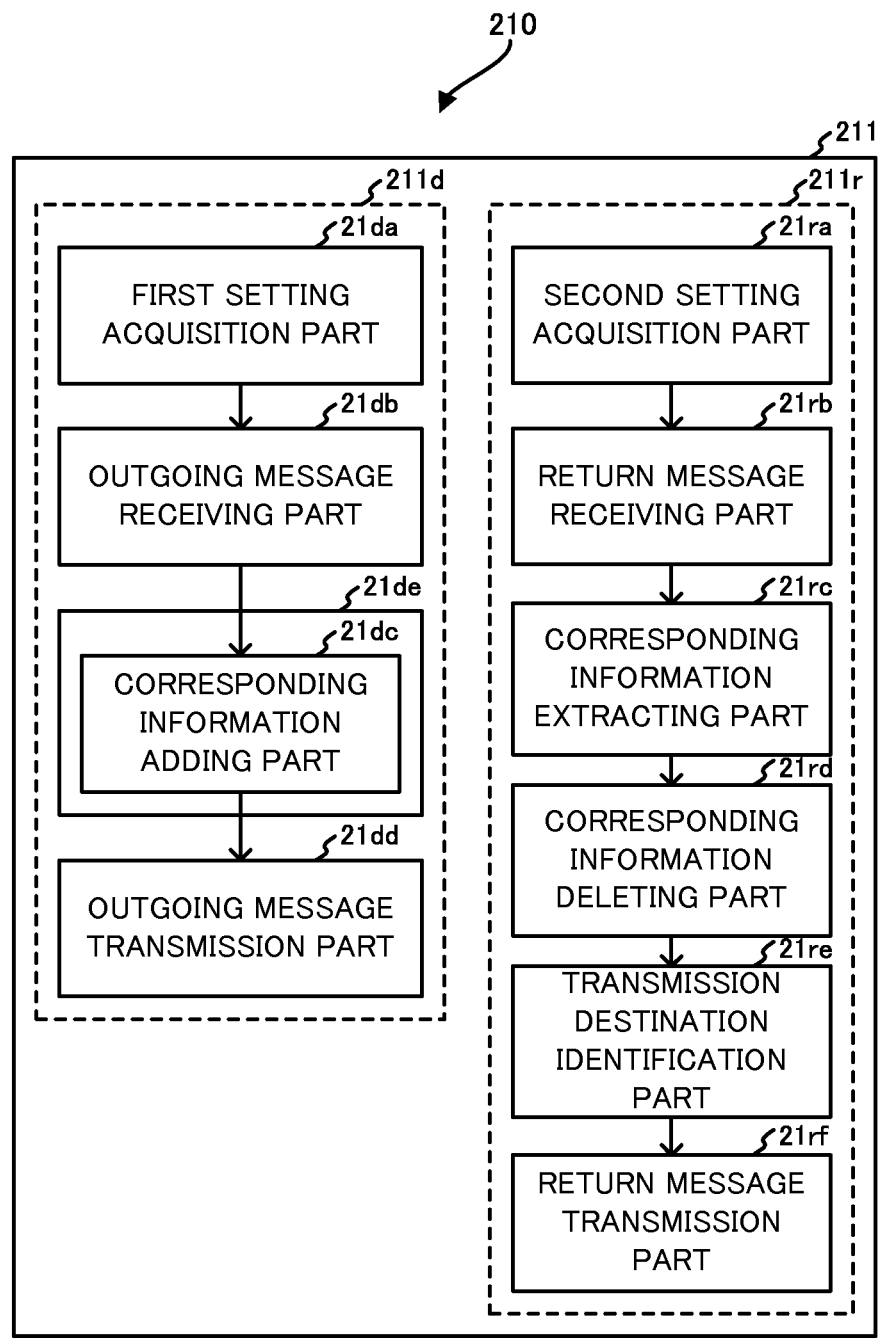
FIG. 10 is a functional block diagram illustrating one configuration example of a collector.

In the outgoing route relay thread, the CPU 210*a* functioning as the collector 211 works with the hardware illustrated in FIG. 3A to perform outgoing message relay processing as illustrated in FIG. 6B. This enables the CPU 210*a* to function as an outgoing message relay part (hereinafter referred to as a distributer) 211*d* as illustrated in FIG. 10. The distributer 211*d* has a first setting acquisition part 21*da*, an outgoing message receiving part 21*db*, an outgoing message regeneration part 21*de* including a corresponding information adding part 21*dc*, and an outgoing message transmission part 21*dd*. Performance of a return route relay thread will be described later.

After outgoing message relay processing is started in an outgoing route relay thread, the first setting acquisition part 21*da* in the collector 211 acquires information corresponding to setting "192.168.1.210:211" from an argument (Step S41). Next, the first setting acquisition part 21*da* determines whether or not the thread is terminated on the basis of, for example, whether or not a KILL signal has been received (Step S42).

At this time, if it is determined that the thread is not terminated (Step S42; No), the outgoing message receiving part 21*db* receives the first outgoing message from the agent 111 via a set No. "211" port (hereinafter referred to as a set port) (Step S43). Next, the corresponding information adding part 21*dc* extracts, as data indicative of the corresponding information list DL1, data "192.168.1.110:111" from just below a predetermined data range storing data ID and event data DE of the first outgoing message to the end of the outgoing message.

Next, the corresponding information adding part 21*dc* calculates a value obtained by adding a value "1" to the maximum number of times of relay "0" included in the corresponding information list DL1 "0:192.168.1.110:111" of the outgoing message. After that, the corresponding information adding part 21*dc* generates information "1:192.168.1.210:211" in which information indicative of the calculated number of times of relay "1" (that is, the total number of times of relay of the outgoing message when the collector 211 has finished transmission of the outgoing message) is associated with information corresponding to setting "192.168.1.210:211". Next, the corresponding information adding part 21*dc* adds information "1:192.168.1.210:211" to the end of the corresponding information list DL1 "0:192.168.1.110:111". After that, the corresponding information adding part 21*dc* adds the corresponding information list DL1 below to event data DE of the outgoing message, as illustrated in FIG. 8D (Step S45). Note that the outgoing message transmitted by the collector 211 of the intermediate relay device 210 is hereinafter referred to as a second outgoing message.

After performing Step S45, the outgoing message transmission part 21*dd* transmits the second outgoing message while specifying the final collector 291 as a final destination. At this time, the outgoing message transmission part 21*dd* reads out information, in which IP address "192.168.1.220" of the intermediate relay device 220 in which the collector 221 operates is associated with port No. "221" used by a collector 220 for communication, from the hard disc 210*d*. That is because the collector 221 is a transmission destination that was previously set by an administrator of the communication system 1. Next, the outgoing message transmission part 21*dd* specifies IP address "192.168.1.220" and port No. "221" and transmits the second outgoing message thereto (Step S46). At this time, the outgoing message transmission part 21*dd* repeatedly transmits the second outgoing message a predetermined number of times until it receives ACK from the transmission destination. After that, the above processing is repeated from Step S42.

If the first setting acquisition part 21*da* determines that the thread is terminated at Step S42 (Step S42; Yes), outgoing message relay processing is terminated.

Like the collector 211 of the intermediate relay device 210 that is referred to as the first-stage relay device, the collector 221 of the intermediate relay device 220 that is referred to as the intermediate-stage relay device performs intermediate relay processing. Accordingly, as illustrated in FIG. 8E, the collector 221 adds information "2:192.168.1.220:221" in which information indicative of the number of times of relay "2" is associated with information corresponding to setting to the end of the corresponding information list DL1 "0:192.168.1.110:111,1:192.168.1.210:211" of the second outgoing message as illustrated in FIG. 8E. Next, the collector 221 specifies, like the collector 211, IP address "192.168.1.290" and port No. "291" and transmits the second outgoing message to which the information corresponding to the setting of itself and the number of times of relay are added.

That is, the corresponding information adding part 21*dc* of the collector 211 of the first-stage relay device adds the information corresponding to the setting of the collector 211 and information indicating the number of times of relay to the corresponding information list DL1 of the first outgoing message received by the outgoing message receiving part 21*db* illustrated in FIG. 10. Hence, the outgoing message regeneration part 21*de* having the corresponding information adding part 21*dc* generates the second outgoing message.

On the other hand, a part corresponding to the corresponding information adding part 21*dc* of the collector 221 of the intermediate-stage relay device adds the information corresponding to the setting to the collector 221 and the information indicating the number of times of relay to the corresponding information list DL1 of the second outgoing message received by a part corresponding to the outgoing message receiving part 21*db*. Hence, a part corresponding to the outgoing message regeneration part 21*de* having a part corresponding to the corresponding information adding part 21*dc* of the collector 221 regenerates the second outgoing message.

As explained above, the corresponding information adding part 21*dc* of the first-stage relay device and a part of the intermediate-stage relay device corresponding to the corresponding information adding part 21*dc* have the same configuration and function except that a message to which the information corresponding to the setting and the information indicating whether the number of times of relay that has been added is different.

Moreover, the outgoing message regeneration part 21*de* of the collector 211 of the first-stage relay device includes only the corresponding information adding part 21*dc*, and a part corresponding to the outgoing message regeneration part 21*de* of the collector 221 of the intermediate-stage relay device includes only a part corresponding to the corresponding information adding part 21*dc*. Hence, the outgoing message regeneration part 21*de* of the first-stage relay device and the corresponding information adding part 21*dc* thereof, a part of the intermediate-stage relay device corresponding to the outgoing message regeneration part 21*de* and a part of the intermediate-stage relay device corresponding to the corresponding information adding part 21*dc* have the same configuration and function, respectively.

Upon starting final relay processing illustrated in FIG. 7A, the CPU 290*a* functioning as the final collector (that is final relay part) 291 acquires information indicative of port No. "291" set by an administrator of the communication system 1 so as to be used by the final collector 291 for transmitting and receiving an outgoing message and a return message from, for example, an argument of a function (Step S51).

Next, the CPU 290*a* specifies information indicative of port No. "291" as an argument to generate a response thread for running a program that transmits a return message in response to the outgoing message (hereinafter referred to as an outgoing message response program), and an accumulation thread for running a program that accumulates the outgoing message in a final relay device 300 (hereinafter referred to as an outgoing message accumulation program) (Step S52). After that, the CPU 290*a* determines whether or not a predetermined termination condition is fulfilled (Step S53). If it is determined that the termination condition is not fulfilled (Step S53; NO), the CPU 210*a* will repeat Step S53 after a predetermined time has passed.

If it is determined that the termination condition is fulfilled (Step S53; YES), the CPU 290*a* terminates the accumulation thread (Step S54) and then the response thread (Step S55), and after that terminates final relay processing.

Figure 11:
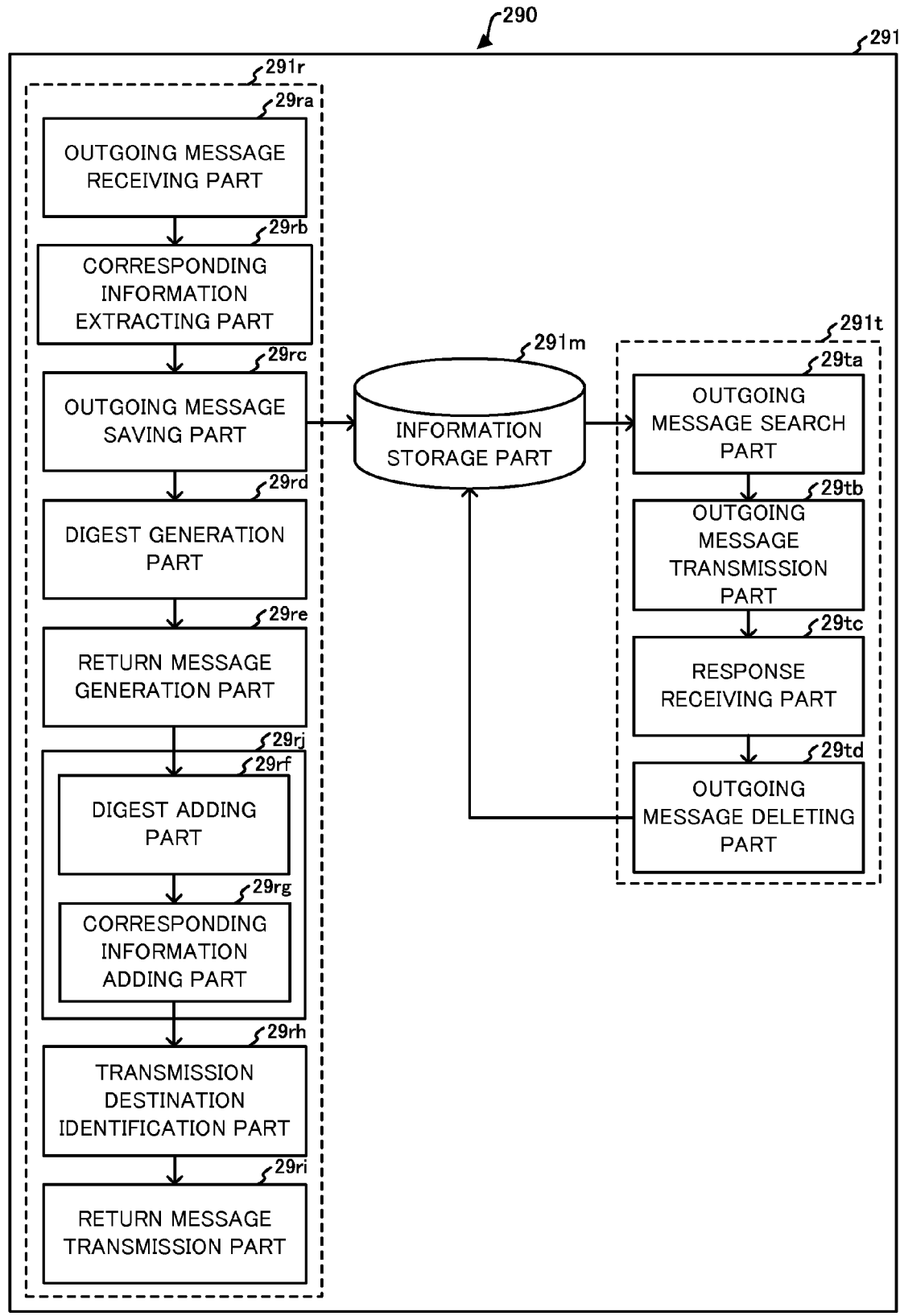
FIG. 11 is a functional block diagram illustrating one configuration example of a final collector.

The CPU 290*a* functioning as the final collector 291, in a response thread, works with the hardware illustrated in FIG. 3B to perform outgoing message response processing as illustrated in FIG. 7B. This enables the CPU 290*a* to function as a response part 291*r* as illustrated in FIG. 11. The response part 291*r* includes an outgoing message receiving part 29*ra*, a corresponding information extracting part 29*rb*, an outgoing message saving part 29*rc*, a digest generation part 29*rd*, a response message generation part 29*re*, an outgoing message generation part 29*rj* including a digest adding part 29*rf* and a corresponding information adding part 29*rg*, a transmission destination identification part 29*rh* and a return message transmission part 29*ri*. The CPU 290*a* works with the hard disc 290*d* to function as an information storage part 291*m*. Performance of an accumulation thread will be described later.

After outgoing message response processing is started in a response thread, the outgoing message receiving part 29*ra* in the final collector 291 acquires port No. "291" from an argument of a function. Next, the outgoing message receiving part 29*ra* determines whether or not to terminate the thread, on the basis of, for example, whether or not a KILL signal has been received (Step S61).

If it is determined that the thread is not terminated (Step S61; No), the outgoing message receiving part 29*ra* receives the second outgoing message via port No. "291" from the collector 221 (Step S62). Next, the corresponding information extracting part 29*rb* extracts the corresponding information list LD1 "0:192.168.1.110.111:112,1:192.168.1.210: 211,2:192.168.1.220:221" from the second outgoing message (Step S63).

Next, the outgoing message saving part 29*rc* extracts corresponding information "192.168.1.110:111" associated with information indicative of the number of times of relay "0" from the corresponding information list LD1. After that, the outgoing message saving part 29*rc* specifies the extracted corresponding information as the corresponding information of the agent 110 (that is, a final destination for a return message). Next, the outgoing message saving part 29*rc* saves the corresponding information of the agent 110 and event data DE included in the outgoing message in association with each other in the information storage part 291*m* (Step S64).

Next, the digest generation part 29*rd* generates a digest DD2 of the event data DE included in the outgoing message according to the same algorithm as an algorithm previously set for the agent 111 by an administrator of the communication system 1 (Step S65).

After that, the response message generation part 29*re* generates a response message that includes data ID included in the outgoing message as ACK indicating that the final collector 291 has received a second outgoing message (Step S66). Next, the digest adding part 29*rf* adds the digest DD2 generated at Step S65 to the end of the response message, as illustrated in FIG. 8F (Step S67).

Next, the destination identification part 29*rh* employs a reversed route of the outgoing route, as a relay route (that is, a return route) used for transmitting the return message to the agent 111. The outgoing route used for transmitting the outgoing message from the agent 111 to the final collector 291 has been described as a route in which the collector 211 relays the outgoing message and then the collector 221 relays the outgoing message. The destination identification part 29*rh* employs, as a return route, a route in which the collector 221 relays the return message and then the collector 211 relays the return message.

That is because the collectors 211 and 221 that relayed the outgoing message (that is, the collectors 211 and 221 on the outgoing route) often have a relay function in transmitting the return message too, and communication lines L1, L2 and L4 used for relaying the outgoing message (that is, a communication line on the outgoing route) often can communicate in transmitting the return message too.

Therefore, the corresponding information adding part 29*rg* sorts the corresponding information list LD1 extracted at Step S63 in descending order of the number of times of relay, as illustrated in FIG. 8F (Step S68). Next, the corresponding information adding part 29*rg* adds a sorted corresponding information list DL2 to the end of the response message (Step S69). As explained above, the outgoing message generation part 29*rj* adds the digest DD2 and the already-sorted corresponding information list DL2 to the response message, thereby generating an outgoing message.

After that, the destination identification part 29*rh* identifies corresponding information "192.168.1.220:221" at the beginning of the sorted corresponding information list DL2 "2:192.168.1.220:221,1:192.168.1.210:211,0: 192.168.1.110:111" as information indicative of IP address "192.168.1.220" and port No. "221" of a subsequent transmission destination (Step S70). Next, the return message transmission part 29*ri* specifies IP address "192.168.1.220" and port No. "221" and transmits the return message with designating the agent 111 as a final destination. (Step S71). At this time, the return message transmission part 29*ri* repeatedly transmits the return message a predetermined number of times until it receives ACK from the collector 221 that is the transmission destination. After that, the above processing will be repeated from Step S61.

The CPU 290*a* functioning as the final collector 291, in an accumulation thread, works with the hardware illustrated in FIG. 3B to perform outgoing message accumulation processing as illustrated in FIG. 7C. This enables the CPU 290*a* to function as a message accumulation part 291*t* as illustrated in FIG. 11. The message accumulation part 291*t* has an outgoing message search part 29*ta*, an outgoing message transmission part 29*tb*, a response receiving part 29*tc* and an outgoing message deleting part 29*td*.

After outgoing message accumulation processing is started in the accumulation thread, the outgoing message search part 29*ta* in the final collector 291 determines whether or not to terminate the thread, on the basis of, for example, whether or not it has received a KILL signal (Step S81). If the outgoing message search part 29*ta* determines that the thread is not terminated (Step S81; No), the outgoing message search part 29*ta* searches for an outgoing message that has not been relayed to the management part 301 (hereinafter referred to as an unrelayed outgoing message) from the information storage part 291*m* (Step S82).

Next, the outgoing message transmission part 29*tb* transmits a searched unrelayed outgoing message and corresponding information associated with the unrelayed outgoing message to the management part 301 (Step S83). After that, the outgoing message deleting part 29*td* deletes the outgoing message and corresponding information from the information storage part 291*m* (Step S85). After that, the above processing will be repeated from Step S81.

If the outgoing message search part 29*ta* determines that the thread is terminated at Step S81 (Step S81; Yes), the outgoing message search part 29*ta* terminates outgoing message accumulation processing.

The collector 221 performs the same processing as processing performed by the collector 211 that will be described later. In this processing, after the collector 221 receives a return message, the collector 221 deletes information corresponding to setting "192.168.1.220:221" of the collector 221 and information indicative of the number of times of relay "2" associated with the information from the corresponding information list DL2 of the return message, as illustrated in FIG. 8G. After that, the collector 221 specifies information corresponding to setting "192.168.1.210:211" at the beginning of the corresponding information list DL2 as information corresponding to the setting of a collector that has relayed an outgoing message at the immediate prior stage to the collector 221. After that, the collector 221 specifies the specified information corresponding to the setting, and transmits a return message to the collector 211. At this time, the collector 221 repeatedly transmits the return message a predetermined number of times until it receives ACK from the transmission destination.

The CPU 210*a* functioning as the collector 211, in a return route relay thread, works with the hardware illustrated in FIG. 3A to perform return message relay processing as illustrated in FIG. 6C. This enables the CPU 210*a* to function as a return message relay part (hereinafter referred to as a receiver) 211*r* as illustrated in FIG. 10. The receiver 211*r* has a second setting acquisition part 21*ra*, a return message receiving part 21*rb*, a corresponding information extracting part 21*rc*, a corresponding information deleting part 21*rd*, the transmission destination identification part 21*re* and a return message transmission part 21*rf*.

After, in a return route relay thread, return message relay processing is started, the second setting acquisition part 21*ra* in the collector 211 acquires information corresponding to setting "192.168.1.210:211" from an argument (Step S91). Next, the second setting acquisition part 21*ra* determines whether or not to terminate the thread on the basis of, for example, whether or not a KILL signal has been received (Step S92).

If it is determined that the thread is not terminated (Step S92; No), the return message receiving part 21*rb* receives the return message from the collector 221 via a set port with No. "211" (Step S93). Next, the corresponding information extracting part 21*rc* extracts the corresponding information list DL2 from the return message (Step S94).

After that, the corresponding information deleting part 21*rd* deletes information corresponding to setting "192.168.1.210:211" and information indicative of the number or times of relay "1" from the corresponding information list DL2 of the return message (Step S96). After that, the transmission destination identification part 21*re*, like the final collector 291, identifies the reverse route of the outgoing route as a return route. After that, the transmission destination identification part 21*re* identifies information indicative of IP address and port No. of the transmission destination of the reverse route of the outgoing route, on the basis of the corresponding information list DL2 (Step S97). Specifically, the transmission destination identification part 21*re* identifies corresponding information "192.168.1.110:111" at the beginning of the corresponding information list DL2 as the setting correspondence of a device located at an immediate prior stage to the collector 221 with reference to the agent 111 in the outgoing route. That is, the transmission destination identification part 21*re* identifies corresponding information "192.168.1.110:111" at the beginning of the corresponding information list DL2 as the corresponding information of an intermediate relay device that has most recently relayed the outgoing message of the corresponding information among the pieces of the corresponding information in the corresponding information list DL2. This is because the device that has most recently relayed the outgoing message in the corresponding information list DL2 is a device that has transmitted or relayed the outgoing message at the immediate prior stage to the collector 211 with reference to the agent in the outgoing route. Therefore, the transmission destination identification part 21*re* identifies IP address "192.168.1.110" of the device, as well as port No. "111" used for transmitting or relaying the outgoing message by a program run by the device as IP address and port No. of the transmission destination.

After that, the return message transmission part 21*rf* specifies IP address "192.168.1.110" and port No. "111" and transmits the return message (Step S98). At this time, the return message transmission part 21*rf* repeatedly transmits the return message a predetermined number of times until it receives ACK from the transmission destination. After that, the above processing will be repeated from Step S92.

The CPU 110*a* functioning as the agent 111, in the receiving thread, works with the hardware illustrated in FIG. 2 to perform return message receiving processing as illustrated in FIG. 4C. This enables the CPU 110*a* to function as a return message receiving part (hereinafter also referred to as a receiver) 111*r* as illustrated in FIG. 9. The receiver 111*r* has a second setting acquisition part 11*ra*, a return message receiving part 11*rb*, a digest search part 11*rc*, a determination part 11*rd* and an outgoing message retransmission part 11*re*.

After return message receiving processing is started in the receiving thread, the second setting acquisition part 11*ra* in the agent 111 acquires information corresponding to setting "192.168.1.110:111" from an argument (Step S101). Next, the second setting acquisition part 11*ra* determines whether or not to terminate the thread, on the basis of, for example, whether or not a KILL signal has been received (Step S102).

If it is determined that the thread is not terminated (Step S102; No), the return message receiving part 11*rb* receives the return message as illustrated in FIG. 8H from the collector 211 via a port with No. "111" (Step S103). After that, the digest search part 11*rc* extracts data ID and the digest DD2 from the return message as illustrated in FIG. 8I (Step S104). Next, the digest search part 11*rc* searches the digest DD1 associated with data ID extracted at Step S104 from the information storage part 111*m* (Step S105).

After that, the determination part 11*rd* determines whether or not the digest DD1 searched (hereinafter referred to as a searched digest) at Step S105 is identical to the digest DD2 extracted (hereinafter referred to as an extracted digest) at Step S104 (Step S106).

If the determination part 11*rd* determines that the searched digest DD1 is identical to the extracted digest DD2 (Step S106; Yes), the determination part 11*rd* determines that the outgoing message has correctly reached the final collector 291. After that, the above processing will be repeated from Step S102.

If the determination part 11*rd* determines that the searched digest DD1 is not identical to the extracted digest DD2 (Step S106; No), the determination part 11*rd* determines that the outgoing message has not correctly reached the final collector 291. Next, the outgoing message retransmission part 11*re* acquires IP address and port No. of a predetermined transmission destination from the information storage part 111*m*. Next, the outgoing message retransmission part 11*re* searches event data associated with the data ID extracted at Step S104 from the information storage part 111*m*. After that, the outgoing message retransmission part 11*re* retransmits to the final collector 291 as a final destination a first outgoing message composed of data ID, event data, and the corresponding information list DL1 including the information corresponding to the setting of the agent 111. At this time, the outgoing message retransmission part 11*re* specifies IP address and port No. of a transmission destination and retransmits the outgoing message (Step S107). At this time, the outgoing message retransmission part 11 repeatedly transmits a return message a predetermined number of times until it receives ACK from the transmission destination. After that, the above processing will be repeated from Step S102.

If the second setting acquisition part 11*ra* determines that the thread is terminated at Step S102 (Step S102; Yes), return message receiving processing is terminated.

According to these configurations, In case the outgoing message transmitted from the transmitter/receiver 110 is relayed by the intermediate relay devices 210 and 220 in sequence, and is transmitted to the final relay device 290, the final relay device 290 is referred to as the final-stage relay device. The final relay device 290 referred to as the final-stage relay device transmits the return message with the transmitter/receiver 110 being as the final destination based on the addresses which are included in the corresponding information list DL2 of the outgoing message and which are "192.168.1.110", "192.168.1.210" and "192.168.1.220" of devices that has transmitted or relayed the outgoing message. The intermediate relay devices 210 and 220 that relayed the outgoing message have a higher probability of fulfilling the message relay function in relaying the return message than the intermediate relay devices 230 and 240 that did not relay the outgoing message. The communication line L1, L2 and L3 used for relaying the outgoing message have a higher probability of being able to communicate in relaying the return message. Therefore, retransmission in relaying the return message can be prevented, thereby improving the efficiency of relaying a message and reducing communication cost.

According to these configurations, in the above-explained case, the intermediate relay device 210 is referred to as a first-stage intermediate relay device. The intermediate relay device 210 referred to as the first-stage intermediate relay device transmits the return message to the transmitter/receiver 110 based on the address "192.168.1.110" that has been included in the corresponding information list DL2 of the return message. Hence, the return message can be very likely transmitted to the transmitter/receiver 110 that has transmitted the outgoing message.

According to these configurations, in the above-explained case, the intermediate relay device 210 is referred to as the first-stage intermediate relay device, while the intermediate relay device 220 is referred to as an intermediate-stage intermediate relay device. The intermediate relay device 220 referred to as the intermediate-stage intermediate relay device transmits the return message to the intermediate relay device 210 based on the addresses "192.168.1.110", "192.168.1.210" included in the corresponding information list DL2 of the return message. Moreover, the intermediate relay device 210 referred to as the first-stage intermediate relay device receives the return message from the intermediate relay device 220 referred to as the intermediate-stage intermediate relay device. Hence, a route reversely tracing an outgoing route that is the relay route of the outgoing message is utilized as the relay route for the return message, and thus the return message can be relayed through a communication line highly possibly communicable and an intermediate relay device highly possibly maintaining the relay function.

According to these configurations, the intermediate relay device 220 referred to as the intermediate-stage relay device deletes address "192.168.1.220" assigned to the intermediate relay device 220 from the corresponding information list DL2 "2:192.168.1.220:211, 1:192.168.1.210:211,0:192.168.1.110:111" included in the return message. After that, the intermediate relay device 220 transmits the return message. Moreover, the intermediate relay device 210 referred to as the first-stage relay device in the above-explained case deletes address "192.168.1.210" assigned to the intermediate relay device 210 from the corresponding information list D2 "1:192.168.1.210:211, 0:192.168.1.110:111" included in the return message, and transmits the return message. Hence, the data amount of the relayed return message decreases, and thus the reduction of the efficiency of relaying a message and the increase of the communication costs are suppressed even if the number of times of relaying the outgoing message and the return message increases.

According to these configurations, in case the outgoing message transmitted from the agent 111 of the transmitter/receiver 110 is relayed by the collector 211 of the intermediate relay device 210 and the collector 221 of the intermediate relay device 220 in sequence, and is transmitted to the final collector 291 of the final relay device 290, the intermediate relay device 210 is referred to as the first-stage relay device, the intermediate relay device 220 is referred to as the intermediate-stage relay device, and the final relay device 290 is referred to as the final-stage relay device. In this case, the agent 111 is located at an immediate prior stage to the collector 211, the collector 211 is located at an immediate prior stage to the collector 221, and the collector 221 is located at an immediate prior stage to the final collector 291 with reference to the agent 111 in the outgoing route. The final collector 291 specifies address "192.168.1.220" of the intermediate relay device 220 which has the collector 221 located at the immediate prior stage to the final collector 291 in the outgoing route and which is referred to as the intermediate-stage relay device, and port No. "221" used by the collector 221 for relaying the outgoing message among the addresses and port Nos. included in the corresponding information list DL2 of the generated outgoing message, and transmits the return message. Likewise, the collector 221 specifies address "192.168.1.210" of the intermediate relay device 210 which has the collector 211 located at the immediate prior stage to the collector 221 in the outgoing route and which is referred to as the first-stage relay device, and port No. "211" used by the collector 211 for relaying the outgoing message among the addresses and port Nos. included in the corresponding information list DL2 of the received outgoing message, and transmits the return message. Furthermore, the collector 211 specifies address "192.168.1.110" of the transmitter/receiver 110 which has the agent 111 located at the immediate prior stage to collector 211 in the outgoing route, and port No. "111" used by the agent 111 for transmitting the outgoing message among the addresses and port Nos. included in the corresponding information list DL2 of the received outgoing message, and transmits the return message. A program that has transmitted or relayed the outgoing message has a higher probability of fulfilling the relay function in relaying the return message than programs that did not transmit nor relay the outgoing message. Therefore, retransmission in relaying a return message can be prevented, thereby improving the efficiency of relaying a message and reducing communication costs. Moreover, even if one intermediate relay device runs a plurality of programs for relaying a message, it is likely that the program that relayed the outgoing message can relay the return message, thereby improving the efficiency of relaying a message and reducing communication costs.

MODIFIED EXAMPLE 1

It has been described that in the present embodiment, the management server 300 manages the operation and state of the transmitter/receivers 110 to 130, but the present embodiment is not limited to this. The management server 300 may not manage the operation and state of the transmitter/receivers 110 to 130. That is, the communication system 1 may include a storage device such as a network storage, instead of the management server 300, and the final relay device 290 may store an outgoing message in the storage device. Any storage device can be employed as long as the storage device can store data, that is, provide a storage function. The storage device may have a database mounted thereon.

MODIFIED EXAMPLE 2

In the present embodiment, the final relay device 290 may continue to transmit an outgoing message to the management server 300, for example, in a predetermined period until it receives from the management server 300 an acknowledgement (hereinafter referred to as ACK) indicating that the management server 300 has received the outgoing message.

MODIFIED EXAMPLE 3

Unlike modified example 2 in which the final relay device 290 retransmits an outgoing message to the management server 300, the transmitter/receiver 110 may retransmit an outgoing message to the management server 300.

In this modified example, the transmitter/receiver 110 determines whether or not it is necessary for an outgoing message to be retransmitted on the basis of the type of event data included in the outgoing message. If it is determined it is necessary that the transmitted outgoing message should be retransmitted, the transmitter/receiver 110 stores the outgoing message. Next, after the transmitter/receiver 110 transmits the outgoing message, the transmitter/receiver 110 determines whether or not the transmitter/receiver 110 has received return data in response to the outgoing message within a predetermined window of time after transmission of the outgoing message. If it is determined that the transmitter/receiver 110 did not receive return data within the predetermined window of time after transmission of the outgoing message, the transmitter/receiver 110 retransmits the outgoing message and increases the time window by a predetermined value.

After that, if the transmitter/receiver 110 does not receive return data within a window of time after retransmission of the outgoing message, the transmitter/receiver 110 retransmits the outgoing message and increases the window of time by a predetermined value. Still after that, the transmitter/receiver 110 that is a service-providing server repeats the above processing until the outgoing message is retransmitted more than or equal to a predetermined number of times.

Retransmission operation of an outgoing message by the transmitter/receiver 120 and retransmission operation of an outgoing message by the transmitter/receiver 130 are the same as that of the retransmission operation of an outgoing message by the transmitter/receiver 110, which has been described. Therefore, retransmission operation of the transmitter/receivers 120 and 130 will not be described.

According to this configuration, unlike modified example 2, the final relay device does not need to store an outgoing message or need to retransmit a stored outgoing message, thereby reducing the load to be processed by the final relay device.

MODIFIED EXAMPLE 4

In the present embodiment, the management server 300 may determine whether or not a problem has occurred in the transmitter/receivers 110 to 130 on the basis of event data included in the outgoing message, and may transmit a message that gives an instruction to stop service to a server that was determined to have trouble as a final destination. Specifically, if event data included in the outgoing message is data indicative of an occurrence of a problem, the management server 300 may determine that the transmitter/receiver that has transmitted the outgoing message has a problem.

MODIFIED EXAMPLE 5

It has been described that in the present embodiment, each of the intermediate relay devices 210 to 240 adds, to the "end" of the corresponding information list DL1 included in the outgoing message, information indicative of the number of times of relay, the IP address of each of the intermediate relay devices 210 to 240, and the port No. used for transmitting the outgoing message by a program run by each of the intermediate relay devices 210 to 240. It has also been described that the final relay device 290 adds the corresponding information list DL2, obtained by sorting the corresponding information list DL1 included in the outgoing message in "descending order" of the number of times of relay, to a return message, and after that, the final relay device 290 specifies IP address and port No. at the "beginning" of the corresponding information list DL2 as IP address and port No. of the transmission destination, and transmits the outgoing message to the specified IP address and port No. Further, it has been described that each of the intermediate relay devices 210 to 240 deletes each IP address and port No. used for transmitting the outgoing message by a program run by each of the intermediate relay devices 210 to 240, and after that each of the intermediate relay devices 210 to 240 specifies an IP address and port No. at the "beginning" of the corresponding information list DL2 as the IP address and port No. of the transmission destination, and transmits the outgoing message to the specified IP address and port No.

However, the position where the intermediate relay devices 210 to 240 adds the IP address and port No. to the corresponding information list DL1 is not limited to the end, and the IP address and port No. of the transmission destination specified by the intermediate relay devices 210 to 240 is not limited to the IP address and port No. at the beginning of the corresponding information list DL2. In the following modified example, each of the intermediate relay devices 210 to 240 adds to the "beginning" of the corresponding information list DL1 included in the outgoing message, information indicative of the number or times of relay, IP address of each of the intermediate relay devices 210 to 240, and port No. used for transmitting the outgoing message by a program run in each of the intermediate relay devices 210 to 240. The final relay device 290 adds the corresponding information list DL2, obtained by sorting the corresponding information list DL1 included in the outgoing message in "ascending order" of the number of times of relay, to the return message. After that, the final relay device 290 specifies the IP address and port No. at the "end" of the corresponding information list DL2 as the IP address and port No. of the transmission destination, and transmits the outgoing message thereto. Each of the intermediate relay devices 210 to 240 deletes its IP address and port No. used for transmitting the outgoing message by a program run in each of the intermediate relay devices 210 to 240. After that, each of the intermediate relay devices 210 to 240 specifies an IP address and port No. at the "end" of the corresponding information list DL2 as the IP address and port No. of the transmission destination, and transmits the outgoing message thereto.

MODIFIED EXAMPLE 6

The intermediate relay devices 210 to 240 and final relay device 290 may use the corresponding information list DL1 and corresponding information list DL2 as a stack. In this modified example, each of the intermediate relay devices 210 to 240 adds an IP address of each of the intermediate relay devices 210 to 240, as well as a port No. used for transmitting the outgoing message by a program run in each of the intermediate relay devices 210 to 240, to the "beginning" of the corresponding information list DL1 included in the outgoing message. The final relay device 290 adds the corresponding information list DL1 included in the outgoing message as a corresponding information list DL2 to the return message without sorting the corresponding information list DL1. After that, the final relay device 290 specifies an IP address and port No. at the "beginning" of the corresponding information list DL2 as the IP address and port No. of the transmission destination, and transmits the outgoing message to the specified IP address and port No. Further, each of the intermediate relay devices 210 to 240 deletes each IP address and port No. used for transmitting the outgoing message by a program run in each of the intermediate relay devices 210 to 240. After that, each of the intermediate relay devices 210 to 240 specifies an IP address and port No. at the "beginning" of the corresponding information list DL2 as the IP address and port No. of the transmission destination, and transmits the outgoing message to the specified IP address and port No.

MODIFIED EXAMPLE 7

Each of the intermediate relay devices 210 to 240 may add information indicative of the number of times of relay, IP address of each of the intermediate relay devices 210 to 240 and port No. used for transmitting the outgoing message by a program run in each of the intermediate relay devices 210 to 240, to the "end" of the corresponding information list DL1 included in the outgoing message. In this modified example, the final relay device 290 adds the corresponding information list DL1 included in the outgoing message as the corresponding information list DL2 to the return message. After that, the final relay device 290 specifies an IP address and port No. at the "end" of the corresponding information list DL2 as the IP address and port No. of the transmission destination, and transmits the outgoing message to the specified IP address and port No. Further, each of the intermediate relay devices 210 to 240 deletes each IP address, as well as port No. used for transmitting the outgoing message by a program run in each of the intermediate relay devices 210 to 240. After that, each of the intermediate relay devices 210 to 240 specifies an IP address and port No. of the "end" of the corresponding information list DL2 as the IP address and port No. of the transmission destination, and transmits the outgoing message to the specified IP address and port No.

MODIFIED EXAMPLE 8

It is fine if each of the transmitter/receivers 110 to 130 and the intermediate relay devices 210 to 240 do not add information indicating the number of times of relay to the corresponding information list DL1 included in the outgoing message, and add thereto each IP address of each of the transmitter/receivers 110 to 130 and the intermediate relay devices 210 to 240, and port No. used by the program run in each device and used for transmitting the outgoing message. This is because each of the intermediate relay devices 210 to 240 is capable of specifying the transmission destination of the outgoing message based on the stored locations of IP address and port No. in the corresponding information list DL1.

MODIFIED EXAMPLE 9

Each of the intermediate relay devices 210 to 240 may add information indicating IP address, port No., and the number of times of relay to arbitrary locations in the corresponding information list DL1 included in the outgoing message as long as information indicating the number of times of relay is associated with the IP address of each of the intermediate relay devices 210 to 240 and the port No. used by the program run in each device and used for transmitting the outgoing message. Moreover, the final relay device 290 does not sort the corresponding information list DL1 included in the outgoing message, but adds such a list as the corresponding information list DL2 to the return message. Thereafter, the final relay device 290 specifies, as IP address and port No. of the transmission destination, IP address and port No. associated with information indicating the largest number of times of relay among the numbers of times of relay indicated by pieces of information added to the corresponding information list DL2, and transmits the outgoing message. Furthermore, each of the intermediate relay devices 210 to 240 deletes IP addresses of devices itself and port Nos. used by the programs run in respective devices and used for transmitting the outgoing message. Thereafter, each of the intermediate relay devices 210 to 240 specifies, as IP address and port No. of the transmission destination, IP address and port No. associated with information indicating the largest number of times of relay among the numbers of times of relay indicated by pieces of information added to the corresponding information list DL2, and transmits the outgoing message.

MODIFIED EXAMPLE 10

The present embodiment is not limited to that after each of the intermediate relay devices 210 to 240 deletes each IP address and port No. used for transmitting the outgoing message by a program run in each of the intermediate relay devices 210 to 240 from the corresponding information list DL2, and each of the intermediate relay devices 210 to 240 specifies an IP address and port No. of the transmission destination on the basis of the corresponding information list DL2. In the following modified examples, after each of the intermediate relay devices 210 to 240 identifies the IP address and port No. of the transmission destination on the basis of the corresponding information list DL2, each of the intermediate relay devices 210 to 240 deletes each IP address, as well as port No. used for transmitting the outgoing message by a program run in each of the intermediate relay devices 210 to 240 from the corresponding information list DL2. That is, each of the intermediate relay devices 210 to 240 identifies the number of times of relay that is associated with each IP address and port No. used for transmitting the outgoing message by a program run in each of the intermediate relay devices 210 to 240 from the numbers of times of relay, IP addresses and port Nos. in the corresponding information list DL2. After that, each of the intermediate relay devices 210 to 240 identifies an IP address and port No. associated with the number of times of relay that is a value "1" less than the identified number of times of relay, as the IP address and port No. of the transmission destination. The final relay device 290 specifies an IP address and port No. associated with the highest number of times of relay, of IP addresses and port Nos. in the corresponding information list DL2, as the IP address and port No. of the transmission destination, and transmits the outgoing message to the specified IP address and port No.

MODIFIED EXAMPLE 11

It has been described that in the present embodiment, each of the intermediate relay devices 210 to 240 adds information indicative of the number of times of relay, IP address of each of the intermediate relay devices 210 to 240, and port No. used for transmitting the outgoing message by a program run in each of the intermediate relay devices 210 to 240, to the corresponding information list DL1 included in the outgoing message. However, the present embodiment is not limited to this. Each of the intermediate relay devices 210 to 240 may add information indicative of the address of a memory region storing the IP address and port No. of the transmission originator of the outgoing message (that is, added by the device located at the immediate prior stage in the outgoing route) or the address of a memory region storing the IP address and port No. of the transmission destination of the outgoing message (that is, added by the device located at an immediately posterior stage in the outgoing route), instead of information indicative of the number of times of relay to the corresponding information list DL1. In this case, address and port No. may not be deleted from the list DL1.

MODIFIED EXAMPLE 12

It has been described that in the present embodiment, each of the intermediate relay devices 210 to 240 adds IP address of each of the intermediate relay devices 210 to 240 to the corresponding information list DL1 included in the outgoing message. However, without being limited to IP address, each of the intermediate relay devices 210 to 240 may add any information, such as a domain name and a host name, that can identify each of the intermediate relay devices 210 to 240.

MODIFIED EXAMPLE 13

It has been described that in the present embodiment each of the agent 111, collector 211 and collector 221 adds its information corresponding to the setting of the outgoing message to be transmitted to the final collector 291, but is not limited to this. The agent 111 may not add information corresponding to the setting of the outgoing message, and the collector 211, collector 221 and final collector 291 may add information corresponding to the setting of the transmission originator of the outgoing message to the outgoing message.

That is, it has been described that, in the present embodiment, after the agent 111 performs processing of Step S18 of outgoing message transmission processing illustrated in FIG. 4B, the agent 111 adds information corresponding to the setting of the agent 111 to the outgoing message at Step S19, and then transmits the first outgoing message to which the information corresponding to the setting of the agent 111 is added at Step S20. It has been described that after the collector 211 receives the first outgoing message at Step S43 of outgoing message relay processing illustrated in FIG. 6B, the collector 211 performs processing of Step S45, and then adds, to the first outgoing message, information indicative of the number of times of relay at the completion of relay by the collector 211 and information corresponding to the setting of the collector 211 at this Step S45. It has been described that the collector 211 transmits at Step S46 the second outgoing message to which information corresponding to the setting of the collector 211 is added. It has been described that after the final collector 291 receives the outgoing message at Step S62 of the outgoing message response processing illustrated in FIG. 7B, the final collector 291 extracts a corresponding information list from the outgoing message at Step S63.

However, in the present modified example, the agent 111 performs not outgoing message transmission processing illustrated in FIG. 4B but outgoing message transmission processing illustrated in FIG. 12. Hereinafter, outgoing message transmission processing illustrated in FIG. 12 will be described, but the same processing as that of outgoing message transmission processing illustrated in FIG. 4B will not be described.

In outgoing message transmission processing in FIG. 12, after the agent 111 performs processing of Step S18, the agent 111 transmits the first outgoing message at Step S20, without performing processing to add information corresponding to the setting of the agent 111 to the outgoing message at Step S19.

The collector 211 performs not outgoing message relay processing illustrated in FIG. 6B but outgoing message relay processing illustrated in FIG. 13. Hereinafter, outgoing message relay processing illustrated in FIG. 13 will be described, but the same outgoing message relay processing as that of FIG. 6B will not be described.

In outgoing message relay processing illustrated in FIG. 13, after the collector 211 performs processing of Step S43, the collector 211 adds to the corresponding information list DL1 included in the received first outgoing message, information indicative of the number of times of relay of the outgoing message "0" at the time of transmission of the outgoing message by the agent 111, and information corresponding to the setting of the agent 111, thereby generating the second outgoing message at Step S45 (Step 45a). After that, the collector 211 transmits the second outgoing message at Step 46. After the collector 221 similarly receives the second outgoing message, the collector 221 adds information indicative of the number of times of relaying the outgoing message "1" at the time of transmission of the second outgoing message by the collector 211 and information corresponding to the setting of the collector 211, to the corresponding information list DL1 included in the received second outgoing message.

Further, the final collector 291 performs not outgoing message response processing illustrated in FIG. 7B but outgoing message response processing illustrated in FIG. 14. Hereinafter, outgoing message response processing illustrated in FIG. 14 will be described, but the same processing as that of outgoing message response processing illustrated in FIG. 7B will not be described.

In outgoing message response processing illustrated in FIG. 14, after the final collector 291 receives the second outgoing message at Step S62, the final collector 291 adds to the corresponding information list DL1 included in the received second outgoing message, information indicative of the number of times of relaying the outgoing message "2" at the time of transmission of the outgoing message by the collector 221 and information corresponding to the setting of the collector 221 (Step 62b). After that, the final collector 291 extracts the corresponding information list from the outgoing message at Step S63.

MODIFIED EXAMPLE 14

It has been described that in the present embodiment the agent 111, each of collector 211 and collector 221 adds its information corresponding to the setting to the outgoing message to be transmitted to the final collector 291, but is not limited to this. The agent 111 may add information corresponding to the setting of the agent 111 and information corresponding to the setting of the transmission destination to the outgoing message, and the collector 211 may add information corresponding to the setting of the transmission destination of the outgoing message to the outgoing message.

In this modified example, the agent 111 may perform not the outgoing message transmission processing illustrated in FIG. 4B, but the outgoing message transmission processing illustrated in FIG. 15. Hereinafter, the outgoing message transmission processing illustrated in FIG. 15 will be described, but the same processing as that of the outgoing message transmission processing illustrated in FIG. 4B will not be described.

In the outgoing message transmission processing in FIG. 15, after the agent 111 stores an outgoing message at Step S18, the agent 111 adds information indicative of the number of times of relaying the outgoing message "0" at the time of transmission of the outgoing message by the agent 111 and information corresponding to setting of the agent 111 to the corresponding information list DL1 included in the outgoing message at Step S19. After that, the agent 111, at Step S19b, adds information indicative of the number of times of relaying the outgoing message at the time of transmission of the outgoing message by the transmission destination and information corresponding to the setting of the transmission destination to the corresponding information list DL1 included in the outgoing message. By adding those pieces of information to the outgoing message, the agent 111 generates the first outgoing message. After that, the agent 111 transmits the first outgoing message to the transmission destination at Step S20.

The collector 211 performs not the outgoing message relay processing illustrated in FIG. 6B but the outgoing message relay processing illustrated in FIG. 16. Hereinafter, the outgoing message relay processing illustrated in FIG. 16 will be described, but the same processing as that of outgoing message relay processing illustrated in FIG. 6B will not be described.

In outgoing message relay processing illustrated in FIG. 16, after the collector 211 receives the first outgoing message at Step 43, the collector 211 determines whether or not the transmission destination is the final collector 291 that is a final destination at Step 44. If the collector 211 determines that the transmission destination is not the final collector 291 (Step 44; No), the collector 211 adds information indicative of the number of times of relay at the time of transmission of the outgoing message by the transmission destination and information corresponding to the setting of the transmission destination to the corresponding information list DL1 included in the outgoing message, thereby generating the second outgoing message (Step 45b). After that, the collector 211 transmits the second outgoing message at Step 46.

If the collector 211 determines that the transmission destination is the final collector 291 (Step 44; Yes), the collector 211 transmits the second outgoing message at Step 46 without performing processing of Step 45b.

MODIFIED EXAMPLE 15

In the present embodiment, each of the agents 111 to 131 may provide a different service and may use a different encryption key to encrypt event data DE included in the outgoing message and transmit the encrypted event data DE to the final collector 291. In this modified example, the final collector 291 or the management part 301 of the management server 300 stores information corresponding to the setting of the agents 111 to 131 and information indicative of a decryption method to decrypt an encrypted text encrypted by the agents 111 to 131 using an encryption key to a plane text in association to each other. After the final collector 291 or the management part 301 of the management server 300 receives an outgoing message, the final collector 291 or the management part 301 of the management server 300 identifies information corresponding to the setting of an agent that encrypted event data DE, on the basis of the corresponding information list LD1 included in the outgoing message. The final collector 291 or the management part 301 also decrypts the encrypted event data DE, on the basis of information associated with the identified information corresponding to the setting.

According to these configurations, each of the agents 111 to 131 provides a different service and uses a different encryption key to encrypt event data DE. Therefore, even if a collector collects event data from a plurality of agents, the user that manages the collector can be prevented from referring to and combining data of a different service. That is, even if the agents 111 to 131 provide services whose data maintainability are different to one another, event data transmitted from the agents 111 to 131 can be relayed by the same collector with security ensured.

MODIFIED EXAMPLE 16

In the present embodiment, since the agents 111 to 131 retransmit an outgoing message, the management part 301 illustrated in FIG. 5 may receive the same outgoing message from the final collector 291 again. Therefore, the management part 301 detects overlapping outgoing messages from a plurality of received outgoing messages, on the basis of data ID included in the outgoing messages. After that, the management part 301 selects one from a plurality of detected outgoing messages, and deletes the message other than the selected outgoing message. The management part 301 may perform processing to detect the received overlapped outgoing message and processing to delete the overlapped outgoing message at the time when the new outgoing message is received (that is, at a real time) or at a predetermined time (that is, as batch processing).

Those configurations prevent waste of data capacity in the management part 301 and an erroneous data analysis.

MODIFIED EXAMPLE 17

It has been described that, in the present embodiment, if the agent 111 determines that an event occurred (Step S15; Yes) in outgoing message transmission processing illustrated in FIG. 4B, the agent 111 transmits one outgoing message including one event data DE indicative of the event (Step S20). That is the data size of the outgoing message to be transmitted can be less than that of the modified example to be discussed later, thereby reducing the memory size necessary for the agent 111, collectors 211 to 242 and final collector 291 to relay the outgoing message.

However, the present embodiment is not limited to this, and the agent 111 may determine, at Step S15, whether or not a predetermined number of events have occurred after an outgoing message was transmitted the previous time. In this variation, after the agent 111 determines that a predetermined number of events has occurred (Step S15; Yes), the agent 111 transmits one outgoing message including a predetermined number of event data DE, each indicating each of the events at Step S20. Those configurations can reduce the number of times of transmission of an outgoing message, thereby reducing communication cost.

MODIFIED EXAMPLE 18

It has been described that, in the present embodiment, the agents 111 to 131 and collectors 211 to 242 specify the IP address and port No. of the transmission destination previously decided by the administrator of the communication system 1 and transmit the outgoing message to the specified IP address and port No. That is, it has been described that the route used for transmitting the outgoing message from the agent 110 to the final relay device 291 is limited to the route previously set by the administrator. However, the present embodiment is not limited to this, and the agents 111 to 131 and collectors 211 to 242 may use a routing table to dynamically change the transmission destination.

Hereinafter, a method to decide an outgoing route in the present variation will be described.

An outgoing route to be used for relaying an outgoing message from the agent 111 to the final collector 291 is decided by the agent 111 and collectors 211 to 242 according to the following three rules.

Rule 1: The agent 111 and collectors 211 to 242 transmit an outgoing message in such a way that the outgoing message is transmitted through a route that has a high priority and was previously set for each destination by the administrator of the communication system 1 (that is, a set route). That is, the agent 111 and collectors 211 to 242 transmit the outgoing message to a transmission destination that was previously set for each destination by the administrator (hereinafter, referred to as a set transmission destination).

Rule 2: If the agent 111 and collectors 211 to 242 are unable to transmit the outgoing message to the set transmission destination, the agent 111 and collectors 211 to 242 transmit the outgoing message to an alternative transmission destination set in advance for each destination by the administrator.

Rule 3: If the agent 111 and collectors 211 to 242 are unable to transmit the outgoing message to both of a set transmission destination and an alternative transmission destination, the agent 111 and collectors 211 to 242 select any of the collectors 211 to 242 to which the outgoing message can be transmitted (hereinafter referred to as a selectable transmission destination) other than the transmission originator of the outgoing message. Next, the agent 111 and collectors 211 to 242 transmit the outgoing message to the selected selectable transmission destination.

A method for setting an outgoing route from the agent 112 to the final collector 291, a method for setting an outgoing route from the agent 121 to the final collector 291, and a method for setting an outgoing route from the agent 131 to the final collector 291 are the same as the method for setting an outgoing route from the agent 111 to the final collector 291.

Hereinafter, as an example, is a case where a set route for transmitting an outgoing message from the agent 121 to the final collector 291 illustrated in FIG. 5 is a route that passes through the collector 231 and then the collector 241 and an alternative route is a route that passes through the collector 231 and then the collector 242 will be described.

Since the set route for transmitting an outgoing message from the agent 121 to the final collector 291 is a route that passes through the collector 231 and then the collector 241, the set transmission destination of the agent 121 is the collector 231. Since the alternative route is a route that passes through the collector 231 and then the collector 242, an alternative transmission destination of the agent 121 does not exist. In addition, since the agent 121 connects to only the collector 231, a selectable connection destination does not exist either.

Therefore, the agent 121 stores a routing table as illustrated in FIG. 17A. This routing table stores data in which information corresponding to the setting of the final collector 291 as a destination is associated with information corresponding to the setting of the collector 231 as the set transmission destination.

Since the set route is a route that passes through the collector 231 and then the collector 241, the set transmission destination of the collector 231 is the collector 241. Since an alternative route is a route that passes through the collector 231 and then the collector 242, an alternative transmission destination of the collector 231 is the collector 242. In addition, since the collector 231 also connects to the collector 221, a selectable connection destination of the collector 231 is the collector 221.

Therefore, the collector 231 stores a routing table as illustrated in FIG. 17B. This routing table stores data in which information corresponding to the setting of the final collector 291 as a destination, information corresponding to setting of the collector 241 as a set transmission destination, information corresponding to setting of the collector 242 as an alternative transmission destination, and information corresponding to setting of the collector 221 as a selectable transmission destination are associated with one another.

The collector 221, collector 241 and collector 242 store routing tables illustrated in FIG. 17C to FIG. 17E, respectively. These routing tables store data in which information corresponding to the setting of the final collector 291 as a destination is associated with information corresponding to the setting of the final collector 291 as the set transmission destination.

First, operation of the agent 121, collector 231 and collector 241 will be described where an outgoing message can be transmitted through a set route from the agent 121 to the final collector 291.

The agent 121 reads out information corresponding to the setting "192.168.1.230:231" of the collector 231 as the set transmission destination associated with information corresponding to setting "192.168.1.290:291" of the final collector 291 as a destination from the routing table illustrated in FIG. 17A. Next, the agent 121 specifies "192.168.1.230:231" and transmits the outgoing message to the collector 231. After that, the agent 121 receives ACK from the collector 231 within a predetermined time, and determines that the outgoing message has been received by the collector 231.

The collector 231 reads out information corresponding to setting "192.168.1.240:241" of the collector 241 as the set transmission destination associated with information corresponding to setting "192.168.1.290:291" of the final collector 291 from the routing table illustrated in FIG. 17B. Next, the collector 231 specifies "192.168.1.240:241" and transmits the outgoing message to the collector 241. After that, the collector 231 receives ACK from the collector 241 within a predetermined time, and determines that the outgoing message has been received by the collector 241.

The collector 241 reads out information corresponding to setting "192.168.1.290:291" of the set transmission destination associated with information corresponding to setting "192.168.1.290:291" of the final collector 291 from the routing table illustrated in FIG. 17C. Next, the collector 241 specifies "192.168.1.290:291" and transmits the outgoing message to the final collector 291 as a final destination. After that, the collector 241 receives ACK from the final collector 291 within a predetermined time, and determines that the outgoing message has been received by the final collector 291.

Next, operation of the agent 121, collector 231 and collector 242 will be described where an outgoing message is transmitted from the agent 121 to the final collector 291, not through a set route but through an alternative route.

The agent 121 specifies "192.168.1.230:231" and transmits an outgoing message to the collector 231.

The collector 231 reads out information corresponding to setting "192.168.1.240:241" of the set transmission destination associated with information corresponding to setting "192.168.1.290:291" of the final collector 291 from the routing table illustrated in FIG. 17B. Next, the collector 231 specifies "192.168.1.240:241" and transmits the outgoing message to the collector 241. After the collector 231 has transmitted the outgoing message, the collector 231 repeatedly transmits the outgoing message for a predetermined time until it receives ACK from the transmission destination. Next, after the collector 231 does not receive ACK from the transmission destination in a predetermined time after transmission of the outgoing message, the collector 231 determines that transmission of the outgoing message has failed.

Next, the collector 231 reads out information corresponding to setting "192.168.1.240:242" of an alternative transmission destination associated with information corresponding to setting "192.168.1.290:291" of the final collector 291 from the routing table illustrated in FIG. 17B. Next, the collector 231 specifies "192.168.1.240:242", and transmits the outgoing message to the collector 242. After that since the collector 231 receives ACK from the collector 242 within a predetermined time, it is determined that the outgoing message has been received by the collector 242.

The collector 242 reads out information corresponding to setting "192.168.1.290:291" of the set transmission destination associated with information corresponding to setting "192.168.1.290:291" of the final collector 291 from the routing table illustrated in FIG. 17D. Next, the collector 221 specifies "192.168.1.290:291", and transmits the outgoing message to the final collector 291 as a final destination. After that, the collector 241 receives ACK from the final collector 291 within a predetermined time, and determines that the outgoing message has been received by the final collector 291.

Lastly, operation of the agent 121, collector 231 and collector 221 will be described where an outgoing message is transmitted from the agent 121 to the final collector 291 through a route other than a set route and an alternative route.

The agent 121 specifies "192.168.1.230:231" and transmits an outgoing message to the collector 231.

The collector 231 reads out information corresponding to setting "192.168.1.240:241" of the set transmission destination associated with information corresponding to setting "192.168.1.290:291" of the final collector 291 from the routing table illustrated in FIG. 17B. Next, the collector 231 specifies "192.168.1.240:241" and transmits the outgoing message to the destination. After transmission of the outgoing message, the collector 231 repeatedly transmits the outgoing message for a predetermined time until it receives ACK from the transmission destination. However, after the collector 231 does not receive ACK from the transmission destination in a predetermined time after transmission of the outgoing message, the collector 231 determines that transmission of the outgoing message has failed.

Next, the collector 231 reads out information corresponding to setting "192.168.1.240:242" of the alternative transmission destination associated with information corresponding to setting "192.168.1.290:291" of the final collector 291 from the routing table illustrated in FIG. 17B. Next, the collector 231 specifies "192.168.1.240:242", and transmits the outgoing message to the destination. After transmission of the outgoing message, the collector 231 repeatedly transmits the outgoing message for a predetermined time until it receives ACK from the transmission destination. However, after the collector 231 does not receive ACK from the transmission destination in a predetermined time after transmission of the outgoing message, the collector 231 determines that the transmission of the outgoing message has failed.

Next, the collector 231 reads out information corresponding to setting "192.168.1.220:221" of a selectable transmission destination associated with information corresponding to setting "192.168.1.290:291" of the final collector 291 from the routing table illustrated in FIG. 17B. Next, the collector 231 specifies "192.168.1.220:221" and transmits the outgoing message to the destination. After that, the collector 231 receives ACK from the collector 221 within a predetermined time and determines that the collector 221 has received the outgoing message.

The collector 221 reads out information corresponding to setting "192.168.1.290:291" of the set transmission destination associated with information corresponding to setting "192.168.1.290:291" of the final collector 291 from the routing table illustrated in FIG. 17E. Next, the collector 231 specifies "192.168.1.290:291", and transmits the outgoing message to the final collector 291 as a final destination. After that, the collector 221 receives ACK from the final collector 291 within a predetermined time and determines that the outgoing message has been received by the final collector 291.

According to these configurations, even if transmission of an outgoing message to a transmission destination has failed, the outgoing message is transmitted to another transmission destination, thereby ensuring that the message is transmitted to the final relay device 290. Further, an intermediate relay device that succeeded in transmission of the outgoing message relays a return message, thereby improving the efficiency of relaying a message, reducing communication cost and search cost for searching a transmission destination of an outgoing message.

MODIFIED EXAMPLE 19

It has been described in the present embodiment that the communication system 1 illustrated in FIG. 1 includes the management server 300, and pieces of event data indicating events occurred at respective transmitter/receivers 110 to 130 are relayed to the management server 300 through the final relay device 290. Moreover, it has been described that the management server 300 extracts event data from the relayed outgoing message, and manages the operation statuses of respective transmitter/receivers 110 to 130 based on the extracted event data.

Figure 18:
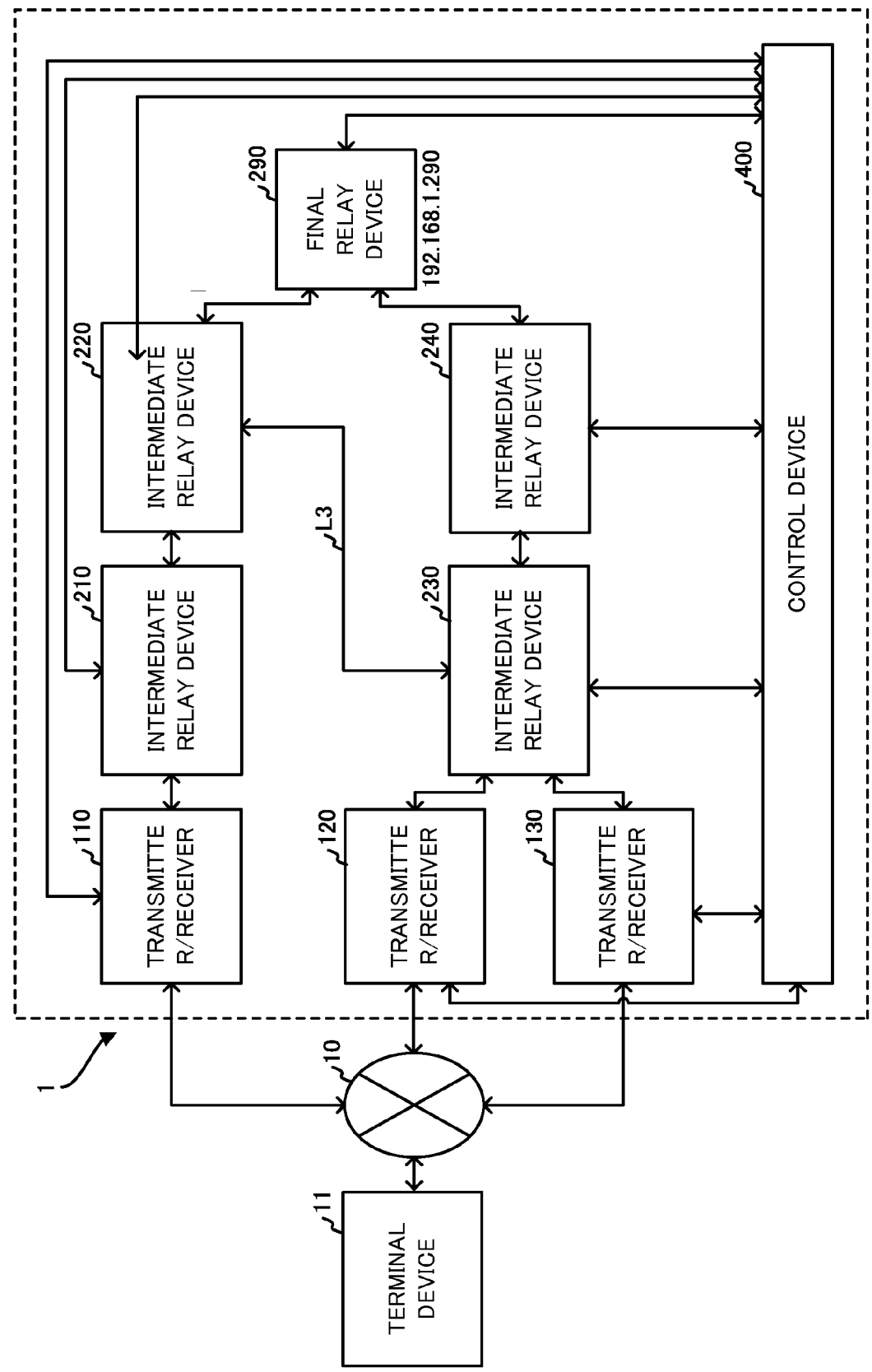
FIG. 18 is a system configuration diagram illustrating another configuration example of a communication system according to modified example 19 of the present embodiment.

In this modified example, as illustrated in FIG. 18, the communication system 1 includes a control device (also referred to as a master) 400 instead of the management server 300. The control device 400 is connected to all of the transmitter/receivers 110 to 130, intermediate relay devices 210 to 240, and final relay device 290 configuring the communication system 1, and is capable of communicating with all of those devices. The control device 400 directly receives, from the transmitter/receivers 110 to 130, the intermediate relay devices 210 to 240, and the final relay device 290, status reports for reporting the operation statuses of those devices and status of communication between those devices and another device.

The control device 400 determines whether or not any failure has occurred in the transmitter/receivers 110 to 130, the intermediate relay devices 210 to 240, or the final relay device 290 based on the received status report. When or after determining that a failure has occurred, the control device 400 determines the kind of occurred failure based on the status report. Moreover, the control device 400 determines whether or not a communication failure has occurred between a failure occurring device that is a device determined that a failure has occurred and a communication counterparty thereof based on the received status report.

Thereafter, the control device 400 controls the communication counterparty of the failure occurring device so as to terminate the communication with the failure occurring device by, for example, cancelling the link therebetween. Next, the control device 400 controls the device determined that the failure has occurred to operate in accordance with the content of the control depending on the determined kind of the failure, or to execute an operation for terminating the failure like rebooting. Subsequently, the control device 400 controls the communication counterparty of the failure occurring device in such a manner as to re-establish a link with the failure occurring device to restart the communication with the failure occurring device.

Figure 19:
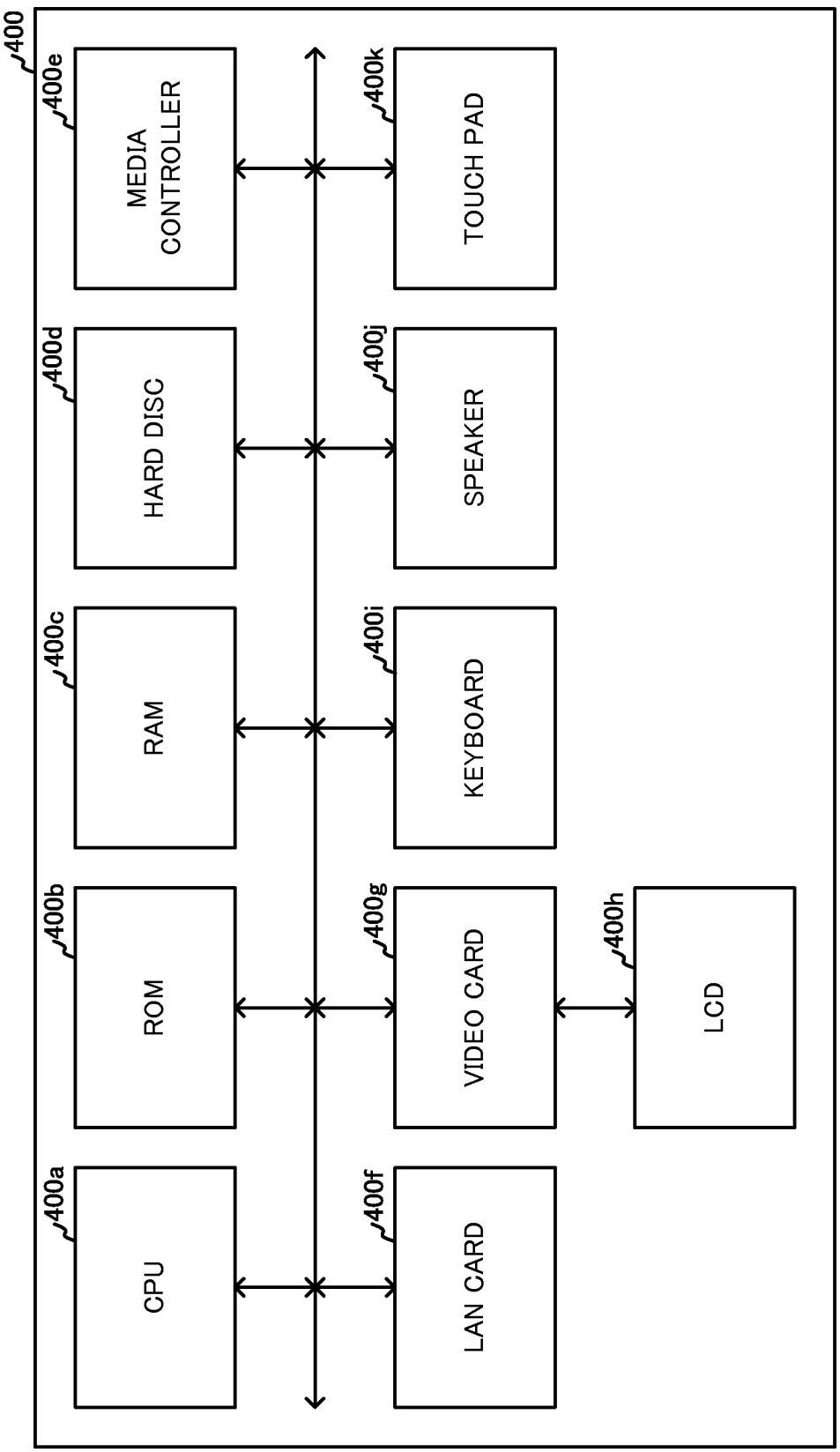
FIG. 19 is a hardware configuration diagram illustrating one configuration example of a control device.

Like the transmitter/receiver 110, the control device 400 includes, as illustrated in FIG. 19, a CPU 400a, a ROM 400b, a RAM 400c, a hard disc 400d, a media controller 400e, a LAN card 400f, a video card 400g, an LCD 400h, a keyboard 400i, a speaker 400j, and a touch pad 400k.

Figure 20:
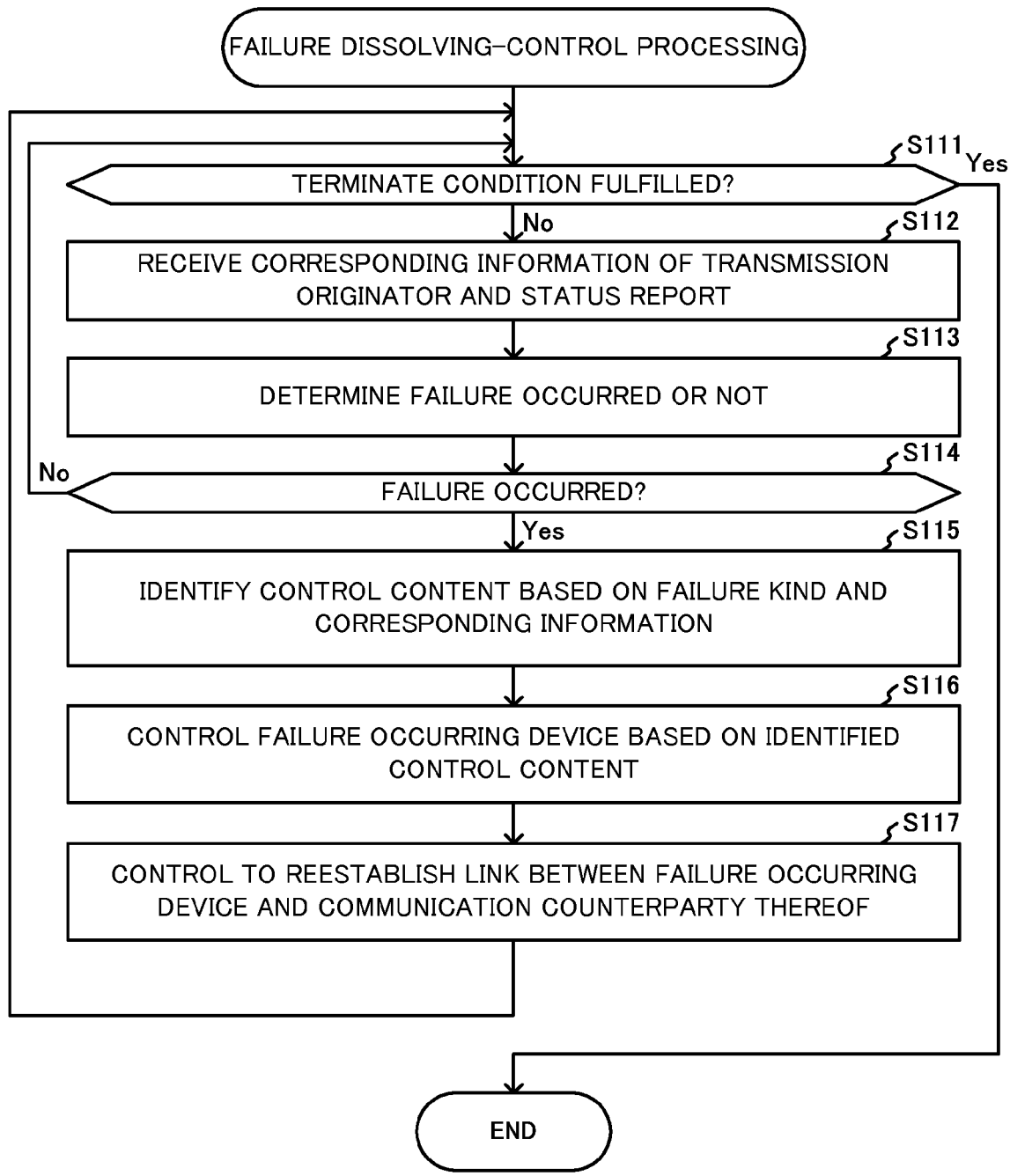
FIG. 20 is a flowchart illustrating one example of failure dissolving control processing performed by the control device.
Figure 21:
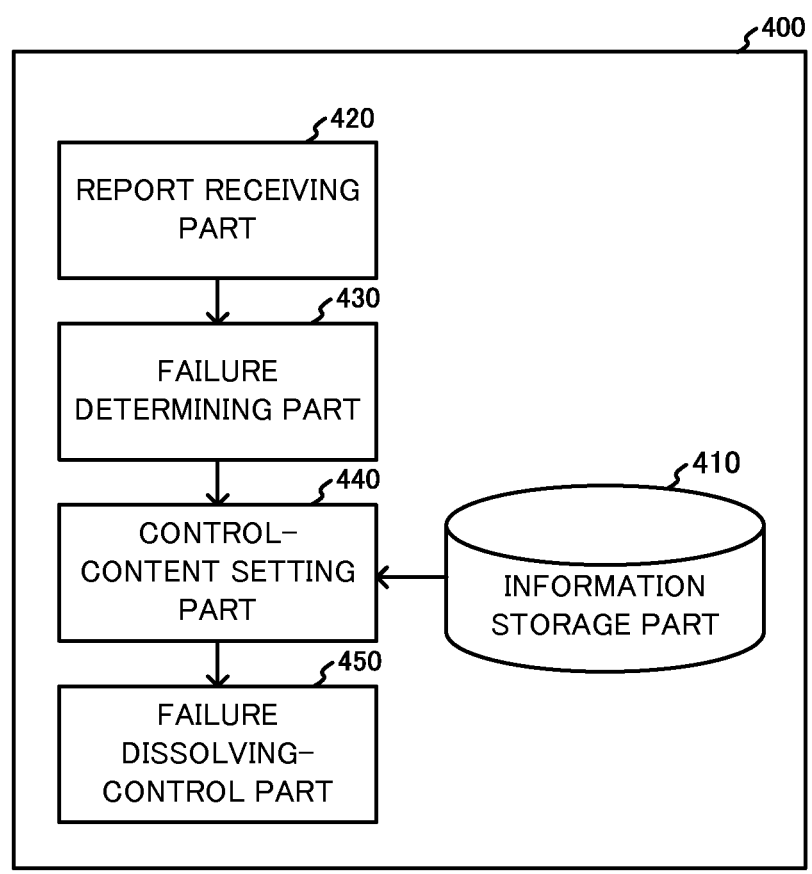
FIG. 21 is a functional block diagram illustrating one configuration example of the control device.

The CPU 400a of the control device 400 cooperatively executes a failure dissolving-control processing illustrated in FIG. 20 together with the hardware resources illustrated in FIG. 19. Hence, the CPU 400a serves as a report receiving part 420, a failure occurrence determining part 430, a control-content setting part 440, and a failure dissolving-control part 450 as illustrated in FIG. 21. The CPU 400a also cooperatively serves as information storage part 410 together with the hard disc 400d.

The information storage part 410 stores pieces of information corresponding to respective settings of the agents 111, 112, 121, and 131 (hereinafter, referred to as agent 111, etc.) of the transmitter/receivers 110 to 130 illustrated in FIG. 5. The information storage part 410 also stores pieces of information corresponding to respective settings of the collectors 211, 212, 221, 231, 241 and 242 (hereinafter, referred to as collectors 211, etc.) of the intermediate relay devices 210 to 240 and the final collector 291 of the final relay device 290.

The information storage part 410 stores plural sets of information corresponding to the settings of the agents 111, etc., the collectors 211, etc., and the final collector 291 in association with information corresponding to the setting of the communication counterparty of the agents 111, etc., the collectors 211, etc., and the final collector 291 to which the plural pieces of information corresponding to the settings are set. For example, as illustrated in FIG. 5, the collector 211 is capable of communicating with the agents 111 and 112 and the collector 221. Hence, the information storage part 410 stores plural sets of information corresponding to the setting of the collector 211, information corresponding to the setting of the agent 111, information corresponding to the setting of the agent 112, and information corresponding to the setting of the collector 221 in association with each other.

The information storage part 410 further stores plural sets of information corresponding to the setting, information indicating the kind of a failure that may occur in the agents 111, etc., the collectors 211, etc., and the final collector 291 to which the information corresponding to the setting is set, and control-content data indicating at least one piece of control content for an operation regarding a failure of that kind has occurred, suppressing a propagation of the effect of that failure or a control contents for an operation for termination of such a failure. In case the failure for example, buffer overflow, has occurred, the control content for an operation of dissolving the failure includes a control content of rebooting the device that has occurred the failure, and the control content for an operation that suppresses a propagation of the effect of the failure includes a control content of limiting the device to be connected and a control content of terminating the operation.

Still further, the information storage part 410 stores data representing a diagnosis model for diagnosing a failure or a break-down that may occur at the agents 111, etc., the collectors 211, etc., and the final collector 291.

After the CPU 400a of the control device 400 starts the failure dissolving-control processing illustrated in FIG. 20, the report receiving part 420 determines whether or not a preset termination condition is fulfilled (Step S111). More specifically, the report receiving part 420 obtains a signal output by the keyboard 400i in FIG. 19, and determines whether or not a termination condition such that a shut-down command is input is fulfilled based on the obtained signal.

At this time, after determining that no termination condition is fulfilled (Step S111; No), the report receiving part 420 receives information corresponding to the settings of the agents 111, etc., the collectors 211, etc., and the final collector 291, and respective status reports thereof (Step S112).

The status report is information indicating an operation status including the content of data stored in a buffer and a communication status, etc.

In this modified example, like the present embodiment, an outgoing message and a return message are transmitted between the agents 111, etc., and the collectors 211, etc., and between the collectors 211, etc., and the final collector 291. After receiving the outgoing message, the collectors 211, etc., and the final collector 291 return ACK thereto. On the other hand, the agents 111, etc., and the collectors 211, etc., that have transmitted the outgoing message repeatedly transmit the outgoing message by a predetermined number of times until receiving ACK from the transmission destination. Likewise, the agents 111, etc., and the collectors 211, etc., return ACK upon reception of the outgoing message, and the collectors 211, etc., and the final collector 291 that have transmitted the return message repeatedly transmit the return message by a predetermined number of times until receiving ACK from the transmission destination. Hence, the status report may represent the communication status in the form of the number of retransmission of the outgoing message or the number of retransmission of the return message.

After the execution of Step S112, the failure occurrence determining part 430 reads data representing the diagnosis model from the information storage part 410, and inputs the operation status reported in the status report into the model represented by the read data. Next, the failure occurrence determining part 430 analyzes the diagnosis model, thereby determining whether or not a failure has occurred at any of the agents 111, etc., the collectors 211, etc., and the final collector 291 (Step S114). In this case, after the failure occurrence determining part 430 determines that no break-down has been caused (Step S114; No), the process from Step S111 is repeated.

Conversely, after the failure occurrence determining part 430 determines that a break-down has been caused (Step S114; Yes), the failure occurrence determining part 430 further analyzes the diagnosis model, thereby specifying where the break-down has been caused among the agents 111, etc., the collectors 211, etc., and the final collector 291 and the kind of the caused break-down.

Furthermore, the failure occurrence determining part 430 specifies information corresponding to a setting stored in the information storage part 410 in association with information corresponding to the setting of any of the agents 111, etc., the collectors 211, etc., and the final collector 291 (hereinafter, referred to as a break-down causing part) with which the cause of the break-down has specified. Next, the failure occurrence determining part 430 specifies at least one of the agents 111, etc., the collectors 211, etc., and the final collector 291 to which the specified information corresponding to the setting is set as the communication counterparty for the break-down causing part.

Subsequently, the failure occurrence determining part 430 determines whether or not a problem has occurred in the communication between the break-down causing part and the communication counterparty thereof based on the received status report. Next, in association with the information corresponding to the setting of the break-down causing part and the information indicating the kind of the specified break-down, the control-content data stored in the information storage part 410 is specified (Step S115).

Thereafter, in order to avoid an occurrence of a further or additional failure or to terminate the failure, the failure dissolving-control part 450 controls the break-down causing part in accordance with the control content represented by the specified control-content data (Step S116).

Next, the failure dissolving-control part 450 reestablishes a link between the break-down causing part and the communication counterparty thereof, and controls the communication counterparty of the break-down causing part so as to recover from the communication failure (Step S117). Thereafter, the process from Step S111 is repeated.

At Step S117, the communication counterparty of the break-down causing part may specify the address and port No. of the break-down causing part used for a communication based on the outgoing message that has been received before the communication failure occurs, and may reestablish a link with the break-down causing part using the specified address and port No.

More specifically, after receiving the outgoing message, the communication counterparty of the break-down causing part stores the outgoing message for a predetermined time before or after transmitting that outgoing message. Next, after controlled by the failure dissolving-control part 450 so as to recover from the communication failure, the communication counterparty of the break-down causing part extracts the corresponding information list DL1 from the stored outgoing message. Thereafter, the communication counterparty of the break-down causing part specifies information corresponding to the setting of the agent or the collector located at an immediate prior stage to the communication counterparty of the break-down causing part with reference to the agent 111 of the transmitter/receiver 110 in the outgoing route of the outgoing message based on the corresponding information list DL1. Next, the communication counterparty of the breakdown causing part takes the specified information corresponding to the setting as the information corresponding to the setting of the break-down causing part, and reestablishes a link with the break-down causing part using IP address and port No. included in that information corresponding to the setting of the break-down causing part.

Needless to say, the communication counterparty of the break-down causing part may reestablish a link with the break-down causing part based on not only the outgoing message but also the return message or instead of the outgoing message.

Moreover, the communication counterparty of the break-down causing part may specify information corresponding to the setting of the collector or the final collector located at immediately posterior stage to the communication counterparty of the break-down causing part with reference to the agent 111 of the transmitter/receiver 110 in the outgoing route based on the corresponding information list DL2 in the return message, and may take the specified information corresponding to the setting as the information corresponding to the setting of the break-down causing part.

After determining at Step S111 that the termination condition is fulfilled (Step S111; Yes), the report receiving part 420 discontinues the execution of the failure dissolving-control processing.

According to those configurations, after it is determined that, based on the status report received from at least one of the agents 111, etc., the collectors 211, etc., and the final collector 291, any one of those devices has caused a failure, at least one of the agents 111, etc., the collectors 211, etc., and the final collector 291 which is determined that the failure has occurred is controlled so as to operate in accordance with the failure. In particular, the operation in accordance with the failure includes an operation that suppresses a propagation of the effect of such a failure. Hence, an occurrence of a new failure can be automatically avoided.

According to those configurations, after it is determined that at least one of the agents 111, etc., the collectors 211, etc., and the final collector 291 has caused a failure, the communication counterparty of at least one of the agents 111, etc., the collectors 211, etc., and the final collector 291 which is determined that the failure has occurred (i.e., the failure occurring part) is controlled so as to recover from the communication failure with the failure occurring part. Hence, even if a communication failure has occurred due to a failure occurring at least one of the agents 111, etc., the collectors 211, etc., and the final collector 291, the communication failure can be automatically recovered.

The intermediate relay devices 210 to 240 or final relay device 290 can be provided that employ in advance a configuration to realize a function according to any of the present embodiment or modified examples 1 to 19 thereof. In addition, by applying a program to the existing intermediate relay device and the final relay device 290, the existing intermediate relay device and final relay device 290 can function as the intermediate relay devices 210 to 240 according to any of the present embodiment or modified examples 1 to 19 thereof. That is, by applying a relay program for realizing each function component of the intermediate relay devices 210 to 240 or final relay device 290 exemplified in any of the present embodiment or modified examples 1 to 19 thereof in such a way that a computer (such as CPU) that controls the existing intermediate relay device or final relay device can run the relay program, the existing intermediate relay device or final relay device can function as the intermediate relay devices 210 to 240 or the final relay device 290 according to any of the present embodiments or modified examples 1 to 19 thereof.

Any method to distribute such a program can be employed. For example, the program can be distributed by storing the program in a recording medium such as a memory card, a CD-ROM and a DVD-ROM, or distributed via a communication medium such as the Internet. A relay method and communication method according to the present invention can be implemented using the intermediate relay devices 210 to 240 and the communication system 1 according to an embodiment.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A communication system comprising at least the following:
   a transmitter/receiver that transmits an outgoing message including a list;
   a final-stage relay device which is a final destination for the outgoing message and which transmits a return message to the transmitter/receiver in response to the outgoing message;
   a first-stage relay device that relays the outgoing message and the return message; and
   at least one intermediate-stage relay device located between the first-stage relay device and the final-stage relay device;
   (1) the transmitter/receiver comprising:
      a first message generator that generates a first outgoing message including a list to which an address assigned to the transmitter/receiver itself is added; and
      a first transmitter that transmits the first outgoing message generated by the first message generator to the final-stage relay device with designating the final-stage relay device as a final destination,
   (2) the first-stage relay device comprising:
      a first receiver that receives the first outgoing message;
      a second message generator that adds, after the first receiver receives the first outgoing message, an address assigned to the first-stage relay device itself to the list of the received first outgoing message to generate a second outgoing message; and
      a second transmitter that transmits the second outgoing message generated by the second message generator to the final-stage relay device with designating the final-stage relay device as a final destination, and
   (3) the final-stage relay device comprising:
      a second receiver that receives the second outgoing message;

a third message generator that generates the return message to which the list included in the second outgoing message received by the second receiver is added; and a third transmitter that transmits the return message based on an address added to the list of the return message to the transmitter/receiver with designating the transmitter/receiver as a final destination, wherein:

(4)

the first receiver of the first-stage relay device receives the return message, and the second transmitter of the first-stage relay device transmits the return message based on a predetermined address which is included in the list of the return message received by the first receiver and which corresponds to the transmitter/receiver located at a prior stage to the first-stage relay device with reference to the transmitter/receiver in an outgoing route that is a relay route for the outgoing message, and (5)

the intermediate-stage relay device comprising:

a third receiver that receives the second outgoing message;

an address adder that adds an address of the intermediate-stage relay device itself to the list of the second outgoing message received by the third receiver; and a fourth transmitter that transmits the second outgoing message to which the address has been added by the address adder, the third receiver of the intermediate-stage relay device receives the return message, the fourth transmitter of the intermediate-stage relay device transmits the return message based on a predetermined address which is included in the list of the return message received by the third receiver and which corresponds to a device located at a prior stage to the intermediate-stage relay device with reference to the transmitter/receiver in the outgoing route, and the first receiver of the first-stage relay device receives the return message from the intermediate-stage relay device located at a posterior stage to the first-stage relay device with reference to the transmitter/receiver in the outgoing route.

2. The communication system according to claim 1, wherein the transmitter/receiver further comprises a fourth receiver that receives the return message from the first-stage relay device.

3. The communication system according to claim 1, wherein at least one of the first-stage relay device and the intermediate-stage relay device further comprises an address deleter that deletes an address of itself included in the list of the received return message.

4. The communication system according to claim 1, wherein the address adder of the intermediate-stage relay device further adds a number of times of relay of the outgoing message to the list included in the received outgoing message in association with the address of itself, the intermediate-stage relay device further comprises an identifier that identifies a predetermined address corresponding to the transmitter/receiver or another intermediate-stage relay device different from the intermediate-stage relay device located at a prior stage to the intermediate-stage relay device with reference to the transmitter/receiver in the outgoing route, from the list of the received return message, based on the number of times of relay added by the intermediate-stage relay device, and the fourth transmitter of the intermediate-stage relay device transmits the return message based on the predetermined address identified by the identifier.

5. The communication system according to claim 1, wherein the first message generator of the transmitter/receiver further adds to the list included in the outgoing message, a port number which is used by a program which transmits the first outgoing message in the transmitter/receiver for a communication in addition to the address assigned to the transmitter itself to generate the first outgoing message, and after the first receiver receives the return message, the second transmitter of the first-stage relay device specifies the predetermined address corresponding to the transmitter/receiver located at a prior stage to the first-stage relay device with reference to the transmitter/receiver in the outgoing route among addresses included in the list of the received return message, and the port number which is used by the program run by the transmitter/receiver located at the prior stage and which is used for a communication among port numbers included in the list of the received return message, and transmits the return message.

6. The communication system according to claim 1, wherein the second message generator of the first-stage relay device further adds to the list included in the first outgoing message received by the first receiver, a port number which is used by a program which receives the first outgoing message in the first-stage relay device for a communication in addition to the address assigned to the first-stage relay device itself to generate the second outgoing message, and after the third receiver receives the return message, the fourth transmitter of the intermediate-stage relay device specifies the predetermined address corresponding to the first-stage relay device or the another intermediate-stage relay device different from the intermediate-stage relay device located at a prior stage to the intermediate-stage relay device with reference to the transmitter/receiver in the outgoing route among addresses included in the list of the received return message, and the port number used by the program run by the first-stage relay device or the another intermediate-stage relay device different from the intermediate-stage relay device located at the prior stage for a communication among port numbers included in the list of the received return message, and transmits the return message.

7. The communication system according to claim 1, wherein the address adder of the intermediate-stage relay device further adds to the list included in the second outgoing message received by the third receiver, a port number which is used by a program which receives the second outgoing message in the intermediate-stage relay device for a communication in addition to the address assigned to the intermediate-stage relay device itself, and the third transmitter of the final-stage relay device specifies the predetermined address corresponding to the first-stage relay device or the intermediate-stage relay device located at a prior stage to the final-stage relay device with reference to the transmitter/receiver in the outgoing route among addresses included in the list of the generated return message, and the port number used by the program run by the first-stage relay device or the intermediate-stage relay device located at the prior stage for a communication among port numbers included in the list of the received return message, and transmits the return message.

8. The communication system according to claim 1, further comprising equal to or greater than the three intermediate-stage relay devices, wherein
the intermediate-stage relay device further comprises a storage that stores a table retaining an address assigned to the final-stage relay device and an address assigned to one of the equal to or greater than three intermediate-stage relay devices that will be a candidate of a transmission destination where the second outgoing message is transmitted in order to eventually transmit the second outgoing message to the final-stage relay device, the table being configured to retain at least the two addresses,
the identifier of the intermediate-stage relay device identifies equal to or greater than two addresses associated with the address assigned to the final-stage relay device from the table stored in the storage, and
after a transmission of the second outgoing message fails with one of equal to or greater than the two addresses identified by the identifier being specified as an address assigned to the transmission destination, the fourth transmitter of the intermediate-stage relay device specifies another address among equal to or greater than the two searched addresses as an address assigned to the transmission destination, and transmits the second outgoing message.

9. The communication system according to claim 1, wherein
the transmitter/receiver further comprises a first digest generator that generates a digest of data included in the first outgoing message transmitted by the first transmitter,
the final-stage relay device further comprises a second digest generator that generates a digest of data included in the second outgoing message received by the second receiver,
the third message generator of the final-stage relay device generates the return message to which the digest generated by the second digest generator is added,
the third transmitter of the final-stage relay device transmits the return message generated by the third message generator, and
the transmitter/receiver further comprises a transmission result determiner that determines whether or not a transmission of data included in the first outgoing message to the final-stage relay device has succeeded based on whether or not the digest included in the return message received by a fourth receiver and the digest generated by the first digest generator of the transmitter/receiver is identical to each other.

10. The communication system according to claim 1, further comprising at least the plurality of transmitters/receivers, wherein
the plurality of transmitter/receivers each further comprise an encrypter that encrypts, using a different key from each other, the first outgoing message generated by the first message generator, and
the first transmitter of each of the plurality of transmitter/receivers transmits the first outgoing message having undergone encryption by each encrypter.

11. The communication system according to claim 1, wherein the final-stage relay device accumulates event data included in the second outgoing message in a management server that manages the transmitter/receiver.

12. The communication system according to claim 1, further comprising a control device that controls at least one of the transmitter/receiver, the first-stage relay device, the at least one intermediate-stage relay device, and the final-stage relay device, wherein
the control device comprises:
a fifth receiver that receives a status report for reporting an operation status from at least one of the transmitter/receiver, the first-stage relay device, the at least one intermediate-stage relay device, and the final-stage relay device;
a failure occurrence determiner that determines whether or not a failure occurs in at least one of the transmitter/receiver, the first-stage relay device, the at least one intermediate-stage relay device, and the final-stage relay device, based on the status report received by the fifth receiver; and
a controller that controls at least one of the transmitter/receiver, the first-stage relay device, the at least one intermediate-stage relay device, and the final-stage relay device as to recover a communication with a device which is determined by the failure occurrence determiner that a failure has occurred.

13. A communication system comprising at least the following:
a transmitter/receiver that transmits an outgoing message including a list;
a final-stage relay device which is a final destination for the outgoing message and which transmits a return message to the transmitter/receiver in response to the outgoing message; and
a first-stage relay device that relays the outgoing message and the return message;
(1) the transmitter/receiver comprising:
a first message generator that generates a first outgoing message including a list to which an address assigned to the transmitter/receiver itself is added; and
a first transmitter that transmits the first outgoing message generated by the first message generator to the final-stage relay device with designating the final-stage relay device as a final destination,
(2) the first-stage relay device comprising:
a first receiver that receives the first outgoing message;
a second message generator that associates, after the first receiver receives the first outgoing message, a number of times of relay of the outgoing message with an address assigned to the first-stage relay device itself and adds the address and the number to the list of the received first outgoing message to generate a second outgoing message;
an identifier that identifies the predetermined address corresponding to the transmitter/receiver located at a prior stage to the first-stage relay device with reference to the transmitter/receiver in the outgoing route that is a relay route for the outgoing message from the list of the received return message based on the number of times of relay added by the second message generator; and
a second transmitter that transmits the second outgoing message generated by the second message generator to the final-stage relay device with designating the final-stage relay device as a final destination, and (3) the final-stage relay device comprising:
a second receiver that receives the second outgoing message;
a third message generator that generates the return message to which the list included in the second outgoing message received by the second receiver is added; and
a third transmitter that transmits the return message based on an address added to the list of the return message to the transmitter/receiver with designating the transmitter/receiver as a final destination,
wherein:
(4)
the first receiver of the first-stage relay device receives the return message, and
the second transmitter of the first-stage relay device transmits the return message based on a predetermined address which is included in the list of the return message received by the first receiver and which is identified by the identifier of the first-stage relay device.

14. The communication system according to claim 13, wherein
the first message generator of the transmitter/receiver further adds to the list included in the outgoing message, a port number which is used by a program which transmits the first outgoing message in the transmitter/receiver for a communication in addition to the address assigned to the transmitter itself to generate the first outgoing message, and
after the first receiver receives the return message, the second transmitter of the first-stage relay device specifies the predetermined address corresponding to the transmitter/receiver located at a prior stage to the first-stage relay device with reference to the transmitter/receiver in the outgoing route among addresses included in the list of the received return message, and the port number which is used by the program run by the transmitter/receiver located at the prior stage and which is used for a communication among port numbers included in the list of the received return message, and transmits the return message.

15. The communication system according to claim 13, further comprising at least the plurality of transmitters/receivers, wherein
the plurality of transmitter/receivers each further comprise an encrypter that encrypts, using a different key from each other, the first outgoing message generated by the first message generator, and
the first transmitter of each of the plurality of transmitter/receivers transmits the first outgoing message having undergone encryption by each encrypter.

16. The communication system according to claim 13, wherein the final-stage relay device accumulates event data included in the second outgoing message in a management server that manages the transmitter/receiver.

17. A communication system comprising at least the following:
a transmitter/receiver that transmits an outgoing message including a list;
a final-stage relay device which is a final destination for the outgoing message and which transmits a return message to the transmitter/receiver in response to the outgoing message; and
a first-stage relay device that relays the outgoing message and the return message;
(1) the transmitter/receiver comprising:
a first message generator that generates a first outgoing message; and
a first transmitter that transmits the first outgoing message generated by the first message generator with the final-stage relay device being as a final destination;
(2) the first-stage relay device comprising:
a first receiver that receives the first outgoing message;
a second message generator that adds, after the first receiver receives the first outgoing message, an address assigned to the transmitter/receiver located at a prior stage to the first-stage relay device with reference to the transmitter/receiver in an outgoing route that is a relay route for the outgoing message to the list of the received first outgoing message to generate a second outgoing message; and
a second transmitter that transmits the second outgoing message generated by the second message generator with the final-stage relay device being as a final destination, and
(3) the final-stage relay device comprising:
a second receiver that receives the second outgoing message;
a third message generator that generates the return message to which the list included in the second outgoing message received by the second receiver is added; and
a third transmitter that transmits the return message based on an address added to the list of the return message with the transmitter/receiver being as a final destination.

18. A communication system comprising at least the following:
a transmitter/receiver that transmits an outgoing message;
a final-stage relay device which is a final destination for the outgoing message and which transmits a return message to the transmitter/receiver in response to the outgoing message; and
a first-stage relay device that relays the outgoing message and the return message;
(1) the transmitter/receiver comprising:
a first digest generator that generates a digest of data included in the outgoing message; and
a first transmitter that transmits the outgoing message to the final-stage relay device with designating the final-stage relay device as a final destination,
(2) the first-stage relay device comprising:
a first receiver that receives the outgoing message; and
a second transmitter that transmits the outgoing message received by the first receiver to the final-stage relay device with designating the final-stage relay device as a final destination,
(3) the final-stage relay device comprising:
a second receiver that receives the outgoing message;
a second digest generator that generates a digest of data included in the outgoing message received by the second receiver;
a third message generator that generates the return message to which the digest generated by the second digest generator is added; and
a third transmitter that transmits the return message to the transmitter/receiver with designating the transmitter/receiver as a final destination, and
(4) the transmitter/receiver further comprising:
a third receiver that receives the return message from the first-stage relay device located at a posterior stage to the transmitter/receiver with reference to the transmitter/receiver in an outgoing route, and
a transmission result determiner that determines whether or not a transmission of data included in the outgoing message to the final-stage relay device has succeeded based on whether or not the digest included in the return message received by the third receiver is identical to the digest generated by the first digest generator.

19. A relay device that relays an outgoing message including a list, and a return message responding to the outgoing message, the relay device comprising:
- an outgoing route receiver that receives a first outgoing message including a list to which an address of a transmitter/receiver that has transmitted the outgoing message is added;
- an outgoing message generator that associates a number of times of relay of the outgoing message with an address assigned to the relay device itself and adds the address and the number to the list included in the first outgoing message received by the outgoing route receiver to generate a second outgoing message;
- an outgoing route transmitter that transmits the second outgoing message generated by the outgoing message generator;
- a return route receiver that receives the return message to which the list of the outgoing message is added;
- an identifier that identifies a predetermined address corresponding to the transmitter/receiver located at a prior stage to the relay device with reference to the transmitter/receiver in an outgoing route that is a relay route for the outgoing message from the list of the received return message based on the number of times of relay added by the outgoing message generator; and
- a return route transmitter that transmits the return message based on the predetermined address which is included in the list of the return message received by the return route receiver and which is identified by the identifier.

20. A relay device that relays an outgoing message including a list, and a return message responding to the outgoing message, the relay device comprising:
- an outgoing route receiver that receives a first outgoing message from a transmitter/receiver;
- an outgoing message generator that adds an address assigned to the transmitter/receiver to the list included in the first outgoing message received by the outgoing route receiver to generate a second outgoing message;
- an outgoing route transmitter that transmits the second outgoing message generated by the outgoing message generator;
- a return route receiver that receives the return message to which the list of the outgoing message is added; and
- a return route transmitter that transmits the return message based on a predetermined address which is included in the list of the return message received by the return route receiver and which corresponds to the transmitter/receiver located at a prior stage to the relay device with reference to the transmitter/receiver in an outgoing route that is a relay route for the outgoing message.

21. A computer-readable non-transitory recording medium having stored therein a relay program that allows a computer which relays an outgoing message including a list, and a return message responding to the outgoing message to function as:
- an outgoing route receiver that receives a first outgoing message including a list to which an address of a transmitter/receiver that has transmitted the outgoing message is added;
- an outgoing message generator that associates a number of times of relay of the outgoing message with an address assigned to the relay device itself and adds the address and the number to the list included in the first outgoing message received by the outgoing route receiver to generate a second outgoing message;
- an outgoing route transmitter that transmits the second outgoing message generated by the outgoing message generator;
- a return route receiver that receives the return message to which the list of the outgoing message is added;
- an identifier that identifies a predetermined address corresponding to the transmitter/receiver located at a prior stage to the relay device with reference to the transmitter/receiver in an outgoing route that is a relay route for the outgoing message from the list of the received return message based on the number of times of relay added by the outgoing message generator; and
- a return route transmitter that transmits the return message based on the predetermined address which is included in the list of the return message received by the return route receiver and which is identified by the identifier.

22. A computer-readable non-transitory recording medium having stored therein a relay program that allows a computer which relays an outgoing message including a list, and a return message responding to the outgoing message to function as:
- an outgoing route receiver that receives a first outgoing message from a transmitter/receiver;
- an outgoing message generator that adds an address assigned to the transmitter/receiver to the list included in the first outgoing message received by the outgoing route receiver to generate a second outgoing message;
- an outgoing route transmitter that transmits the second outgoing message generated by the outgoing message generator;
- a return route receiver that receives the return message to which the list of the outgoing message is added; and
- a return route transmitter that transmits the return message based on a predetermined address which is included in the list of the return message received by the return route receiver and which corresponds to the transmitter/receiver located at a prior stage to the relay device with reference to the transmitter/receiver in an outgoing route that is a relay route for the outgoing message.

23. A communication method executed by a communication system comprising at least the following:
- a transmitter/receiver that transmits an outgoing message including a list;
- a final-stage relay device which is a final destination for the outgoing message and which transmits a return message to the transmitter/receiver in response to the outgoing message;
- a first-stage relay device that relays the outgoing message and the return message; and
- at least one intermediate-stage relay device located between the first-stage relay device and the final-stage relay device, the communication method comprising:

(1)
a first message generating step for causing the transmitter/receiver to generate a first outgoing message including a list to which an address assigned to the transmitter/receiver itself is added;

a first transmitting step for causing the transmitter/receiver to transmit the first outgoing message generated through the first message generating step to the final-stage relay device with designating the final-stage relay device as a final destination;

(2)
a first receiving step for causing the first-stage relay device to receive the first outgoing message;

a second message generating step for causing the first-stage relay device to add, after the first outgoing message is received through the first receiving step, an address assigned to the first-stage relay device itself to the list of the received first outgoing message to generate a second outgoing message;

a second transmitting step for causing the first-stage relay device to transmit the second outgoing message generated through the second message generating step to the final-stage relay device with designating the final-stage relay device as a final destination;

(3)

a second receiving step for causing the final-stage relay device to receive the second outgoing message;

a third message generating step for causing the final-stage relay device to generate the return message to which the list included in the second outgoing message received through the second receiving step is added;

a third transmitting step for causing the final-stage relay device to transmit the return message based on an address added to the list of the return message to the transmitter/receiver with designating the transmitter/receiver as a final destination;

(4)

a third receiving step for causing the first-stage relay device to receive the return message;

a fourth transmitting step for causing the first-stage relay device to transmit the return message based on a predetermined address which is included in the list of the return message received through the third receiving step and which corresponds to the transmitter/receiver located at a prior stage to the first-stage relay device with reference to the transmitter/receiver in an outgoing route that is a relay route for the outgoing message;

(5)

a fourth receiving step for causing the intermediate-stage relay device to receive the second outgoing message;

an address adding step for causing the intermediate-stage relay device to add an address of the intermediate-stage relay device itself to the list of the second outgoing message received through the fourth receiving step;

a fifth transmitting step for causing the intermediate-stage relay device to transmit the second outgoing message to which the address has been added through the address adding step;

a fifth receiving step for causing the intermediate-stage relay device to receive the return message;

a sixth transmitting step for causing the intermediate-stage relay device to transmit the return message based on a predetermined address which is included in the list of the return message received through the fifth receiving step and which corresponds to a device located at a prior stage to the intermediate-stage relay device with reference to the transmitter/receiver in the outgoing route; and a sixth receiving step for causing the first-stage relay device to receive the return message from the intermediate-stage relay device located at a posterior stage to the first-stage relay device with reference to the transmitter/receiver in the outgoing route.

24. A communication method executed by a communication system comprising at least the following:

a transmitter/receiver that transmits an outgoing message including a list;

a final-stage relay device which is a final destination for the outgoing message and which transmits a return message to the transmitter/receiver in response to the outgoing message; and a first-stage relay device that relays the outgoing message and the return message, the communication method comprising:

(1)

a first message generating step for causing the transmitter/receiver to generate a first outgoing message including a list to which an address assigned to the transmitter/receiver itself is added;

a first transmitting step for causing the transmitter/receiver to transmit the first outgoing message generated through the first message generating step to the final-stage relay device with designating the final-stage relay device as a final destination;

(2)

a first receiving step for causing the first-stage relay device to receive the first outgoing message;

a second message generating step for causing the first-stage relay device to associate, after the first outgoing message is received through the first receiving step, a number of times of relay of the outgoing message with an address assigned to the first-stage relay device itself and to add the address and the number to the list of the received first outgoing message to generate a second outgoing message;

an identifying step for causing the first-stage relay device to identify the predetermined address corresponding to the transmitter/receiver located at a prior stage to the first-stage relay device with reference to the transmitter/receiver in the outgoing route that is a relay route for the outgoing message from the list of the received return message based on the number of times of relay added through the second message generating step;

a second transmitting step for causing the first-stage relay device to transmit the second outgoing message generated through the second message generating step to the final-stage relay device with designating the final-stage relay device as a final destination;

(3)

a second receiving step for causing the final-stage relay device to receive the second outgoing message;

a third message generating step for causing the final-stage relay device to generate the return message to which the list included in the second outgoing message received through the second receiving step is added;

a third transmitting step for causing the final-stage relay device to transmit the return message based on an address added to the list of the return message to the transmitter/receiver with designating the transmitter/receiver as a final destination;

(4)

a third receiving step for causing the first-stage relay device to receive the return message; and a fourth transmitting step for causing the first-stage relay device to transmit the return message based on a predetermined address which is included in the list of the return message received through the third receiving step and which is identified through the identifying step.

25. A communication method executed by a communication system comprising at least the following:

a transmitter/receiver that transmits an outgoing message including a list;

a final-stage relay device which is a final destination for the outgoing message and which transmits a return message to the transmitter/receiver in response to the outgoing message; and
a first-stage relay device that relays the outgoing message and the return message, the communication method comprising:
(1)
a first message generating step for causing the transmitter/receiver to generate a first outgoing message;
a first transmitting step for causing the transmitter/receiver to transmit the first outgoing message generated through the first message generating step with the final-stage relay device being as a final destination;
(2)
a first receiving step for causing the first-stage relay device to receive the first outgoing message;
a second message generating step for causing the first-stage relay device to add, after the first outgoing message is received through the first receiving step, an address assigned to the transmitter/receiver located at a prior stage to the first-stage relay device with reference to the transmitter/receiver in an outgoing route that is a relay route for the outgoing message to the list of the received first outgoing message to generate a second outgoing message;
a second transmitting step for causing the first-stage relay device to transmit the second outgoing message generated through the second message generating step with the final-stage relay device being as a final destination;
(3)
a second receiving step for causing the final-stage relay device to receive the second outgoing message;
a third message generating step for causing the final-stage relay device to generate the return message to which the list included in the second outgoing message received through the second receiving step is added; and
a third transmitting step for causing the final-stage relay device to transmit the return message based on an address added to the list of the return message with the transmitter/receiver being as a final destination.

26. A communication method executed by a communication system comprising at least the following:
a transmitter/receiver that transmits an outgoing message;
a final-stage relay device which is a final destination for the outgoing message and which transmits a return message to the transmitter/receiver in response to the outgoing message; and
a first-stage relay device that relays the outgoing message and the return message, the communication method comprising:
(1)
a first digest generating step for causing the transmitter/receiver to generate a digest of data included in the outgoing message;
a first transmitting step for causing the transmitter/receiver to transmit the outgoing message to the final-stage relay device with designating the final-stage relay device as a final destination,
(2)
a first receiving step for causing the first-stage relay device to receive the outgoing message;
a second transmitting step for causing the first-stage relay device to transmit the outgoing message received through the first receiving step to the final-stage relay device with designating the final-stage relay device as a final destination;
(3)
a second receiving step for causing the final-stage relay device to receive the outgoing message;
a second digest generating step for causing the final-stage relay device to generate a digest of data included in the outgoing message received through the second receiving step;
a third message generating step for causing the final-stage relay device to generate the return message to which the digest generated through the second digest generating step is added;
a third transmitting step for causing the final-stage relay device to transmit the return message to the transmitter/receiver with designating the transmitter/receiver as a final destination;
(4)
a third receiving step for causing the transmitter/receiver to receive the return message from the first-stage relay device located at a posterior stage to the transmitter/receiver with reference to the transmitter/receiver in an outgoing route, and
a transmission result determining step for causing the transmitter/receiver to determine whether or not a transmission of data included in the outgoing message to the final-stage relay device has succeeded based on whether or not the digest included in the return message received through the third receiving step is identical to the digest generated through the first digest generating step.

27. A relay method executed by a relay device that relays an outgoing message including a list, and a return message responding to the outgoing message, the relay method comprising:
an outgoing route receiving step for receiving a first outgoing message including a list to which an address of a transmitter/receiver that has transmitted the outgoing message is added;
an outgoing message generating step for associating a number of times of relay of the outgoing message with an address assigned to the relay device itself and for adding the address and the number to the list included in the first outgoing message received through the outgoing route receiving step to generate a second outgoing message;
an outgoing route transmitting step for transmitting the second outgoing message generated through the outgoing message generating step;
a return route receiving step for receiving the return message to which the list of the outgoing message is added;
an identifying step for identifying a predetermined address corresponding to the transmitter/receiver located at a prior stage to the relay device with reference to the transmitter/receiver in an outgoing route that is a relay route for the outgoing message from the list of the received return message based on the number of times of relay added through the outgoing message generating step; and
a return route transmitting step for transmitting the return message based on the predetermined address which is included in the list of the return message received through the return route receiving step and which is identified through the identifying step.

28. A relay method executed by a relay device that relays an outgoing message including a list, and a return message responding to the outgoing message, the relay method comprising:
an outgoing route receiving step for receiving a first outgoing message from a transmitter/receiver;

an outgoing message generating step for adding an address assigned to the transmitter/receiver to the list included in the first outgoing message received through the outgoing route receiving step to generate a second outgoing message;

an outgoing route transmitting step for transmitting the second outgoing message generated through the outgoing message generating step;

a return route receiving step for receiving the return message to which the list of the outgoing message is added; and a return route transmitting step for transmitting the return message based on a predetermined address which is included in the list of the return message received through the return route receiving step and which corresponds to the transmitter/receiver located at a prior stage to the relay device with reference to the transmitter/receiver in an outgoing route that is a relay route for the outgoing message.

* * * * *